(12) United States Patent
Ukai et al.

(10) Patent No.: US 10,764,441 B2
(45) Date of Patent: Sep. 1, 2020

(54) SOUND SIGNAL PROCESSING DEVICE AND SOUND SIGNAL PROCESSING METHOD

(71) Applicant: Yamaha Corporation, Hamamatsu-shi, Shizuoka-Ken (JP)

(72) Inventors: Satoshi Ukai, Hamamatsu (JP); Takayuki Inoue, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 16/194,528

(22) Filed: Nov. 19, 2018

(65) Prior Publication Data

US 2019/0089839 A1 Mar. 21, 2019

Related U.S. Application Data

(63) Continuation of application No. PCT/JP2016/065652, filed on May 26, 2016.

(51) Int. Cl.
*H04M 3/56* (2006.01)
*H04M 19/04* (2006.01)
(Continued)

(52) U.S. Cl.
CPC ........ *H04M 3/568* (2013.01); *G05B 19/0423* (2013.01); *H04L 65/403* (2013.01);
(Continued)

(58) Field of Classification Search
None
See application file for complete search history.

(56) References Cited

U.S. PATENT DOCUMENTS

| 8,031,853 B2 | 10/2011 | Bathurst et al. |
| 2007/0230462 A1 | 10/2007 | Nakayama |

(Continued)

FOREIGN PATENT DOCUMENTS

| CN | 101046952 A | 10/2007 |
| CN | 105611222 A | 5/2016 |

(Continued)

OTHER PUBLICATIONS

International Search Report (PCT/ISA/210) issued in PCT Application No. PCT/JP2016/065652 dated Aug. 16, 2016 with English translation (three (3) pages).

(Continued)

*Primary Examiner* — Kenny H Truong
(74) *Attorney, Agent, or Firm* — Crowell & Moring LLP

(57) ABSTRACT

A sound signal processing device includes: a microphone terminal to which a sound signal derived from sound received by a microphone is input; a loudspeaker terminal from which a sound signal directed to a loudspeaker is output; a first input terminal to which a sound signal from another proximal-end device is input; a first output terminal from which a sound signal directed to the other device is output; a distal-end input terminal to which a distal-end sound signal is input via a network; a distal-end output terminal from which a sound signal directed to the network is output; and at least one processor configured to execute stored instructions to establish at least one signal path from at least one of the microphone terminal, the first input terminal, or the distal-end input terminal, to at least one of the loudspeaker terminal, the first output terminal, or the distal-end output terminal.

20 Claims, 30 Drawing Sheets

(51) Int. Cl.
*G05B 19/042* (2006.01)
*H04L 29/06* (2006.01)
*H04M 9/08* (2006.01)
*H04M 1/60* (2006.01)

(52) U.S. Cl.
CPC .............. *H04M 3/56* (2013.01); *H04M 9/082* (2013.01); *H04M 19/04* (2013.01); *H04M 1/6033* (2013.01)

(56) References Cited

U.S. PATENT DOCUMENTS

2010/0172514 A1* 7/2010 Ishibashi ................ H04R 3/005
 381/94.1
2016/0127686 A1* 5/2016 Nagase .................... H04N 7/15
 348/14.07

FOREIGN PATENT DOCUMENTS

| | | |
|---|---|---|
| JP | 2000-23129 A | 1/2000 |
| JP | 2011-228899 A | 11/2011 |
| JP | 2011228899 A * | 11/2011 |

OTHER PUBLICATIONS

Japanese-language Written Opinion (PCT/ISA/237) issued in PCT Application No. PCT/JP2016/065652 dated Aug. 16, 2016 (five (5) pages).
Japanese-language Office Action issued in counterpart Japanese Application No. 2018-518899 dated Aug. 6, 2019 with unverified English translation (six pages).
Extended European Search Report issued in counterpart European Application No. 16903154.9 dated Nov. 12, 2019 (seven (7) pages).
English Translation of Chinese-language Office Action issued in Chinese Application No. 201680086111.6 dated Apr. 23, 2020 (10 pages).
English translation of document B1 (JP 2011-228899 A previously filed Nov. 19, 2018) (29 pages).
English translation of document B2 (JP 2000-23129 A previously filed Nov. 19, 2018) (30 pages).

* cited by examiner

SOUND SIGNAL PROCESSING DEVICE AND SOUND SIGNAL PROCESSING METHOD

CROSS REFERENCE TO RELATED APPLICATIONS

This application is a Continuation Application of PCT Application No. PCT/JP2016/065652, filed May 26, 2016, the entire contents of which are incorporated herein by reference.

BACKGROUND OF THE INVENTION

Field of the Invention

The present invention relates to a sound signal processing device and a sound signal processing method suitable for a sound emission-reception apparatus used for remote audio conferencing.

Description of the Related Art

Recently, audio conferencing systems have been put to practical use. Such systems enable exchange of voice signals (sound signals) by use of a sound emission-reception apparatus connected to a network. The sound emission-reception apparatus receives voices of participants in a place (meeting room) by use of a microphone and outputs a sound signal derived from received sound to the network. The sound emission-reception apparatus uses a loudspeaker to convert a sound signal provided by the network into a voice whereby the participants in the meeting room are able to hear the voice.

Conceptually, the sound emission-reception apparatus includes a microphone and a loudspeaker. Instead of being provided inside the sound emission-reception apparatus, the microphone and the loudspeaker may be provided outside the sound emission-reception apparatus and connected to the sound emission-reception apparatus. The sound emission-reception apparatus may be understood to include: the microphone; the loudspeaker; and a sound signal processing device that processes sound signals derived from sounds received by the microphone and sound signals output to the loudspeaker.

A size of meeting rooms used for audio conferences varies, and a number of participants in such meeting rooms also varies. In a case where a meeting room is spacious and there is a large number of participants, it may be difficult to receive all voices of all the participants and to enable all of the participants to evenly hear sound derived from sound signals provided by the network using the loudspeaker. To overcome this difficulty, a system has been proposed for installation of pods dispersed around a meeting room, with each pod including a microphone and a loudspeaker (refer to FIG. 15, and also to the description in the eighth column in U.S. Pat. No. 8,031,853).

In the system outlined above, a pod is unable to connect to a network directly, and is required to connect to a base that serves as a host. Thus, when two pods are installed at a distance from each other, it is necessary to provide a base in addition to the two pods.

SUMMARY

The present invention has been created in view of the above circumstances and has as its object the provision of a sound signal processing method and a sound signal processing device that is able to connect to the network without need for a separate dedicated device, such as a base.

In order to achieve the above object, a sound signal processing device according to one aspect of the present invention includes: a microphone terminal to which a sound signal derived from sound received by a microphone is input; a loudspeaker terminal from which a sound signal directed to a loudspeaker is output; a first input terminal to which a sound signal from another device at a proximal-end is input; a first output terminal from which a sound signal directed to the other device at the proximal-end is output; a distal-end input terminal to which a distal-end sound signal is input via a network; a distal-end output terminal from which a sound signal directed to the network is output; a path establisher configured to establish at least one signal path from at least one of the microphone terminal, the first input terminal, or the distal-end input terminal, to at least one of the loudspeaker terminal, the first output terminal, or the distal-end output terminal; and a path indicator configured to indicate to the path establisher a signal path that is to be established.

A sound signal processing method according to a second aspect of the present invention is implemented in a device that comprises at least: a microphone terminal to which a sound signal derived from sound received by a microphone is input; a loudspeaker terminal from which a sound signal directed to a loudspeaker is output; a first input terminal to which a sound signal from another device at a proximal-end is input; a first output terminal from which a sound signal directed to the other device is output; a distal-end input terminal to which a distal-end sound signal is input via a network; and a distal-end output terminal from which a sound signal directed to the network is output, the method including: acquiring a connection status of the subject device to the network and a connection status of the other device to the network; and determining, based on the acquired connection statuses, at least one signal path from at least one of the microphone terminal, the first input terminal, or the distal-end input terminal, to at least one of the loudspeaker terminal, the first output terminal, or the distal-end output terminal.

DESCRIPTION OF THE EMBODIMENTS

With reference to accompanying drawings, embodiments of the present invention will now be described below.

First Embodiment

Figure 1:
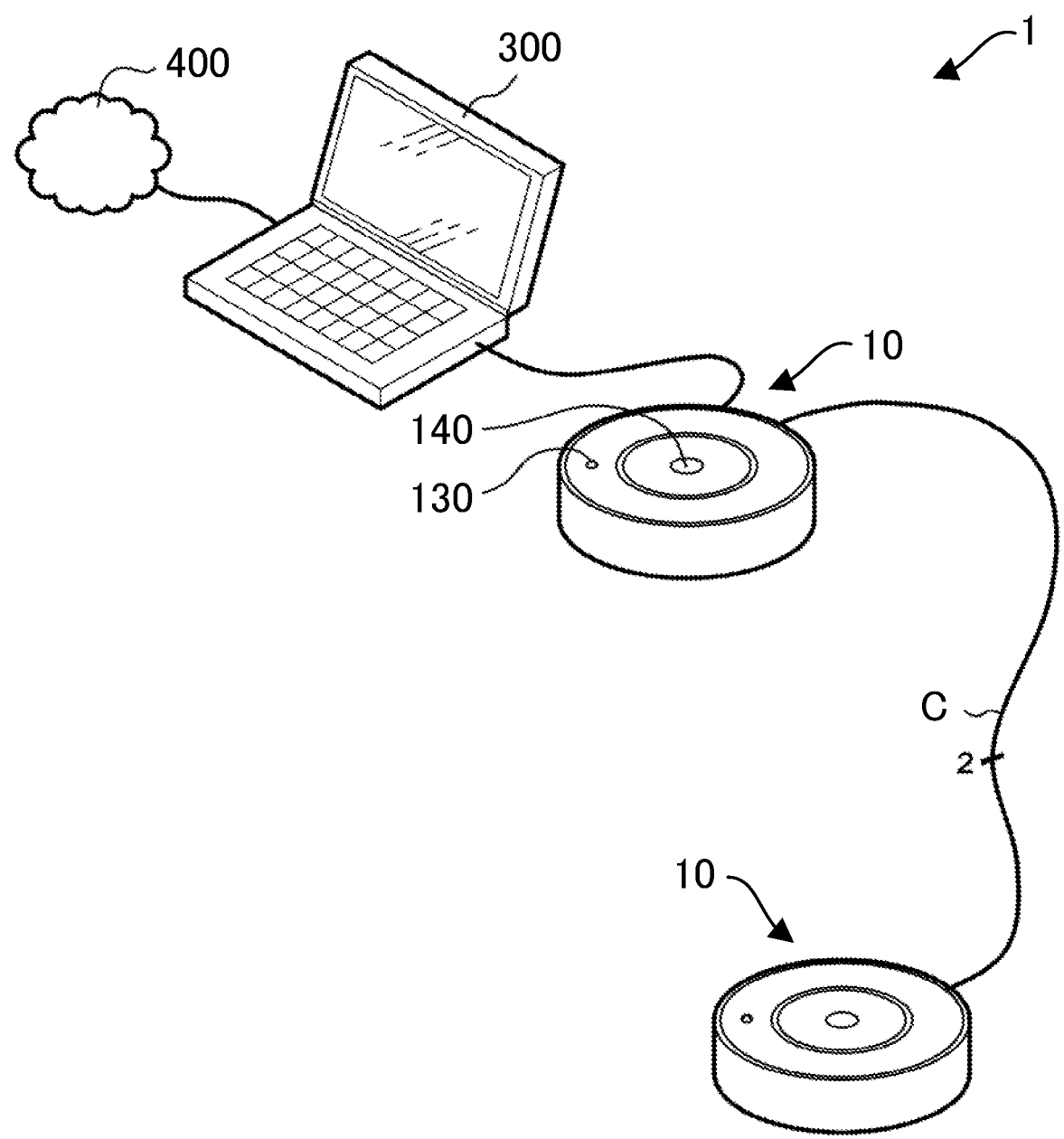
FIG. 1 is a diagram showing a system that includes a sound emission-reception apparatus according to a first embodiment.

FIG. 1 is a diagram showing a system that includes a sound emission-reception apparatus according to a first embodiment.

In this embodiment, a system 1 includes two sound emission-reception apparatuses 10. The sound emission-reception apparatuses 10 have the same configuration, with the exception of interior established signal paths, which will be described later. The sound emission-reception apparatuses 10 are installed apart from each other in a place, such as a meeting room. Each sound emission-reception apparatus 10 includes a notification device 130, such as an LED; and an input device 140, such as a momentary push-on switch. The two sound emission-reception apparatuses 10 are connected to each other via a cable C.

In this embodiment, a single cable C transmits two sound signals. Alternatively, two cables may be used, each of which transmits one sound signal.

FIG. 1 shows an example in which one of the two sound emission-reception apparatuses 10 is connected to a network 400 via a PC 300. Another system (illustration omitted) installed in another place is connected to the network 400. In this setting, the system 1 and the other system exchange sound signals with each other.

As will be described later, each of the two sound emission-reception apparatuses 10 may be connected to the network 400 via the PC 300.

In this description, the term "connection" refers to direct or indirect coupling between two or more elements; and there may be one or more intermediate elements between these two or more elements, with the exception of the sound emission-reception apparatus 10. A connection between elements may be physical, logical, or a combination of both. For example, the connection between elements may be realized by electric wire, cable, or wiring on a printed circuit board, or may be realized by use of wireless communication, or by a combination of two or more of these forms.

In FIG. 1, a single sound emission-reception apparatus 10 is connected to the network 400 via the PC 300. It is to be noted, however, that if the sound emission-reception apparatus 10 is treated as an intermediate element, there is room to assume that the other sound emission-reception apparatus 10 may be connected to the network 400 via the sound emission-reception apparatus 10 and the PC 300. To exclude the possibility of any such assumption, the sound emission-reception apparatus 10 is not included among the intermediate elements.

In the system 1 shown in FIG. 1, the sound emission-reception apparatus 10 is connected to the network 400 via the PC 300, since by using a network connecting capability provided in the PC 300, the configuration of the sound emission-reception apparatus 10 can be simplified. Alternatively, the sound emission-reception apparatus 10 may be equipped with a network connecting capability and may be directly connected to the network 400.

Relative to the sound emission-reception apparatus 10, the PC 300 is merely a relay point to the network 400. Accordingly, in the following description, the presence of the PC 300 will not be discussed, and the point of focus will be whether the sound emission-reception apparatus 10 is connected to the network 400.

A typical example of the network 400 is the Internet. However, examples of the network 400 include an intra-firm LAN (local area network), a wireless telephone network, and a wired telephone network.

Figure 2:
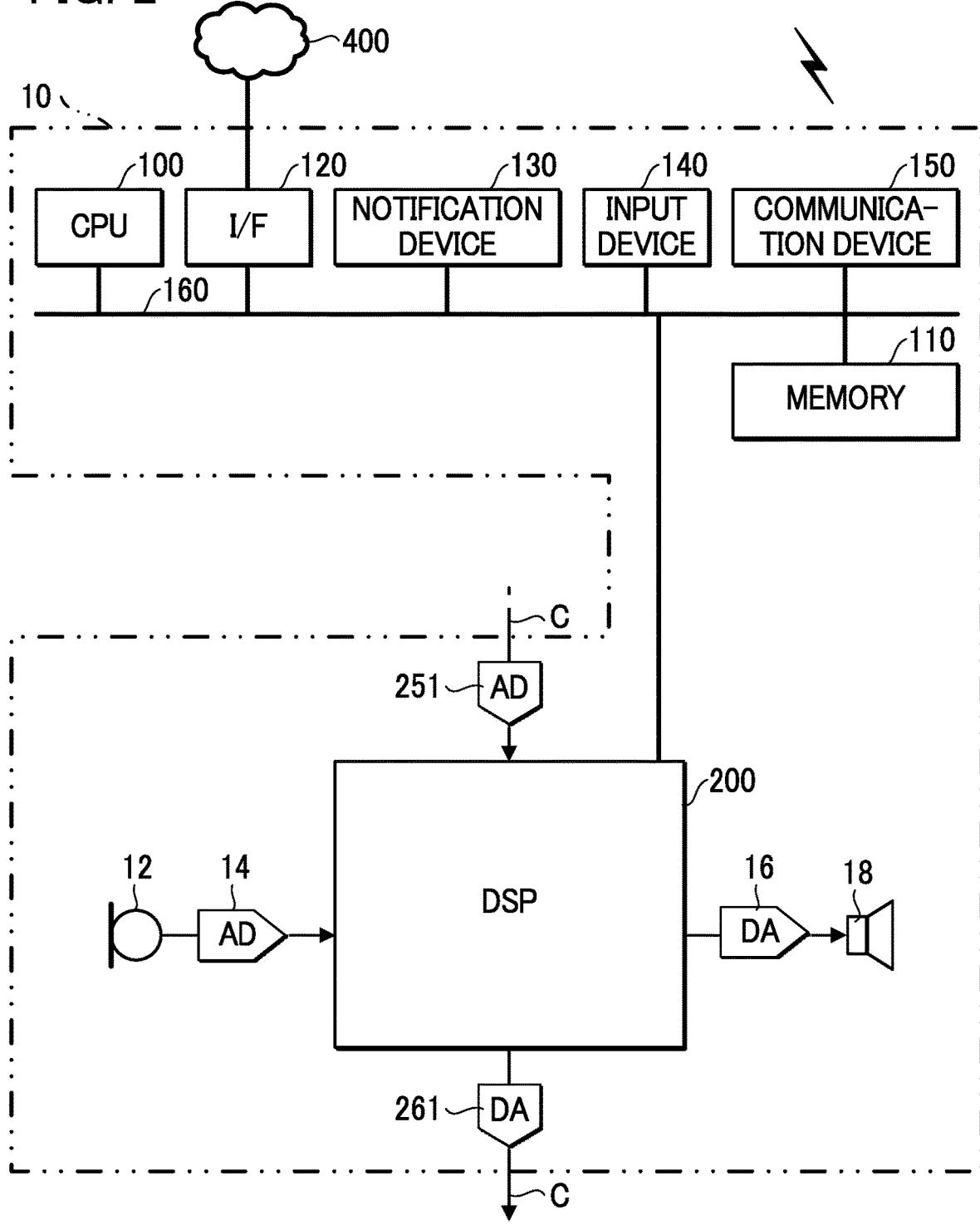
FIG. 2 is a diagram showing a hardware configuration of the sound emission-reception apparatus.

FIG. 2 shows a hardware configuration of a sound emission-reception apparatus 10.

As shown in FIG. 2, the sound emission-reception apparatus 10 includes a microphone 12, an ADC (analog to digital converter) 14, a DAC (digital to analog converter) 16, a loudspeaker 18, a CPU (central processing unit) 100, a memory 110, an I/F (interface) 120, a notification device 130, an input device 140, a communication device 150, a bus 160, and a DSP (digital signal processor) 200.

For illustrative purposes, the ADC and the DAC are expressed respectively as AD and DA in the figures. In the following description, the term "device" or "apparatus" may be substituted with a term such as circuitry, unit, or module.

The CPU 100 controls each element of the sound emission-reception apparatus 10 by executing a program stored in the memory 110. In addition to the program, the memory 110 stores temporal data stored by the CPU 100 and the DSP 200.

The microphone 12 receives sounds around the sound emission-reception apparatus 10 to generate an analog sound signal. Specifically, sounds received by the microphone 12 are voices of participants in a meeting room in which the sound emission-reception apparatus 10 is installed. The ADC 14 converts the sound signal derived from sounds received by the microphone 12 into a digital signal and provides the digital signal to the DSP 200. An ADC 251 converts a sound signal provided from another apparatus via the cable C into a digital signal, and provides the digital signal to the DSP 200.

As will be described later in detail, the DSP 200 performs, with use of signal paths indicated by the CPU 100 (path indicator), computational processing on a sound signal converted by the ADC 14; the proximal-end sound signal being converted by the ADC 251; and the sound signal being provided by the other distal-end system via the network 400, the I/F 120, and the bus 160. The DSP then outputs the processed sound signals to the DAC 16, a DAC 261, the loudspeaker 18, and the other distal-end system.

In the following description, the term "distal-end" refers to a signal and the like that passes through the network 400; and the term "proximal-end" refers to a signal and the like that does not pass through the network 400.

The subject apparatus refers to a single sound emission-reception apparatus 10 in focus. The other apparatus refers to a proximal-end sound emission-reception apparatus 10 other than the subject apparatus within the same system.

The expression "A toward B" does not exclude a situation where other intermediate elements exist between A and B.

The communication device 150 may communicate with the other apparatus by wireless communication, for example.

The DAC 16 converts the sound signals processed by the DSP 200 into analog signals and outputs the analog signals. The loudspeaker 18 converts the sound signals converted by the DAC 16 into sounds and outputs the sounds. The DAC 261 converts the sound signals processed by the DSP 200 into analog signals and outputs the analog signals.

In this embodiment, the DSP 200 executes signal processing. Before being processed by the DSP 200, the signals are converted into digital format by the ADC 14 and the ADC 251, and after being processed by the DSP 200, the signals are converted back into analog format by the DAC 16 and the DAC 261. As will be described later, in place of digital signal processing by the DSP 200, there may be employed analog signal processing. Where analog signal processing is performed, none of the ADC 14, the ADC 251, the DAC 16, and the DAC 261 are required.

In FIG. 2, a single microphone 12 and a single loudspeaker 18 are illustrated. However, there may be multiple microphones 12 and multiple loudspeakers 18.

In this embodiment, the DSP 200, the ADC 14, the ADC 251, the DAC 16, and the DAC 261 are described as separate bodies for a purpose of describing signal paths that are established in the DSP 200. The DSP 200 may house the ADC 14, the ADC 251, the DAC 16, and the DAC 261.

Figure 3:
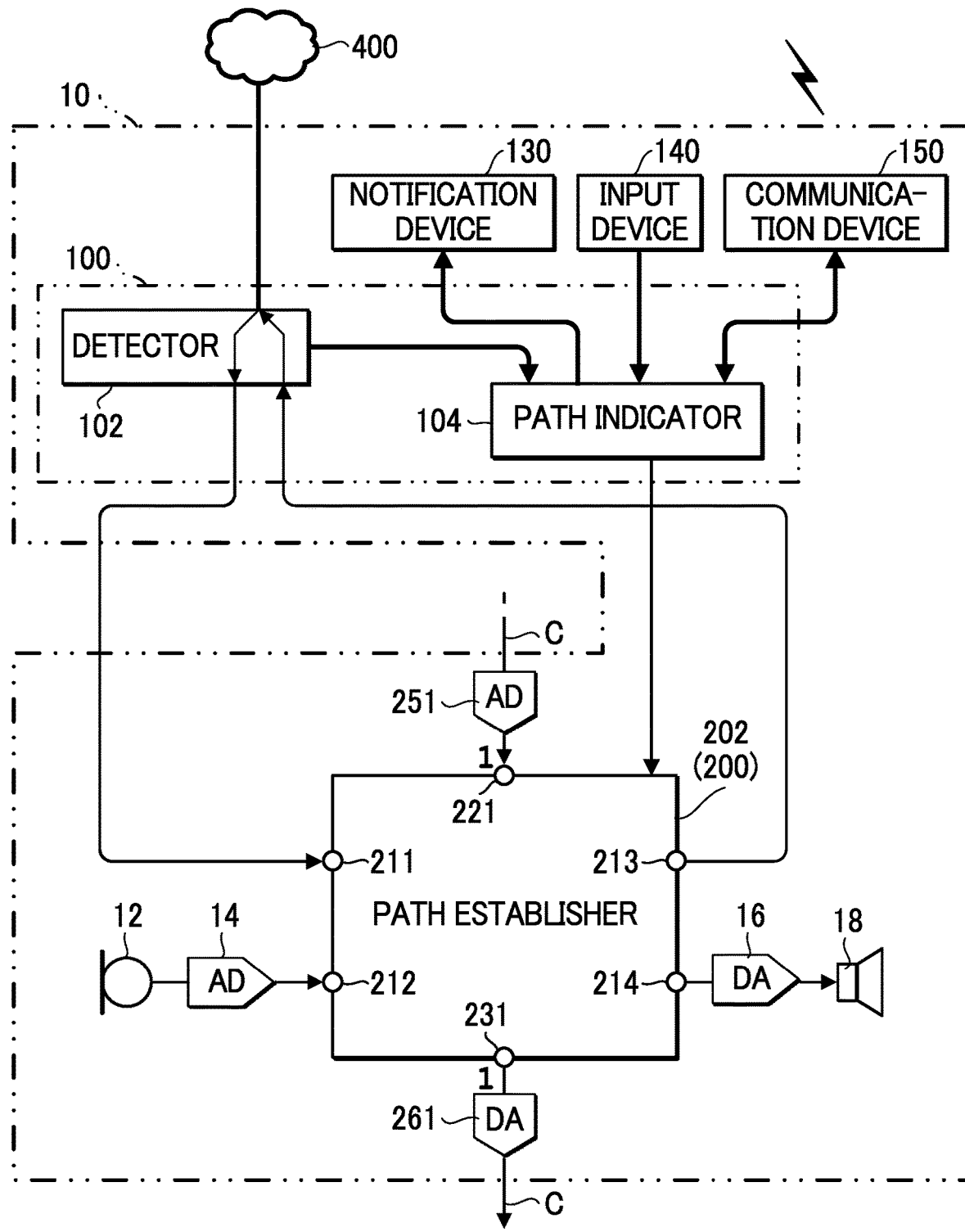
FIG. 3 is a diagram showing functional blocks of the sound emission-reception apparatus.

FIG. 3 is a diagram showing functional blocks of the sound emission-reception apparatus 10, with a focus on the flow of signals.

As shown in the figure, a detector 102 and the path indicator 104 are established in the CPU 100 by execution of the program, and a path establisher 202 is established in the DSP 200. Illustration of the I/F 120 shown in FIG. 2 is omitted in FIG. 3 since the I/F 120 is not involved in the flow of signals.

The detector 102 detects whether the subject apparatus is connected to the network 400 and is in a condition to be able to exchange sound signals with another system.

The detector 102 outputs a detection result to the path indicator 104. If the detector 102 detects that the subject apparatus is connected to the network 400, the detector 102 provides sound signals from the other system to a distal-end input terminal 211 of the path establisher 202, and transfers sound signals output from a distal-end output terminal 213 of the path establisher 202 toward the other system.

The path indicator 104 directs the notification device 130 to notify a user, and after the user operates the input device 140, receives operation information. Here, the user refers to a part or all of the participants in a meeting room in which the sound emission-reception apparatuses 10a and 10b are installed.

The path indicator 104 directs the communication device 150 to exchange information with the sound emission-reception apparatus 10, which is the other apparatus, and indicates to the path establisher 202 signal paths that are to be established.

The path establisher 202 establishes signal paths indicated by the path indicator 104. As will be described later, the signal paths refer to two or more paths originating from the distal-end input terminal 211, a microphone terminal 212, and a first input terminal 221, and reaching the distal-end output terminal 213, a loudspeaker terminal 214, and a first output terminal 231. Between starting points and end points of the signal paths, signals passing through the signal paths undergo computational processing, such as delay, addition and subtraction, and distribution.

The signal paths include paths through which signals are directly provided from starting points to end points and paths through which signals are indirectly provided from starting points to end points, elements such as a delay device or an adder intervening therebetween.

The microphone terminal 212 of a sound emission-reception apparatus 10 is a terminal to which a sound signal derived from sound received by the microphone 12 of the sound emission-reception apparatus 10 is input; and the loudspeaker terminal 214 of the sound emission-reception apparatus 10 is a terminal from which a sound signal is output toward the loudspeaker 18 of the sound emission-reception apparatus 10.

The first input terminal 221 is a terminal to which a sound signal from the other apparatus is input, and the first output terminal 231 is a terminal from which a sound signal is output toward the other apparatus.

The terminal here refers to a structure to which a signal is input or from which a signal is output. More specifically, the terminal is a signal pin, a part of a wire, or a connector, for example.

The microphone 12 and the loudspeaker 18 do not need to be provided inside the sound emission-reception apparatus 10, and may be provided outside of the sound emission-reception apparatus 10. Regardless of whether the microphone 12 and the loudspeaker 18 are provided inside or outside the sound emission-reception apparatus 10, the sound emission-reception apparatus 10 is provided with the microphone terminal 212, to which sound signals derived from sound received by the microphone 12 are input, and is provided with the loudspeaker terminal 214, from which sound signals are output toward the loudspeaker 18.

Next, operations of the system 1 will be described.

As described above, in this embodiment, there are two cases: a case in which a single sound emission-reception apparatus 10 among two sound emission-reception apparatuses 10 is connected to the network 400; and a case in which both of the two sound emission-reception apparatuses 10 are connected to the network 400.

There will be first described operations of the system 1 in a case where a single sound emission-reception apparatus 10 alone is connected to the network 400.

Figure 4:
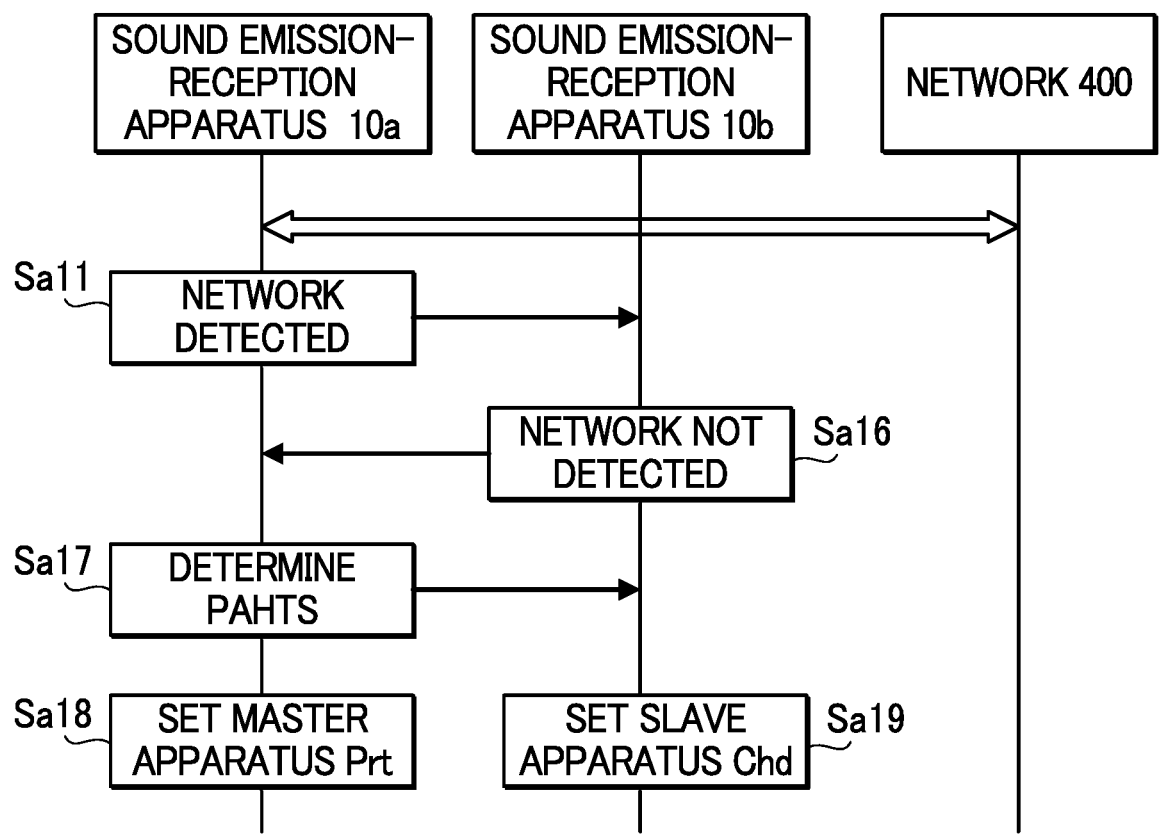
FIG. 4 is a diagram showing an operation sequence of the system.

FIG. 4 is a diagram showing an operation sequence of the system 1 in such case. FIG. 4 shows exchange of information between a sound emission-reception apparatus 10 connected to the network 400 and a sound emission-reception apparatus 10 not connected to the network 400. For descriptive purposes, "a" is appended to the tails of reference signs of elements in the sound emission-reception apparatus connected to the network 400, and "b" is appended to the tails of reference signs of elements in the sound emission-reception apparatus not connected to the network 400. For example, the reference sign of the sound emission-reception apparatus connected to the network 400 is "10a", and that of the path indicator therein is "104a". The reference sign of the sound emission-reception apparatus not connected to the network 400 is "10b", and that of the path indicator therein is "104b".

In the sound emission-reception apparatus 10a, after the detector 102a detects that the sound emission-reception apparatus 10a is connected to the network 400, the detector 102a provides the detection result to the path indicator 104a. After being provided with the detection result, the path indicator 104a directs the communication device 150a to transmit the detection result to the sound emission-reception apparatus 10b (step Sa11). Thus, the detection result that the sound emission-reception apparatus 10a is connected to the network is transmitted to the sound emission-reception apparatus 10b.

In the sound emission-reception apparatus 10b, after the communication device 150b receives the detection result of the detector 102a, the communication device 150b transfers the detection result to the path indicator 104b. The path indicator 104b, to which the detection result has been transferred, further receives a detection result of the detector 102b in the subject sound emission-reception apparatus 10b. Since the sound emission-reception apparatus 10b is not connected to the network 400, the path indicator 104b receives from the detector 102b the detection result that the sound emission-reception apparatus 10b is not connected to the network 400 (connection not detected). The path indicator 104b directs the communication device 150b to transmit the detection result of the detector 102b to the sound emission-reception apparatus 10a (step Sa16). In this way, the detection result that the sound emission-reception apparatus 10b is not connected to the network is transmitted to the sound emission-reception apparatus 10a.

In the sound emission-reception apparatus 10a, after the communication device 150a receives the detection result of the detector 102b, the communication device 150a transfers the detection result to the path indicator 104a. The path indicator 104a, to which the detection result has been transferred, directs the path establisher 202a to establish signal paths used in a master apparatus (prt), and directs the communication device 150a to transmit a notification (request) that signal paths of a slave apparatus (chd) used in the sound emission-reception apparatus 10b are to be established (step Sa17).

The path establisher 202a establishes the signal paths of the master apparatus (prt) in accordance with the direction (step Sa18).

In the sound emission-reception apparatus 10b, after the communication device 150b receives the notification that the paths of the slave apparatus (chd) are to be established, the communication device 150b transfers the notification to the path indicator 104b. The path indicator 104b, to which the notification has been transferred, directs the path establisher 202b to establish the signal paths of the slave apparatus (chd). In accordance with the direction, the path establisher 202b establishes the signal paths of the slave apparatus (chd) (step Sa19).

The master apparatus (prt) and the slave apparatus (chd) are different from each other with respect to the signal paths established by the corresponding path establisher 202. Depending on a situation such as a connection to the network 400, the master apparatus (prt) may be changed to the slave apparatus (chd), and the slave apparatus (chd) may be changed to the master apparatus (prt). In other words, each of the two sound emission-reception apparatuses 10 is assigned the role of either the master apparatus (prt) or the slave apparatus (chd) depending on the situation. When the situation changes, the role of each sound emission-reception apparatus 10 may be changed to the master apparatus (prt) or to the slave apparatus (chd).

Figure 5:
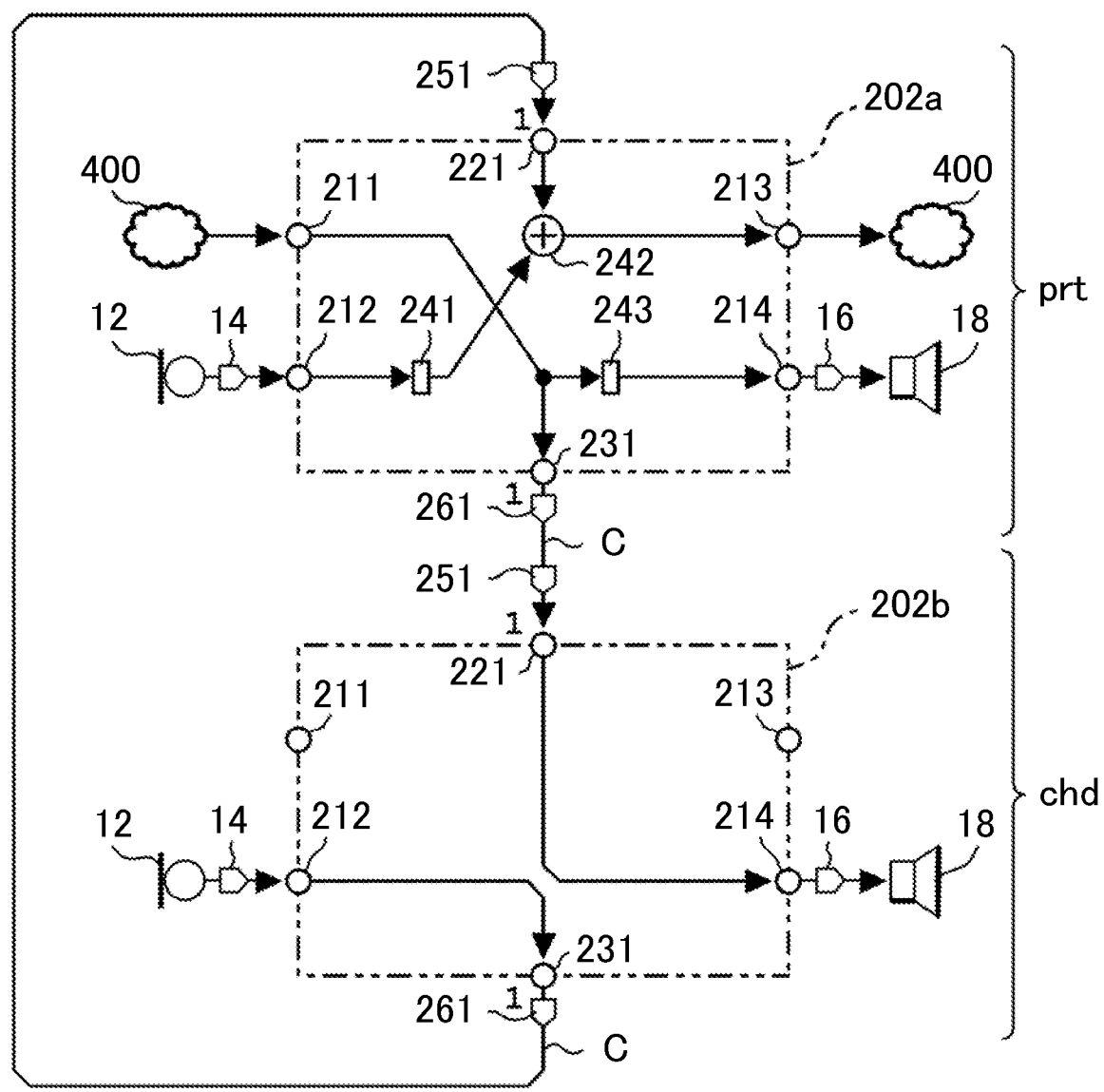
FIG. 5 is a diagram showing signal paths established by a path establisher in the sound emission-reception apparatus.

FIG. 5 is a diagram showing signal paths established in the path establisher 202a and in the path establisher 202b, and their connection status.

As shown in FIG. 5, the two sound emission-reception apparatuses 10 are connected via the cable C in the following manner. In the two sound emission-reception apparatuses 10, the cable C connects the first output terminal 231 of the path establisher 202a to the first input terminal 221 of the path establisher 202b, and connects the first output terminal 231 of the path establisher 202b to the first input terminal 221 of the path establisher 202a.

In this way, when connecting the two sound emission-reception apparatuses 10 with the cable C, the user need not consider which of the two sound emission-reception apparatuses 10 is to be the master apparatus (prt) or the slave apparatus (chd).

Strictly speaking, the cable C connects the output terminals of the DACs 261 to the input terminals of the ADCs 251. However, the DACs 261 and the ADCs 251 can be disregarded since the DACs 261 and the ADCs 251 are optional elements and do not affect the signal paths as described above.

As shown in FIG. 5, in the path establisher 202a of the master apparatus (prt), the following two signal paths are established. More specifically, in the path establisher 202a, there are established:

(A) a signal path through which a sound signal is provided to the distal-end output terminal 213, the sound signal being derived by an adder 242 adding together a sound signal that is input to the microphone terminal 212 and is delayed by a delay device 241 (first delay device) and a sound signal input to the first input terminal 221; and (B) a signal path through which a sound signal input to the distal-end input terminal 211 is provided to the first output terminal 231 and through which the sound signal that is input to the distal-end input terminal 211 and is delayed by a delay device 243 (second delay device) is provided to the loudspeaker terminal 214.

In the path establisher 202b of the slave apparatus (chd), the following two signal paths are established. More specifically, in the path establisher 202b, there are established:

(C) a signal path through which a sound signal input to the microphone terminal 212 is provided to the first output terminal 231; and (D) a signal path through which a sound signal input to the first input terminal 221 is provided to the loudspeaker terminal 214.

In the system 1, in a case where a single sound emission-reception apparatus 10 alone is connected to the network 400, the sound emission-reception apparatus 10 is set as the master apparatus (prt), and the other sound emission-reception apparatus 10 is set as the slave apparatus (chd). After the signal paths (A) and (B) are established in the path establisher 202a of the master apparatus (prt) and the signal paths (C) and (D) are established in the path establisher 202b of the slave apparatus (chd), the following operations are executed. A sound signal derived from sound received by the microphone 12 of the master apparatus (prt) and a sound signal derived from sound received by the microphone 12 of the slave apparatus (chd) are added together by the adder 242, and the resultant signal is output from the distal-end output terminal 213 of the master apparatus (prt) to another system at a distal-end (network 400). A sound signal that is provided by the other system and is input to the distal-end input terminal 211 of the master apparatus (prt) is distributed in the master apparatus (prt), and is output from the loudspeaker 18 of the master apparatus (prt) and from the loudspeaker 18 of the slave apparatus (chd) as sound. In this way, the system 1 is able to exchange sound signals with the other system at a distant location.

Figure 6:
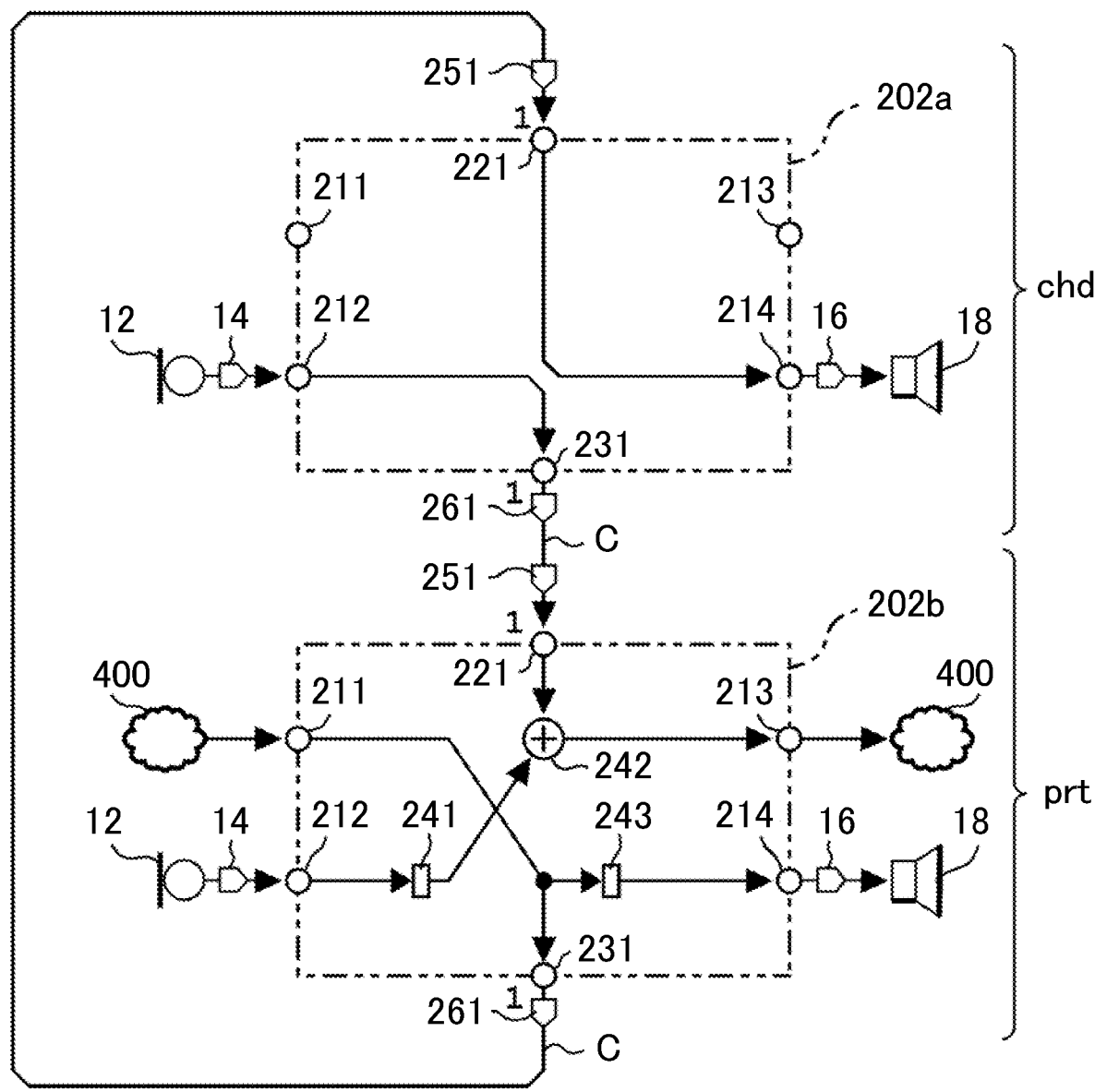
FIG. 6 is a diagram showing signal paths established by the path establisher in the sound emission-reception apparatus.

In FIG. 4 and FIG. 5, an exemplary case is shown in which the sound emission-reception apparatus 10a is connected to the network 400 and the sound emission-reception apparatus 10b is not connected to the network 400. In a case where the sound emission-reception apparatus 10b is connected to the network 400 and the sound emission-reception apparatus 10a is not connected to the network 400, only the setting as the master apparatus (prt) or the slave apparatus (chd) is switched as shown in FIG. 6, and the equivalent circuit of signal paths is the same as the equivalent circuit of signal paths shown in FIG. 5. Thus, even if the sound emission-reception apparatus 10b alone is connected to the network 400, there is no change in that sound signals derived from sounds received by the two microphones 12 are added together and a resultant signal is output toward the other system, and that sound signals provided by the other system are distributed and output from the two loudspeakers 18.

Figure 7:
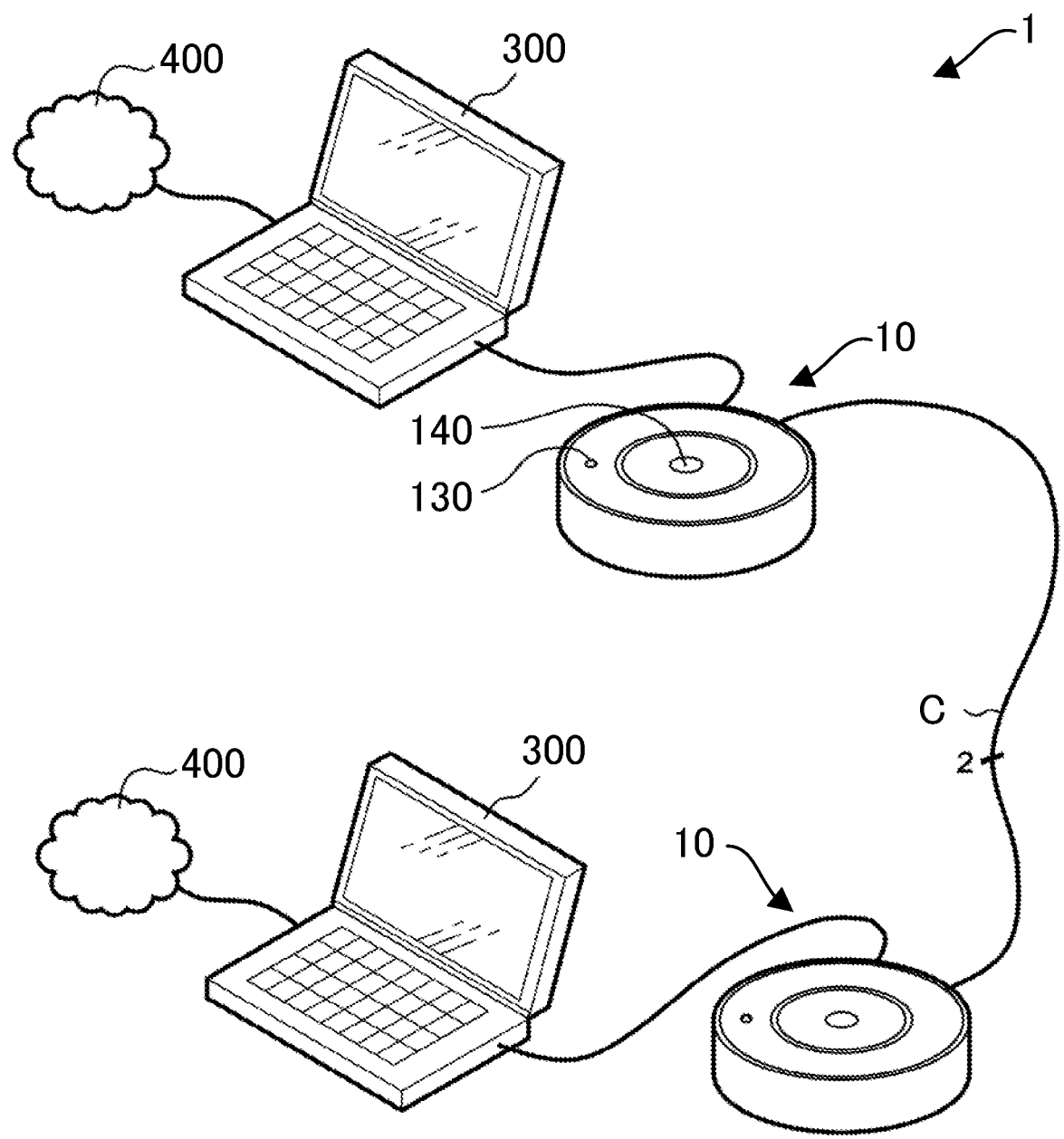
FIG. 7 is a diagram showing a system in which two sound emission-reception apparatuses are connected to a network.

Next, operations will be described in a case where both of the two sound emission-reception apparatuses 10 are connected to the network 400 as shown in FIG. 7.

Figure 8:
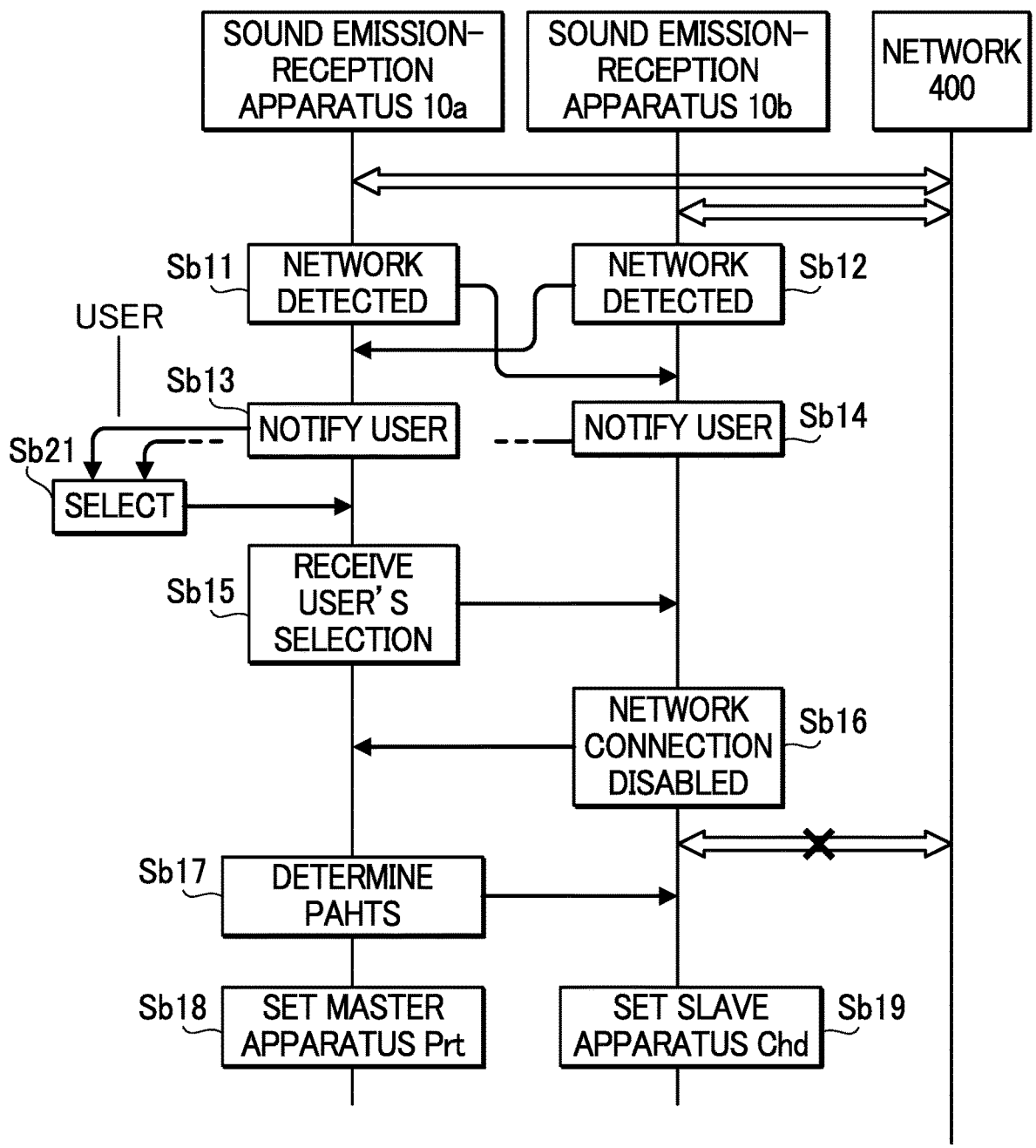
FIG. 8 is a diagram showing an operation sequence of the system.

FIG. 8 is a diagram showing an operation sequence of the system 1 in the present case.

Since the two sound emission-reception apparatuses 10 are both connected to the network 400, the "a" and "b" at the tail of the reference signs are used only to distinguish these two sound emission-reception apparatuses 10.

In the sound emission-reception apparatus 10a, the detector 102a detects connection to the network 400, and the path indicator 104a directs the communication device 150a to transmit the detection result to the sound emission-reception apparatus 10b (step Sb11). The above step is similar to step Sa11. Since the sound emission-reception apparatus 10b is also connected to the network 400, the detector 102b detects connection to the network 400 and provides the detection result to the path indicator 104b, and the path indicator 104b directs the communication device 150b to transmit the detection result to the sound emission-reception apparatus 10a (step Sb12).

As a result, information that the sound emission-reception apparatus 10a is connected to the network 400 is transmitted to the sound emission-reception apparatus 10b, and information that the sound emission-reception apparatus 10b is connected to the network 400 is transmitted to the sound emission-reception apparatus 10a.

In the sound emission-reception apparatus 10a, after receiving the information, the communication device 150a transfers the information to the path indicator 104a. Based on the transferred information and the detection result of the detector 102a, the path indicator 104a decides that the subject apparatus and the other apparatus are connected to the network 400.

Similarly, in the sound emission-reception apparatus 10b, after receiving the information, the communication device 150b transfers the information to the path indicator 104b. Based on the transferred information and the detection result of the detector 102b, the path indicator 104b decides that the subject apparatus and the other apparatus are connected to the network 400.

In this way, each of the sound emission-reception apparatuses 10a and 10b is able to recognize that both the subject apparatus and the other apparatus are connected to the network 400.

Having decided that both apparatuses are connected to the network 400, the path indicator 104a directs the notification device 130a to notify the user (step Sb13). Accordingly, the notification device 130a notifies the user that the sound emission-reception apparatus 10a is a candidate for selection, by causing an LED, for example, to blink.

Similarly, having decided that both apparatuses are connected to the network 400, the path indicator 104b directs the notification device 130b to notify the user (step Sb14). Accordingly, the notification device 130a notifies the user that the sound emission-reception apparatus 10b is a candidate for selection, by causing an LED, for example, to blink.

Consequently, the user is prompted to select one of the two sound emission-reception apparatuses 10.

The user operates either the input device 140a or the input device 140b to select one apparatus among the candidates for selection (step Sb21). Here, description will be given assuming that the user operates the input device 140a.

The reason that one apparatus is selected is to determine a network connection of which sound emission-reception apparatus 10 is to be enabled, among multiple (here two) sound emission-reception apparatuses 10 connected to the network 400.

After the user operates the input device 140a, the input device 140a outputs operation information indicative that the input device 140a has been operated. Having received the operation information, the path indicator 104a directs the notification device 130a to terminate notification to the user and directs the communication device 150a to transmit a result of the reception to the sound emission-reception apparatus 10b (step Sb15). As a result, the notification device 130a causes the LED to go out, and information indicating that the sound emission-reception apparatus 10a has been selected by the user is transmitted to the sound emission-reception apparatus 10b.

In the sound emission-reception apparatus 10b, after the communication device 150b receives the information, the information is transferred to the path indicator 104b. The path indicator 104b, to which the information has been transferred, directs the notification device 130b to terminate notification to the user, and directs the communication device 150b to transmit to the sound emission-reception apparatus 10a an announcement that the network connection at the subject sound emission-reception apparatus 10b will be disabled (step Sb16).

In this way, the announcement of disablement is transmitted to the sound emission-reception apparatus 10a. When disablement is announced, in the sound emission-reception apparatus 10b, a functional block, illustration of which is omitted in FIG. 3, such as the PC 300 or a functional block that controls connection to the network 400, releases the network connection.

In the sound emission-reception apparatus 10a, after the communication device 150a receives the announcement of disablement, the announcement of disablement is transferred to the path indicator 104a. The path indicator 104a, to which the announcement of disablement has been transferred, directs the path establisher 202a to establish signal paths of the master apparatus (prt) and directs the communication device 150a to transmit to the sound emission-reception apparatus 10b a notification that signal paths of the slave apparatus (chd) are to be established (step Sb17).

Afterward, similarly to FIG. 4, the path establisher 202a establishes the signal paths of the master apparatus (prt) (step Sb18), and the path establisher 202b establishes the signal paths of the slave apparatus (chd) (step Sb19).

Figure 9:
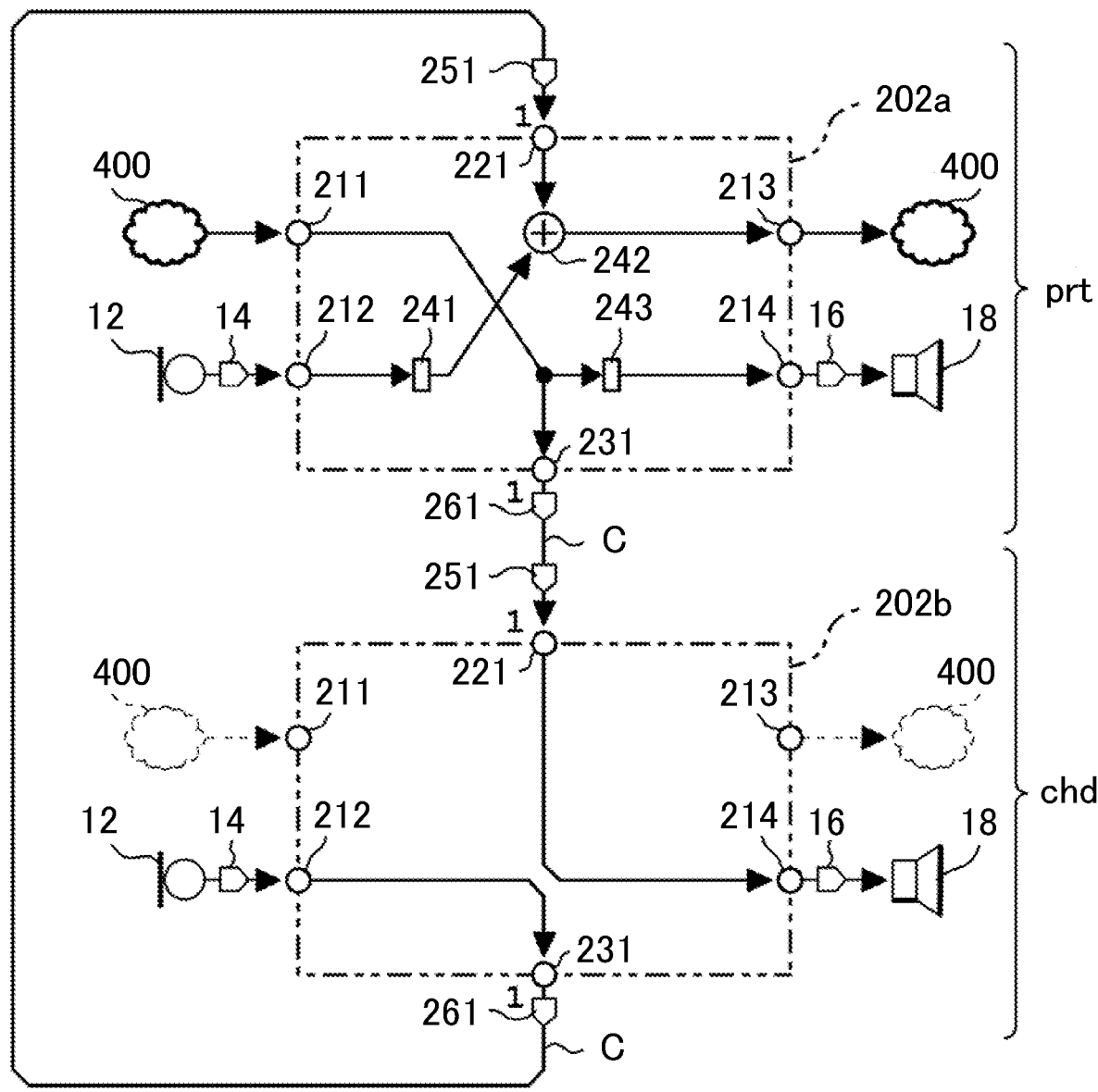
FIG. 9 is a diagram showing signal paths established by the path establisher in the sound emission-reception apparatus.

FIG. 9 is a diagram showing signal paths established in the path establishers 202a and 202b and connection statuses of the signal paths. Description of FIG. 5 also applies to FIG. 9, except that the network 400 connected to the slave apparatus (chd) is disabled as shown by the dashed line.

In this case, when two sound emission-reception apparatuses 10 are connected to the network 400 in the system 1, the selected sound emission-reception apparatus 10a is set as the master apparatus (prt), and the other sound emission-reception apparatus 10b is set as the slave apparatus (chd). Accordingly, similarly to a case where a single sound emission-reception apparatus 10 is connected to the network 400, it is possible to exchange sound signals with the other system at a distant location.

In this example, the network connection is enabled for a sound emission-reception apparatus 10 for which the input device 140 has been operated. Alternatively, the network connection may be disabled for a sound emission-reception apparatus 10 for which the input device 140 has been operated. In this configuration, a sound emission-reception apparatus 10 may receive from another sound emission-reception apparatus 10 an announcement of disablement of the network connection, and may enable the network connection after the input device 140 detects the absence of an operation to disable the network connection within a predetermined time.

Examples of notification to the user are not limited to blinking of the LED. For example, the notification device 130 may be a matrix display capable of displaying characters and may display a message prompting the user to make a selection, or the notification device 130 may be a voice synthesizing device and may synthesize and output a voice message prompting the user to make a selection, or these forms may be used in combination as appropriate. That is, a manner of notification is not limited to a display (sight), and notification may be achieved by any means that can be sensed by any of the five senses, such as sound (hearing) and vibration (touch).

Furthermore, the notification device 130 and the input device 140 may be superimposed on each other by use of a matrix display and a touch panel, for example.

In this embodiment, the sound emission-reception apparatus 10 transmits sound signals with the cable C in analog format so that the configuration of the sound input-output apparatus 10 is simplified. In other words, considering that the path establisher 202, which establishes signal paths of the master apparatus (prt) or the slave apparatus (chd), is realized by computational processing by the DSP 200, transmission of sound signals in digital format will require synchronization between computational processing and signal transmission in the master apparatus (prt) and computational processing and signal transmission in the slave apparatus (chd), thereby resulting in a complex configuration.

As a result of each sound emission-reception apparatus 10 transmitting sound signals in analog format as in the present embodiment, each sound emission-reception apparatus 10 can independently execute its computational processing, thus making it possible to omit an element for synchronization.

Sound signals require to be D/A-converted for output, and sound signals require to be A/D-converted for input. Accordingly, sound signals will be delayed for a length of time required for the conversion.

For example, a sound signal derived from sound received by the microphone 12 of the slave apparatus (chd) passes through the DAC 261 of the slave apparatus (chd) and the ADC 251 of the master apparatus (prt). Thus, compared to a sound signal derived from sound received by the microphone 12 of the master apparatus (prt), there will be a signal delay corresponding to a length of time required for D/A conversion and A/D conversion. Similarly, a sound signal output toward the loudspeaker 18 of the slave apparatus (chd) passes through the DAC 261 of the master apparatus (prt) and the ADC 251 of the slave apparatus (chd). Thus, compared to a sound signal output toward the loudspeaker 18 of the master apparatus (prt), there will be signal delay corresponding to the length of time required for D/A conversion and A/D conversion.

In view of the foregoing, in the present embodiment, a delay time of the delay device 241 is set to be equal to the sum of a delay time that results from analog conversion in the DAC 261 and a delay time that results from digital conversion in the ADC 251. Additionally, a delay time of the delay device 243 is set to be equal to the sum of a delay time that results from analog conversion in the DAC 261 and a delay time that results from digital conversion in the ADC 251.

In this way, a sound signal derived from sound received by the microphone 12 of the master apparatus (prt) and a sound signal derived from sound received by the microphone 12 of the slave apparatus (chd) are delayed for nearly an equal length of time. The sound signal derived from sound received by the microphone 12 of the master apparatus (prt) and the sound signal derived from sound received by the microphone 12 of the slave apparatus (chd) are added together with little difference in timing and the resultant signal is output toward the network 400. Accordingly, deterioration of the sound signal can be prevented. Similarly, the sound signal output toward the loudspeaker 18 of the master apparatus (prt) and the sound signal output toward the loudspeaker 18 of the slave apparatus (chd) are delayed for nearly an equal length of time. Thus, it is possible to reduce a difference between timings at which sounds are output from the each of the loudspeakers 18.

Since the microphone 12 and the loudspeaker 18 are close to each other in the sound emission-reception apparatus 10, an echo is likely to be generated. An exemplary application for suppressing such an echo will now be described.

Figure 10:
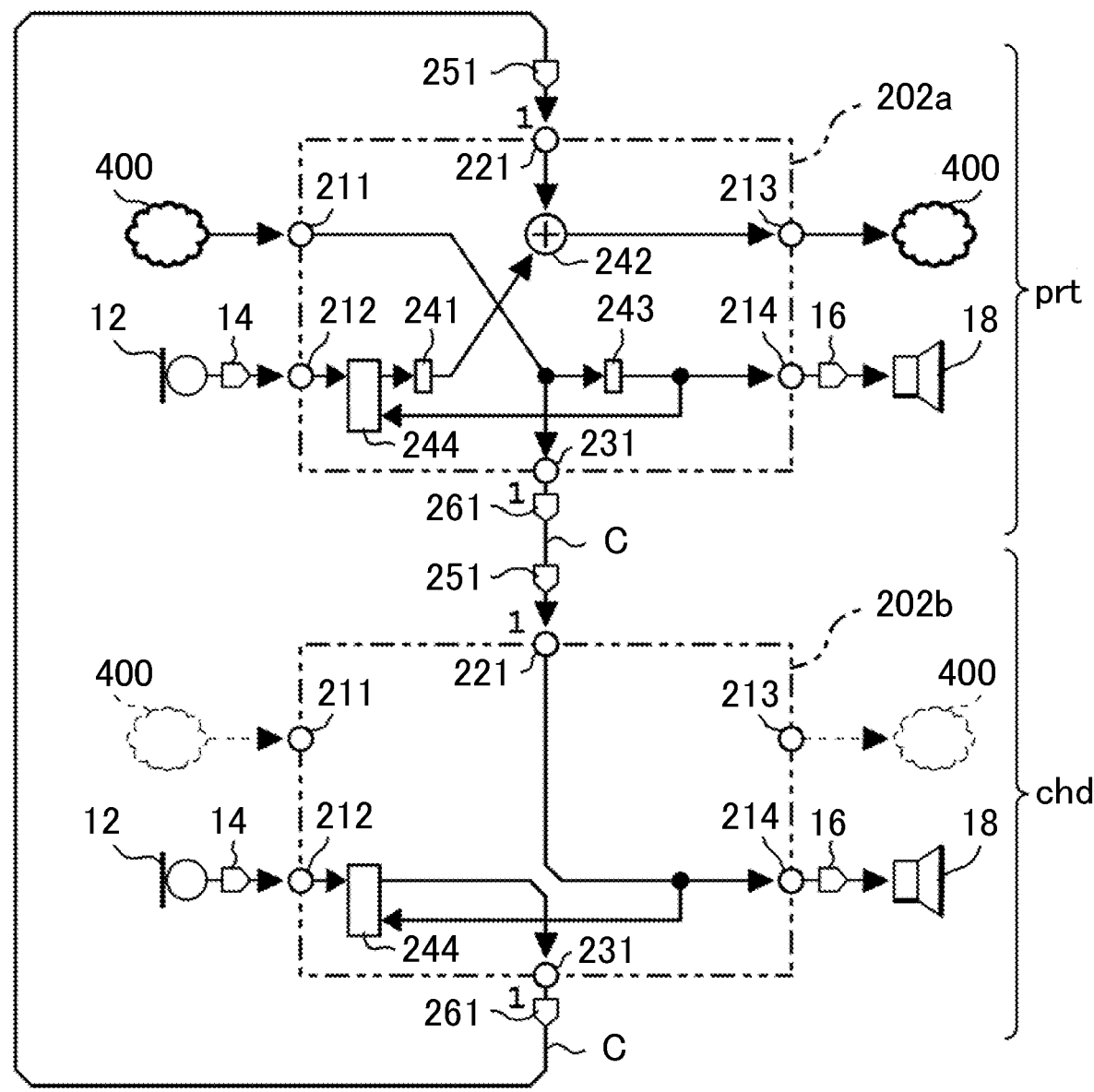
FIG. 10 is a diagram showing signal paths established by the path establisher in the sound emission-reception apparatus according to an exemplary application.

FIG. 10 is a diagram showing signal paths established in the path establishers 202a and 202b of sound emission-reception apparatuses 10 according to an exemplary application of the first embodiment. As shown in the figure, an echo canceller 244 is provided in each of the master apparatus (prt) and the slave apparatus (chd).

The echo canceller 244 first generates a simulated echo component by filtering a sound signal output toward the loudspeaker terminal 214 with filter coefficients that accord with an estimated transfer function of acoustic space from the loudspeaker 18 to the microphone 12. The echo canceller 244 secondly subtracts the generated simulated echo component from a sound signal input to the microphone terminal 212 to output the resultant signal.

By use of the echo canceller 244, even if sound output from the loudspeaker 18 seeps to and is received by the microphone 12, the seeping component is subtracted. Consequently, effects of the seeping sound are minimized and deterioration of a sound signal derived from the received sound is suppressed.

In the first embodiment, in a case where two sound emission-reception apparatuses 10 are connected to the network 400, which network connection is to be enabled is determined by an operation performed by the user on the input device 140. Alternatively, a different method may be employed for determination. For example, one apparatus may be determined randomly from among sound emission-reception apparatuses 10 connected to the network 400. In a method for random determination, the path indicator 104, for example, may cause a single random number to be generated in each of two sound emission-reception apparatuses 10 and cause the communication device 150 to transmit the generated random number. The path indicator 104 of a sound emission-reception apparatus 10 compares a random number generated in the subject apparatus with a random number that is generated in the other sound emission-reception apparatus 10 and is received by the communication device 150. In a case where the random number generated in the subject apparatus is larger than the random number generated in the other apparatus (a single apparatus in this example), for example, the subject apparatus is determined to be the master apparatus (prt) and the other apparatus is determined to be the slave apparatus (chd). If the subject apparatus is determined to be the master apparatus (prt), the network connection of the subject apparatus is enabled, and if the other apparatus is determined to be the slave apparatus (chd), the network connection of the other apparatus is disabled.

By the sound signal processing device according to the above embodiment, it is possible to change a signal path established by the path establisher depending on circumstance. For example, it is possible to switch from a signal path used for a master apparatus that connects to the network to a signal path used for a slave apparatus subordinate to the master apparatus. Accordingly, there is no need for either a separate dedicated device that functions as a master apparatus or for a separate dedicated device that serves as a slave apparatus. In other words, according to the above embodiment, without need for a device like a base, a sound signal processing device included in a sound emission-reception apparatus can be connected to a network.

Second Embodiment

Next, a sound emission-reception apparatus according to a second embodiment will be described. In the second embodiment, the number of sound emission-reception apparatuses 10 forming the system 1 is not limited to two, and the system 1 may be expanded to include two or more sound emission-reception apparatuses 10.

Figure 11:
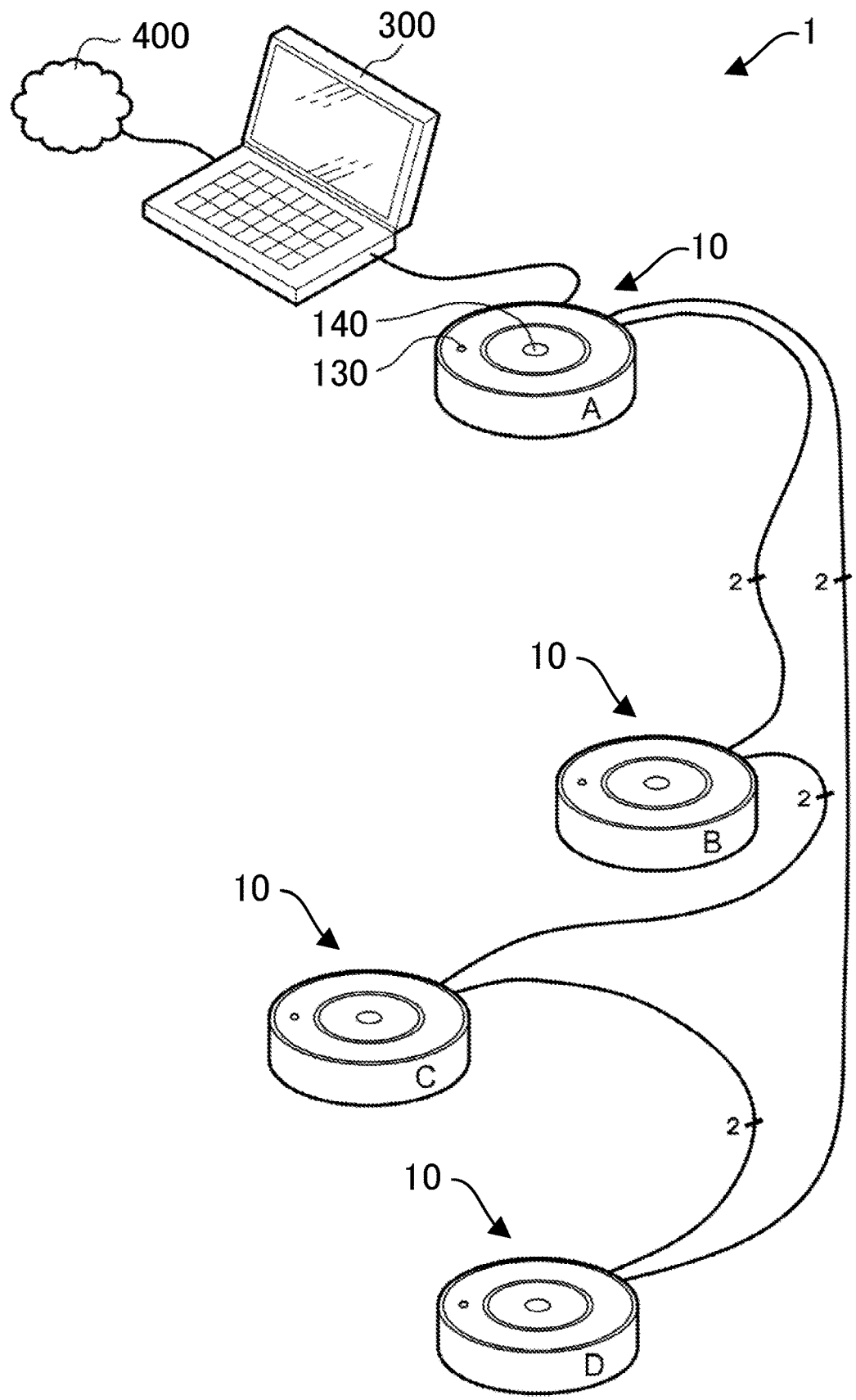
FIG. 11 is a diagram showing a system that includes a sound emission-reception apparatus according to a second embodiment.

FIG. 11 is a diagram showing a configuration of a system that includes sound emission-reception apparatuses according to the second embodiment. In the illustrated example, the number of sound emission-reception apparatuses constituting the system 1 is four.

Similarly to the first embodiment, each sound emission-reception apparatus 10 according to the second embodiment includes a notification device 130 and an input device 140, and includes a built-in microphone 12 and a built-in loudspeaker 18.

In a case where the four sound emission-reception apparatuses 10 are referred to as A, B, C, and D in order to distinguish them, the four sound emission-reception apparatuses 10 are connected in a manner of A→B→C→D→(A) where "→" represents connection by a cable C. In other words, the four sound emission-reception apparatuses 10 are circularly connected by four cables C.

Similarly to the first embodiment, in the second embodiment, a single cable C transmits two sound signals.

Among the four sound emission-reception apparatuses 10, a single sound emission-reception apparatus 10 (the "A" in FIG. 11) is connected to the network 400 via the PC 300, and exchanges sound signals via the network 400 with other systems (illustration omitted) present in other locations.

A hardware configuration of a sound emission-reception apparatus 10 according to the second embodiment differs from that in the first embodiment in the surroundings of the DSP 200. Accordingly, in the second embodiment, description will be given focusing on functional blocks of the surroundings of the DSP 200.

Figure 12:
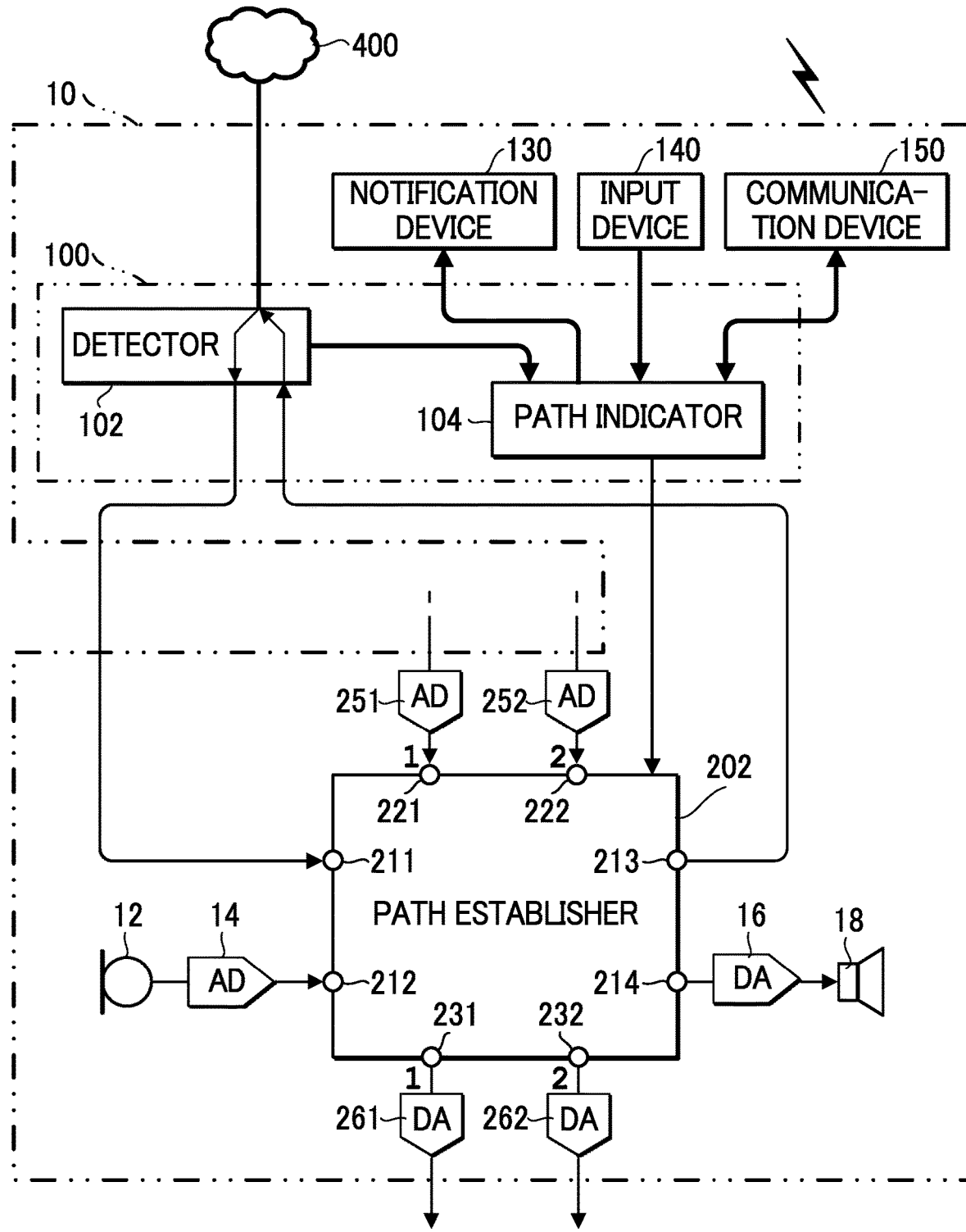
FIG. 12 is a diagram showing functional blocks of the sound emission-reception apparatus.

FIG. 12 is a diagram showing functional blocks of a sound emission-reception apparatus 10 according to the second embodiment.

A sound emission-reception apparatus 10 according to the second embodiment differs from that of the first embodiment (see FIG. 3) in that there are provided in the DSP 200 (path establisher 202) a second input terminal 222 in addition to the first input terminal 221, and a second output terminal 232 in addition to the first output terminal 231.

In the description, ordinal numbers, such as "first" and "second", appearing in names of elements are used to distinguish two or more elements, and are not intended to define their order. For example, with respect to the first input terminal 221 and the second input terminal 222, one of two input terminals is referred to as the first input terminal 221 and the other one is referred to as the second input terminal 222.

An ADC 252 converts a proximal-end sound signal into a digital signal and provides it to the second input terminal 222, and a DAC 262 converts a sound signal output from the second output terminal 232 into an analog signal and outputs it toward another apparatus at a proximal-end.

Next, operations in the second embodiment will be described.

In the second embodiment, there are two possible cases: a case where only a single sound emission-reception apparatus 10 among the multiple (here four) sound emission-reception apparatuses 10 is connected to the network 400; and a case where two or more sound emission-reception apparatuses 10 are connected to the network 400.

Here, description will be given first of operations in a case where only a single sound emission-reception apparatus 10 is connected to the network 400.

Figure 13:
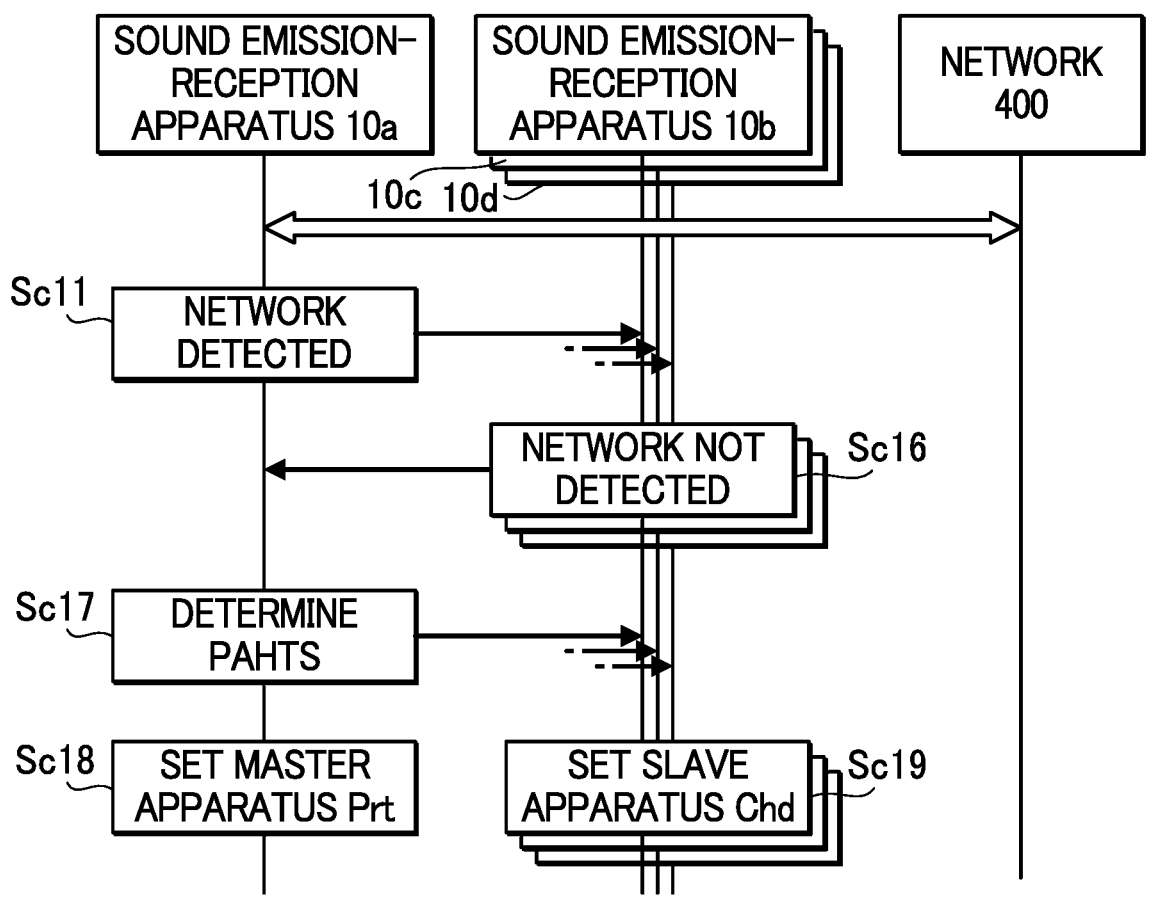
FIG. 13 is a diagram showing an operation sequence of the system.

FIG. 13 is a diagram showing an operation sequence of the system 1 in this case. For descriptive purposes, "a" is appended to the tail of the reference sign of a sound emission-reception apparatus connected to the network 400, and "b", "c", and "d" are appended to the tails of the reference signs of sound emission-reception apparatuses not connected to the network 400.

The operation sequence shown in this figure is essentially the same as that shown in FIG. 4, with the exception that the number of the sound emission-reception apparatuses 10 not connected to the network 400 is greater in FIG. 13 than in FIG. 4.

In the sound emission-reception apparatus 10a, after the detector 102a detects a connection to the network 400, the detection result is transmitted to the other sound emission-reception apparatuses 10b, 10c, and 10d (step Sc11). Each of the sound emission-reception apparatuses 10b, 10c, and 10d, which have received the detection result, transmits to the sound emission-reception apparatus 10a a detection result (network not detected) indicating that the subject apparatus is not connected to the network 400 (step Sc16). Having received the result "network not detected" from each of the other apparatuses, the sound emission-reception apparatuses 10b, 10c, and 10d, the sound emission-reception apparatus 10a determines signal paths in itself and in other apparatuses (step Sc17). The sound emission-reception apparatus 10a sets itself as the master apparatus (prt) (step Sc18) and sets the other apparatuses as slave apparatuses (chd) (step Sc19).

Figure 14:
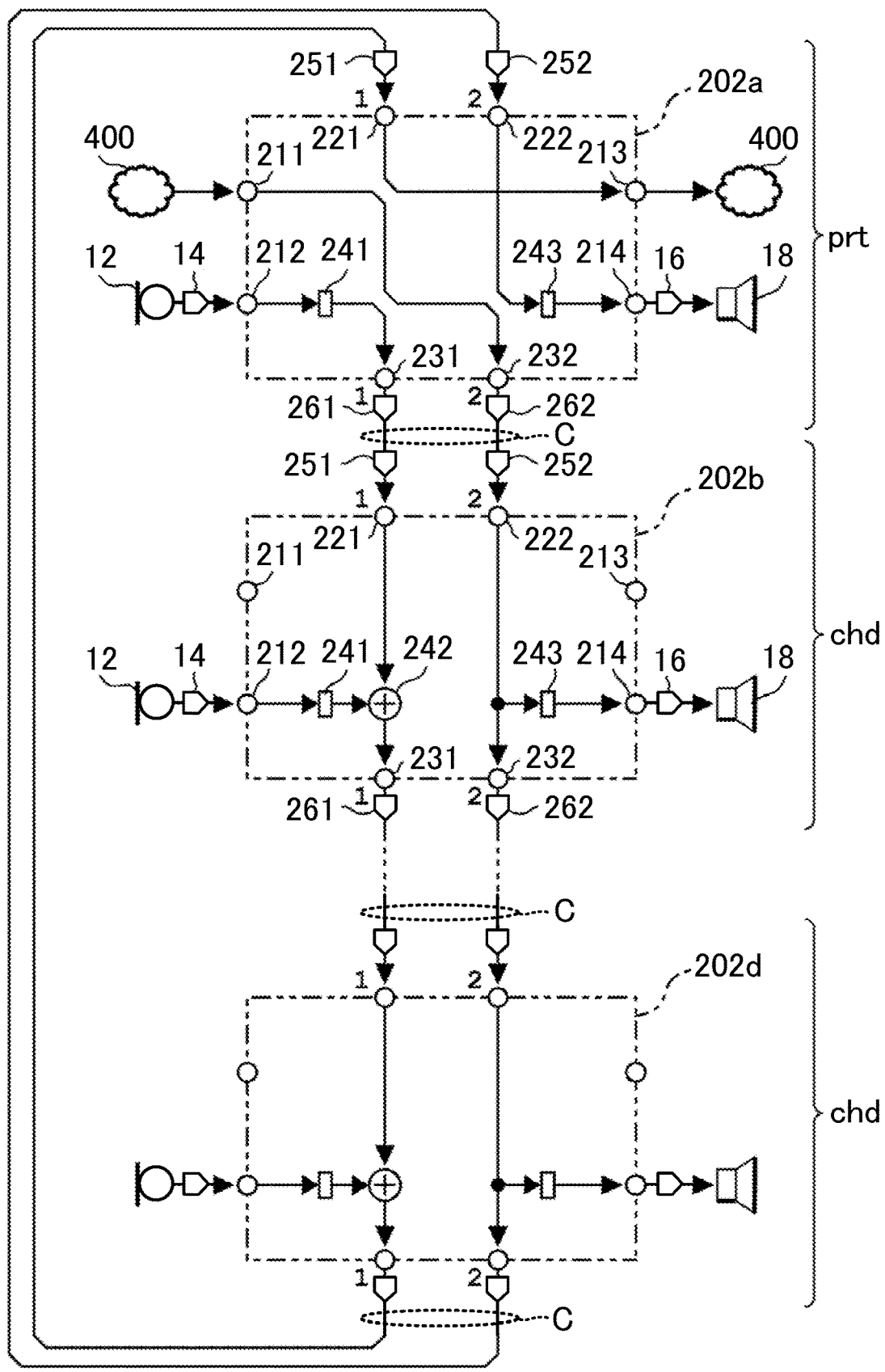
FIG. 14 is a diagram showing signal paths established by the path establisher in the sound emission-reception apparatus.

FIG. 14 is a diagram showing signal paths established in the path establishers 202a, 202b, . . . , and 202d, and connection statuses of the signal paths in the second embodiment. In FIG. 14, illustration of the path establisher 202c is omitted for descriptive purposes.

As shown in FIG. 14, the four sound emission-reception apparatuses 10 are connected by cables C in the following manner. The first output terminal 231 of an apparatus and the first input terminal 221 of another apparatus are connected by a cable C; and the second output terminal 232 of the apparatus and the second input terminal 222 of the other apparatus are connected by a cable C. All the sound emission-reception apparatuses 10 are circularly connected by cables C, as described above.

Accordingly, when connecting the four sound emission-reception apparatuses 10 by the cables C, the user need not consider which of the master apparatus (prt) or the slave apparatus (chd) each of the four sound emission-reception apparatuses 10 is going to form.

Similarly to the first embodiment, the DAC 261, the DAC 262, the ADC 251, and the ADC 252 are disregarded in describing connections with the cables C.

In the path establisher 202a of the master apparatus (prt), four signal paths as described below are established.

Specifically, in the path establisher 202a of the master apparatus (prt), there are established:
(A) a signal path through which a sound signal that is input to the microphone terminal 212 and is delayed by the delay device 241 is provided to the first output terminal 231;
(B) a signal path through which a sound signal input to the distal-end input terminal 211 is provided to the second output terminal 232;
(C) a signal path through which a sound signal input to the first input terminal 221 is provided to the distal-end output terminal 213; and
(D) a signal path through which a sound signal that is input to the second input terminal 222 and is delayed by the delay device 243 is provided to the loudspeaker terminal 214.

In the path establisher 202b of a slave apparatus (chd), two signal paths described below are established. Specifically, in the path establisher 202b, there are established:
(E) a signal path through which a signal is provided to the first output terminal 231, wherein the signal is derived by the adder 242 adding together a sound signal input to the microphone terminal 212 and delayed by the delay device 241, and a sound signal input to the first input terminal 221; and
(F) a signal path through which a sound signal input to the second input terminal 222 is provided to the second output terminal 232 and through which the sound signal is provided, after being delayed by the delay device 243, to the loudspeaker terminal 214.

Here, description is given of the path establisher 202b as representative of those in the slave apparatus (chd). Similar signal paths are established in the path establishers 202c and 202d.

In a case where a single sound emission-reception apparatus 10 alone out of the four apparatuses is connected to the network 400, this sound emission-reception apparatus 10 is set as the master apparatus (prt) and the other three apparatuses are set as the slave apparatuses (chd). The following operations are executed after signal paths (A), (B), (C), and (D) are established in the path establisher 202a of the master apparatus (prt) and signal paths (E) and (F) are established in each of the path establishers 202b, 202c, and 202d of the slave apparatuses (chd).

A sound signal derived from sound received by the microphone 12 of the single master apparatus (prt) and sound signals derived from sounds received by the microphones 12 of the three slave apparatuses (chd) are added together by the adders 242, and the resultant signal is output from the distal-end output terminal 213 of the master apparatus (prt) toward the network 400. A sound signal that is provided from another system and is input to the distal-end input terminal 211 of the master apparatus (prt) is distributed to the three slave apparatus (chd) and to the single master apparatus (prt) sequentially, and sound corresponding to the sound signal is output from each of the loudspeakers 18 of the three slave apparatus (chd) and also from the loudspeaker 18 of the single master apparatus (prt). In this way, the system 1 is able to exchange sound signals with another system at a distant location.

Next, description will be given of operations in a case where two or more sound emission-reception apparatuses 10 among the multiple apparatuses are connected to the network 400.

Figure 15:
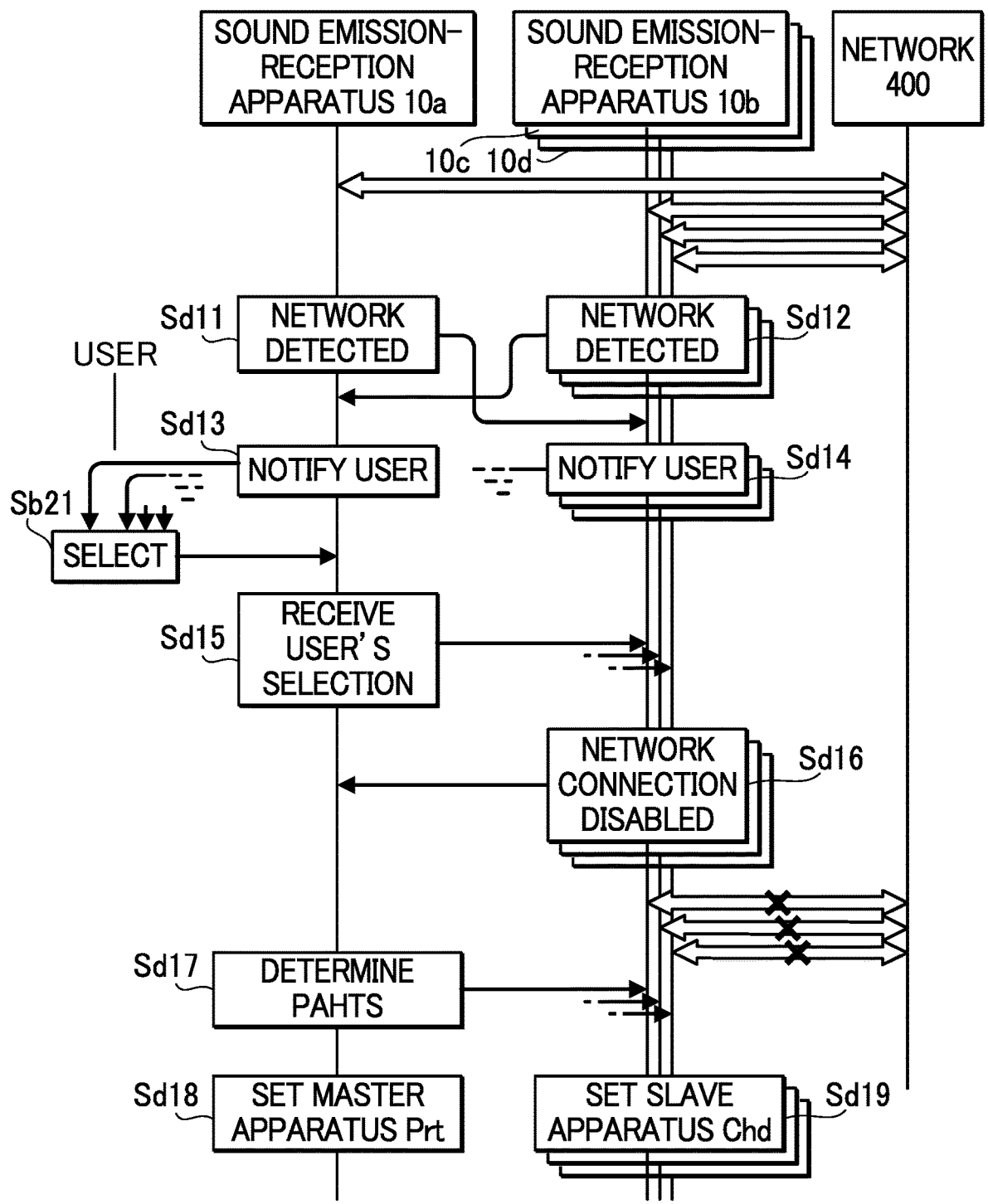
FIG. 15 is a diagram showing an operation sequence of a system in which two or more sound emission-reception apparatuses are connected to the network.

FIG. 15 is a diagram showing an operation sequence of the system in this case.

Although all of the sound emission-reception apparatuses 10 are connected to the network 400 in FIG. 15, it will suffice if two or more apparatuses are connected to the network 400. The "a", "b", "c", and "d" at the tails of the reference signs are used to distinguish the four apparatuses.

As shown in FIG. 15, the operation sequence is essentially the same as that shown in FIG. 8, with the exception that the number of the sound emission-reception apparatuses 10 connected to the network 400 is greater in FIG. 15 than in FIG. 8.

In the sound emission-reception apparatus 10a, after the detector 102a detects a connection to the network 400, the detection result is transmitted to the other sound emission-reception apparatuses 10b, 10c, and 10d (step Sd11). Each of the other sound emission-reception apparatuses 10b, 10c, and 10d also detects a connection to the network 400, and transmits the detection result to the sound emission-reception apparatuses 10 other than itself (step Sd12).

In the sound emission-reception apparatus 10a, in a case where at least one of the other sound emission-reception apparatus 10b, 10c, or 10d is connected to the network 400, the LED of the notification device 130a is caused to blink so as to notify the user that the sound emission-reception apparatus 10a is a candidate for selection (step Sd13).

In each of the sound emission-reception apparatuses 10b, 10c, and 10d, in a case where a sound emission-reception apparatus 10 other than the subject apparatus is connected to the network 400, the LED is caused to blink so as to notify the user that the subject apparatus is a candidate for selection (step Sd14).

Among sound emission-reception apparatuses 10 in which the LEDs are blinking, the user operates one of the input device 140a, 140b, 140c, or 140d to select a single apparatus (step Sb21). Here, description will be given assuming that the user operates the input device 140a.

Having received an operation by the user, the sound emission-reception apparatus 10a causes the LED to go out and transmits to the other sound emission-reception apparatuses 10b, 10c, and 10d information indicating that the sound emission-reception apparatus 10a has been selected by the user (step Sd15). Having received a result indicating that the operation has been received, each of the other sound emission-reception apparatuses 10b, 10c, and 10d causes the LED to go out and executes an operation to disable the network connection, and transmits to the sound emission-reception apparatus 10a announcement of disablement (step Sd16).

After the sound emission-reception apparatus 10a receives from all of the other sound emission-reception apparatuses 10b, 10c, and 10d the announcement of disablement (or a detection result indicating that the network is not detected), the sound emission-reception apparatus 10a determines signal paths in itself and in other apparatuses (step Sd17). The sound emission-reception apparatus 10a sets itself as the master apparatus (prt) (step Sd18) and sets other apparatuses as the slave apparatuses (chd) (step Sd19).

In this way, also in a case where the four sound emission-reception apparatuses 10 are connected to the network 400, signal paths as shown in FIG. 14 are established in the path establishers 202a, 202b, . . . , and 202d, and the system 1 is able to exchange sound signals with other systems.

In this example, a case is described where all the four sound emission-reception apparatuses 10 are connected to the network 400. However, it is sufficient so long as two or more sound emission-reception apparatuses 10 are connected to the network 400. Here, a sound emission-reception apparatus 10 that is not connected to the network 400 transmits a result indicating that the network is not detected and the LED in the corresponding notification device 130 is not caused to blink. Accordingly, the sound emission-reception apparatus 10 not connected to the network 400 is excluded from candidates for selection by the user and is set as a slave apparatus (chd).

Figure 16:
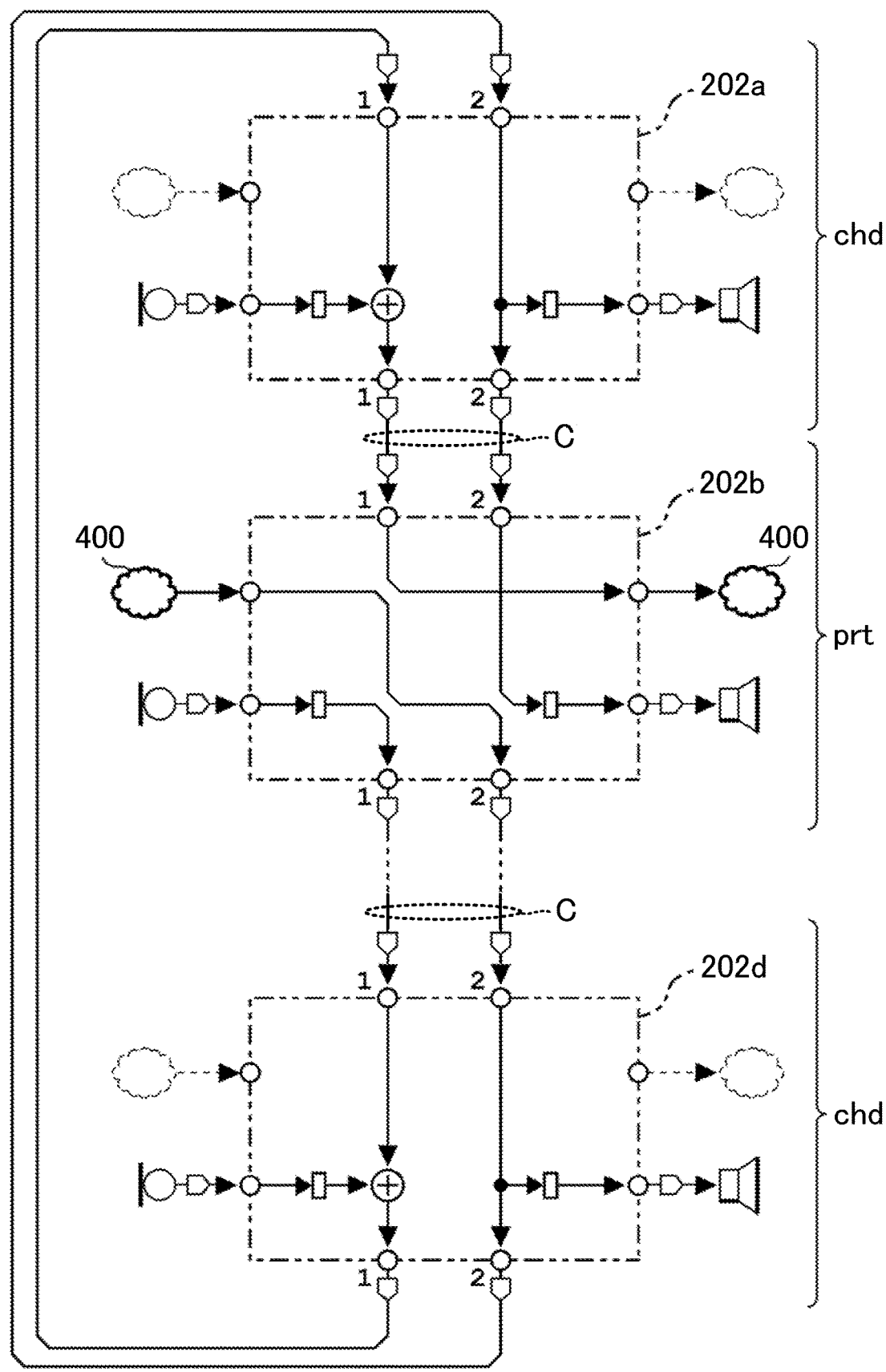
FIG. 16 is a diagram showing signal paths established by the path establisher in the sound emission-reception apparatus.

Here, an example is described where the sound emission-reception apparatus 10a has been selected. However, even when the sound emission-reception apparatus 10b, for example, is selected as shown in FIG. 16, the equivalent circuit of signal paths is the same as the equivalent circuit of signal paths shown in FIG. 14.

Furthermore, in the second embodiment, in each path establisher 202, the delay time of the delay device 241 is set to "n·d", and the delay time of the delay device 243 is set to "(m−n)d". Here, the denotation "·" represents multiplication.

The denotation "m" represents the number of sound emission-reception apparatuses 10 in the system 1. The denotation "n" represents a number of the subject apparatus when counted from the master apparatus (prt) along the flow of signals in the ring connection, in a case where the subject apparatus is a slave apparatus (chd). In other words, the "n" represents the number of times of passing through a combination of a DAC 261 (or 262) and an ADC 251 (or 252), starting from the master apparatus (prt). In a case where the subject apparatus is the master apparatus (prt), the denotation "n" has the same value as the denotation "m". The denotation "d" represents a sum of the delay time resulting from analog conversion at a single DAC 261 (or 262) and the delay time resulting from digital conversion at a single ADC 251 (or 252).

In the example shown in FIG. 14, the denotation "m" is "4". Since the path establisher 202a connected to the network 400 is set as the master apparatus (prt), the denotation "n" with respect to the path establisher 202a is "4", which is the same value as "m". Accordingly, in the path establisher 202a, the delay time for the delay device 241 is set to "0" and the delay time of the delay device 243 is set to "0".

The denotation "n" for the path establisher 202b, 202c, and 202d are respectively "1", "2", and "3".

Accordingly, in the path establisher 202b, the delay time of the delay device 241 is set to "1·d" and the delay time of the delay device 243 is set to "3·d". Similarly, in the path establisher 202c, the delay time of the delay device 241 is set to "2·d" and the delay time of the delay device 243 is set to "2·d". In the path establisher 202d, the delay time of the delay device 241 is set to "3·d" and the delay time of the delay device 243 is set to "1·d".

In this way, a sound signal generated by the microphone 12 of the master apparatus (prt) and sound signals generated by the microphones 12 of the slave apparatuses (chd) are added together sequentially, with the sound signals generated in the master apparatus (prt) and in the slave apparatuses (chd) being delayed for nearly an equal length of time. Consequently, effects of delays resulting from DA-conversion and AD-conversion in the sound signal output toward the network 400 can be minimized.

Similarly, sound signals output toward the loudspeakers 18 of the slave apparatuses (chd) and a sound signal output toward the loudspeaker 18 of the master apparatus (prt) are delayed for nearly an equal length of time. Consequently, effects of delays resulting from DA-conversion and AD-conversion in the sound output from each loudspeaker 18 can be minimized.

The denotation "n" for a sound emission-reception apparatus set as a slave apparatus (chd) may be set by the user, or may be decided by the sound emission-reception apparatus 10 in the following manner. For example, each of the communication devices 150 of the slave apparatuses (chd) communicates with the communication device 150 of the master apparatus (prt), and can decide "n" by detecting a difference between a time of transmission of a test signal from the master apparatus (prt) and a time of arrival of the test signal at the subject apparatus (i.e., time required for DA-conversion and AD-conversion).

In the second embodiment described above, the system 1 is able to exchange sound signals with other systems at distant locations. According to the second embodiment in particular, even when a meeting room is large or a number of participants is large, many sound emission-reception apparatuses 10 can be installed for distribution over a wide range, as long as the sound emission-reception apparatuses 10 are circularly connected by cables C.

Furthermore, in the second embodiment, in a case where multiple sound emission-reception apparatuses 10 are connected to the network 400, the user can select the network connection of one of the apparatuses that is to be enabled and the network connections of the other apparatuses that are to be disabled. In this way, the usability to the user can be improved.

In the second embodiment, a case is described where the number of connected apparatuses is "4". However, the number of connected apparatuses may be any number equal to or greater than "2". When the number of connected apparatuses is "2", however, the connection configuration by the cables C will be almost the same as that in the first embodiment, and there will be no advantage in having a ring connection. Thus, it is preferable that the number of connected apparatuses be "3" or more.

Figure 17:
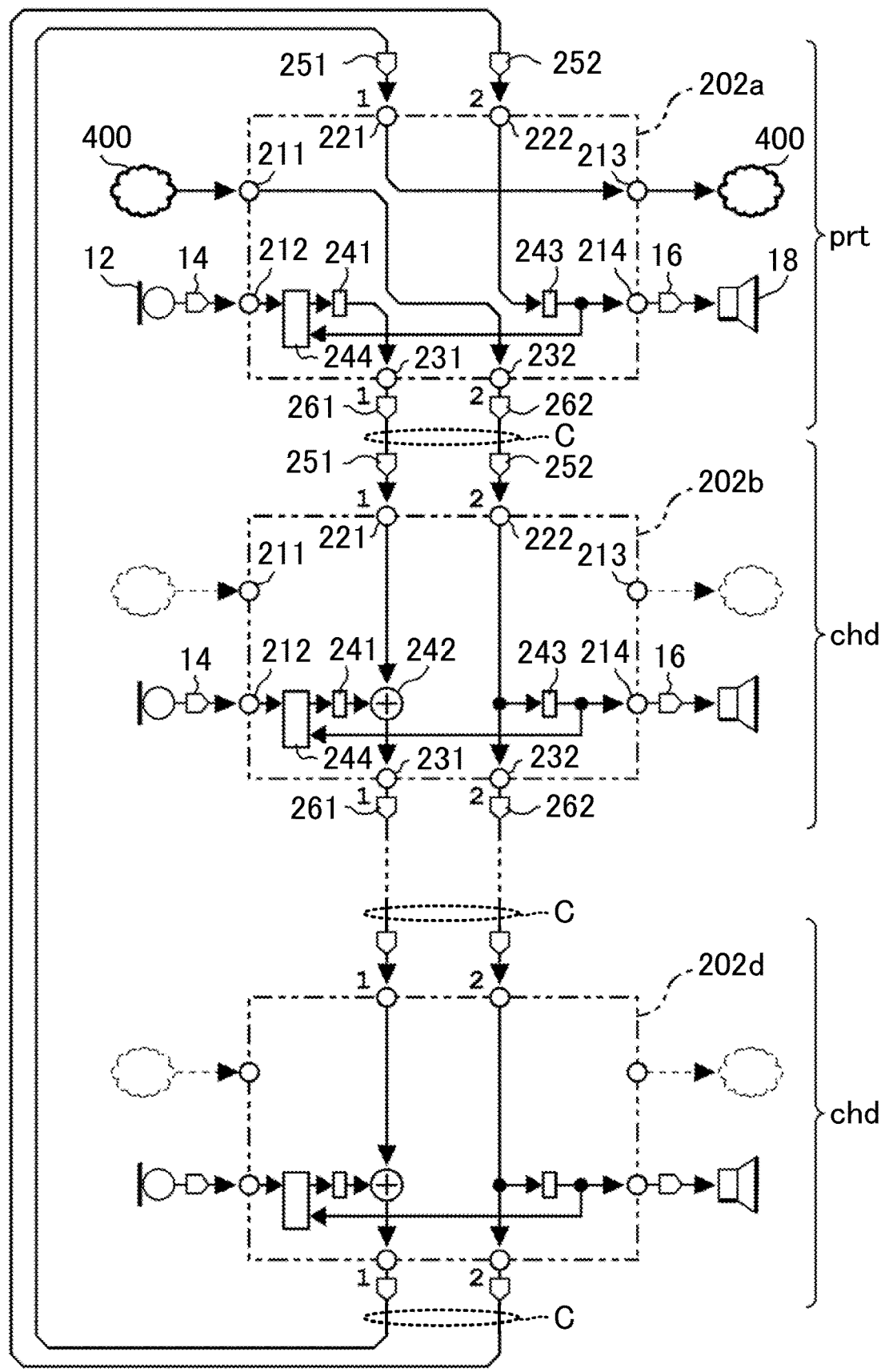
FIG. 17 is a diagram showing signal paths established by the path establisher in the sound emission-reception apparatus according to an exemplary application.

FIG. 17 is a diagram showing signal paths in the sound emission-reception apparatus 10 according to an exemplary application of the second embodiment. As shown in the figure, the echo canceller 244 is provided in each of the master apparatus (prt) and the slave apparatuses (chd). The location, operations, and functions of the echo canceller 244 are similar to those described with reference to FIG. 10.

Third Embodiment

Next, a sound emission-reception apparatus according to a third embodiment will be described.

In the first embodiment and the second embodiment, in a case where multiple sound emission-reception apparatuses 10 are connected to the network 400, a network connection of a single apparatus among them is enabled and network connections of the other apparatuses are disabled. The third embodiment allows network connections by multiple apparatuses. Networks 400 to which the apparatuses are allowed to connect may be of the same type or may be of different types.

Figure 18:
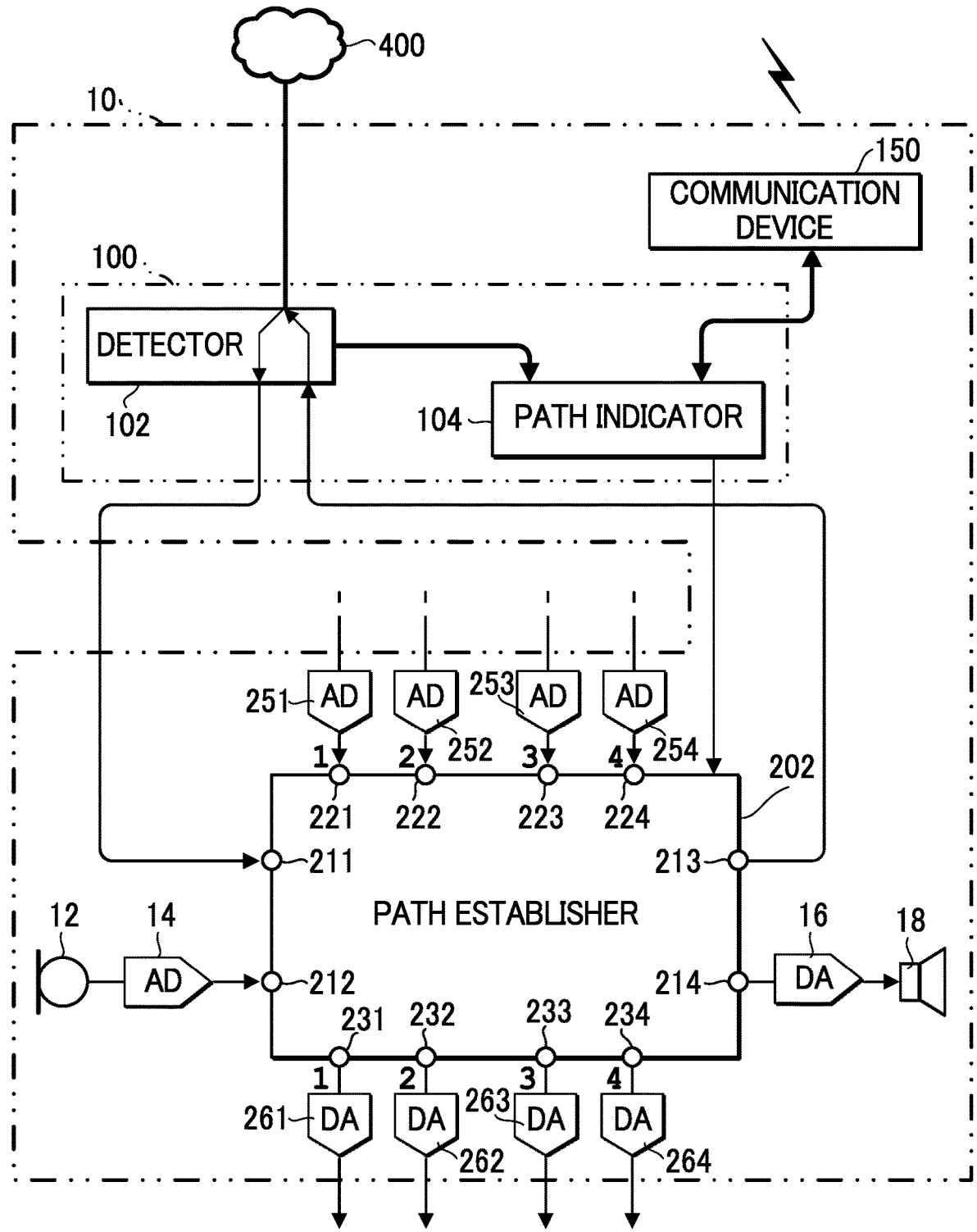
FIG. 18 is a diagram showing functional blocks of a sound emission-reception apparatus according to a third embodiment.

FIG. 18 is a diagram showing functional blocks of a sound emission-reception apparatus 10 according to the third embodiment.

The sound emission-reception apparatus 10 of the third embodiment differs from that of the first embodiment in that the notification device 130 and the input device 140 are not provided (first difference) and in signal paths in the path establisher 202 formed in the DSP 200 (second difference).

The first difference results from the fact that elements for selecting one apparatus are unnecessary since multiple apparatuses are allowed to connect to networks in the third embodiment, as described above.

The second difference results from the fact that, compared to the first embodiment, there are provided in the DSP 200 (path establisher 202) a second input terminal 222, a third input terminal 223, and a fourth input terminal 224, in addition to the first input terminal 221; and there are also provided a second output terminal 232, a third output terminal 233, and a fourth output terminal 234, in addition to the first output terminal 231.

Each of the ADCs 251 to 254 converts a proximal-end sound signal into a digital signal and provides the digital signal to the corresponding one of the first input terminal 221 to the fourth input terminal 224. The DACs 261 to 264 convert sound signals output respectively from the first output terminal 231 to the fourth output terminal 234 into analog signals, and outputs the analog signals to another apparatus at a proximal-end.

Next, operations in the third embodiment will be described. In the third embodiment, network connections by multiple apparatuses are allowed, and in the following example, a configuration is described in which six sound emission-reception apparatuses 10 form the system 1 and all the six apparatuses are connected to networks 400.

For descriptive purposes, "a", "b", "c", "d", "e", and "f" are appended to the tails of reference signs of the elements in the sound emission-reception apparatuses 10 to distinguish the six sound emission-reception apparatuses 10.

In the third embodiment, one among the six sound emission-reception apparatuses is determined to be the master apparatus (prt), and the remaining five apparatuses are determined to be the slave apparatuses (chd). For descriptive purposes, it is assumed here that the sound emission-reception apparatus 10a is determined to be the master apparatus (prt), and the other sound emission-reception apparatuses 10b, 10c, 10d, 10e, and 10f are determined to be the slave apparatuses (chd).

An exemplary method to determine the master apparatus (prt) and the slave apparatuses (chd) is described later.

Figure 19:
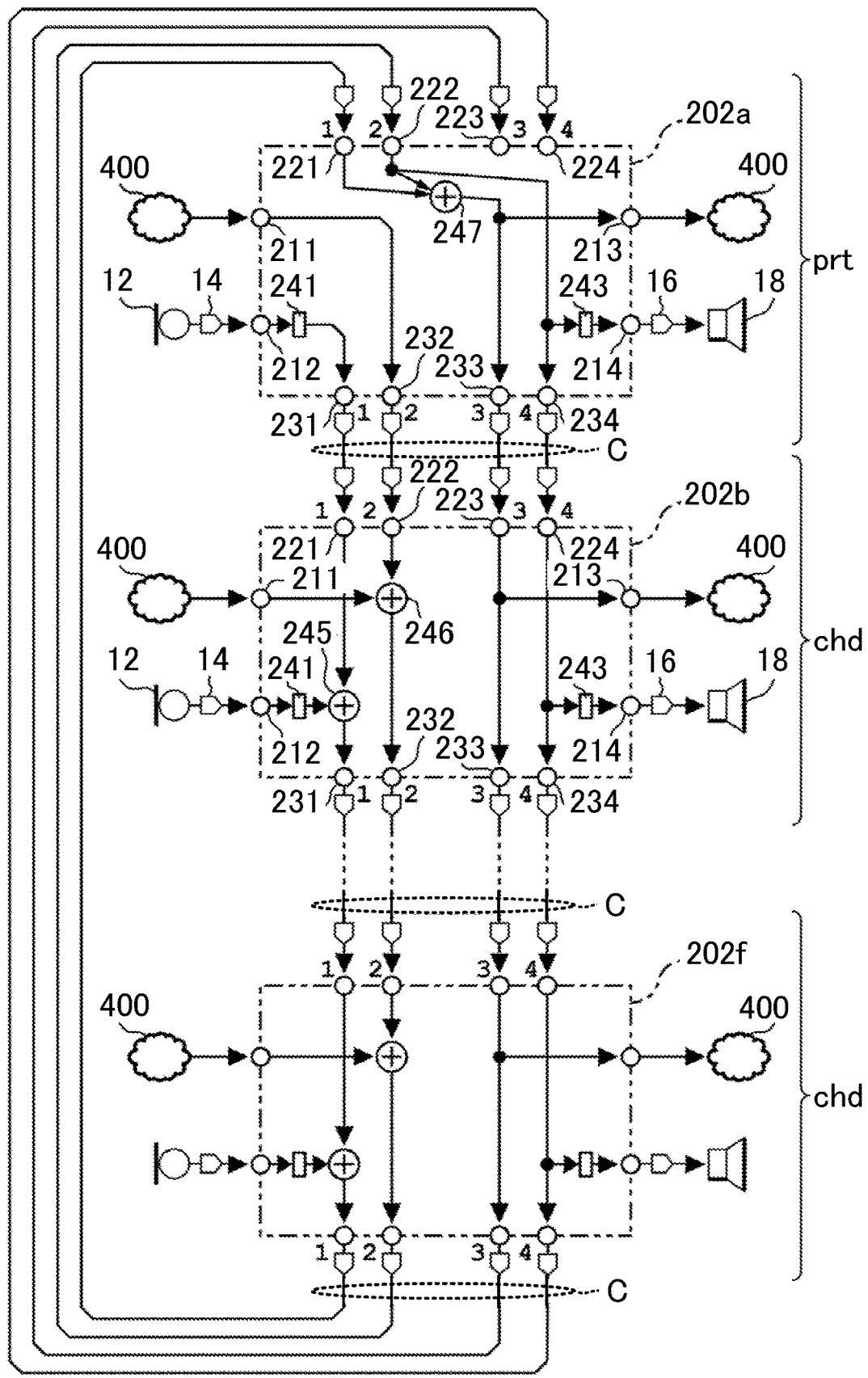
FIG. 19 is a diagram showing signal paths established by the path establisher in the sound emission-reception apparatus.

FIG. 19 is a diagram showing signal paths established in the path establishers 202a, 202b, . . . , and 202f and connection statuses of the signal paths in the third embodiment. For descriptive purposes, illustration of the path establishers 202c, 202d, and 202e is omitted in FIG. 19.

As shown in FIG. 19, the six sound emission-reception apparatuses 10 are connected by cables C in the following manner. Cables C connect from the first output terminal 231 of an apparatus to the first input terminal 221 of another apparatus; from the second output terminal 232 of the apparatus to the second input terminal 222 of the other apparatus; from the third output terminal 233 of the apparatus to the third input terminal 223 of the other apparatus; and from the fourth output terminal 234 of the apparatus to the fourth input terminal 224 of the other apparatus.

In the third embodiment, a single cable C transmits four sound signals. Alternatively, four cables may be used, each of which transmits a single sound signal.

Similarly to the second embodiment, all the sound emission-reception apparatuses 10 are circularly connected by the cables C in the third embodiment.

Accordingly, when connecting the six sound emission-reception apparatuses 10 with the cables C, the user need not consider which of the master apparatus (prt) or the slave apparatus (chd) each sound emission-reception apparatus 10 is going to form.

Similarly to the first embodiment and the second embodiment, the DACs 261 to 264 and the ADCs 251 to 254 are disregarded in describing connections with the cables C.

As shown in FIG. 19, four signal paths described below are established in the path establisher 202a of the master apparatus (prt).

Specifically, in the path establisher 202a, there are established:
(A) a signal path through which a sound signal input to the microphone terminal 212 and delayed by the delay device 241 is provided to the first output terminal 231;
(B) a signal path through which a sound signal input to the distal-end input terminal 211 is provided to the second output terminal 232;
(C) a signal path through which a sound signal is provided to the third output terminal 233 and to the distal-end output terminal 213, wherein the sound signal is derived by an adder 247 adding together a sound signal input to the first input terminal 221 and a sound signal provided to the second input terminal 222; and
(D) a signal path through which the sound signal input to the second input terminal 222 is provided to the fourth output terminal 234 and through which the sound signal is provided, after being delayed by the delay device 243, to the loudspeaker terminal 214.

In the path establisher 202b of a slave apparatus (chd), four signal paths described below are established. Specifically, in the path establisher 202b, there are established:
(E) a signal path through which a sound signal is provided to the first output terminal 231, wherein the sound signal is derived by an adder 245 adding together a sound signal input to the microphone terminal 212 and delayed by the delay device 241 and a sound signal input to the first input terminal 221;
(F) a signal path through which a sound signal is provided to the second output terminal 232, wherein the sound signal is derived by an adder 246 adding together a sound signal input to the distal-end input terminal 211 and a sound signal input to the second input terminal 222; and
(G) a signal path through which a sound signal input to the third input terminal 223 is provided to the third output terminal 233 and to the distal-end output terminal 213;
(H) a signal path through which a sound signal input to the fourth input terminal 224 is provided to the fourth output terminal 234 and through which the sound signal is provided, after being delayed by the delay device 243, to the loudspeaker terminal 214.

Here, description is given of the path establisher 202b as representative of those in the slave apparatuses (chd). Similar signal paths are established in each of the path establishers 202c, 202d, 202e, and 202f.

In a case where a single sound emission-reception apparatus 10 alone, among the six apparatuses, is connected to the network 400, this sound emission-reception apparatus 10 is set as the master apparatus (prt) and the other five apparatuses are set as the slave apparatuses (chd). The following operations are executed after signal paths (A), (B), (C), and (D) are established in the path establisher 202a of the master apparatus (prt) and signal paths (E), (F), (G), and (H) are established in each of the path establishers 202b, 202c, 202d, 202e, and 202f of the slave apparatuses (chd).

A sound signal derived from sound received by the microphone 12 of the single master apparatus (prt) and sound signals derived from sounds received by the microphones 12 of the five slave apparatuses (chd) are sequentially added together by the adders 245, and the resultant signal is provided to the first input terminal 221 of the master apparatus (prt). A sound signal that is provided from the network 400 and is input to the distal-end input terminal 211 of the master apparatus (prt) and sound signals provided from networks 400 and are input to the distal-end input terminals 211 of the five slave apparatuses (chd) are sequentially added together by the adders 246, and the resultant signal is provided to the second input terminal 222 of the master apparatus (prt). The sound signal provided to the first input terminal 221 of the master apparatus (prt) and the sound signal provided to the second input terminal 222 of the master apparatus (prt) are added together by the adder 247, and then the resultant signal is output sequentially from the distal-end output terminal 213 of the master apparatus (prt) and from the distal-end output terminal 213 of each slave apparatus (chd) toward the corresponding networks 400.

The sound signal provided to the second input terminal 222 of the master apparatus (prt) is distributed sequentially to the master apparatus (prt) and to the five slave apparatuses (chd), and sound based on the sound signal is output from each of the loudspeakers 18. In this way, sound based on the signal derived by adding together the sound signals provided from the networks 400 is output from each loudspeaker 18.

In the third embodiment as described above, it is possible to exchange sound signals with other systems at distant locations. According to the third embodiment, similarly to the second embodiment, even when a meeting room is large or a number of participants is large, many sound emission-reception apparatuses 10 can be installed for distribution over a wide range, as long as the sound emission-reception apparatuses 10 are circularly connected by the cables C.

In the third embodiment in particular, even when multiple sound emission-reception apparatuses 10 are connected to networks 400, unlike in the case in the first embodiment and in the second embodiment, there is no need to enable network connection of a single apparatus alone and to disable network connections of other apparatuses. Thus, it is possible to hold a conference via other systems over various networks.

In the third embodiment, the number of connected apparatuses is "6"; however, the number may be any number equal to or greater than "2". When the number of connected apparatuses is "2", however, the connection configuration by the cables C will be almost the same as that in the first embodiment, and no advantage will be obtained by deploying a ring connection. Thus, it is preferable that the number of connected apparatuses be "3" or more.

In the third embodiment, in each path establisher, the delay time of the delay device 241 is set to "n·d" and the delay time of the delay device 243 is set to "(m−n)d".

Here, the denotations "m" and "d" are as described in the second embodiment. The denotation "n" for a slave apparatus (chd) represents a number of the subject apparatus when counted from the master apparatus (prt) along the flow of signals in the ring connection, as in the second embodiment. However, the denotation "n" for the master apparatus (prt) is "0", which is not the same value as that of the denotation "m".

In the example shown in FIG. 19, the denotation "m" is "6". Since the path establisher 202a (sound emission-reception apparatus 10a) is set as the master apparatus (prt), the "n" for the path establisher 202a is "0". Accordingly, in the path establisher 202a, the delay time of the delay device 241 is set to "0" and the delay time of the delay device 243 is set to "6·d".

Figure 20:
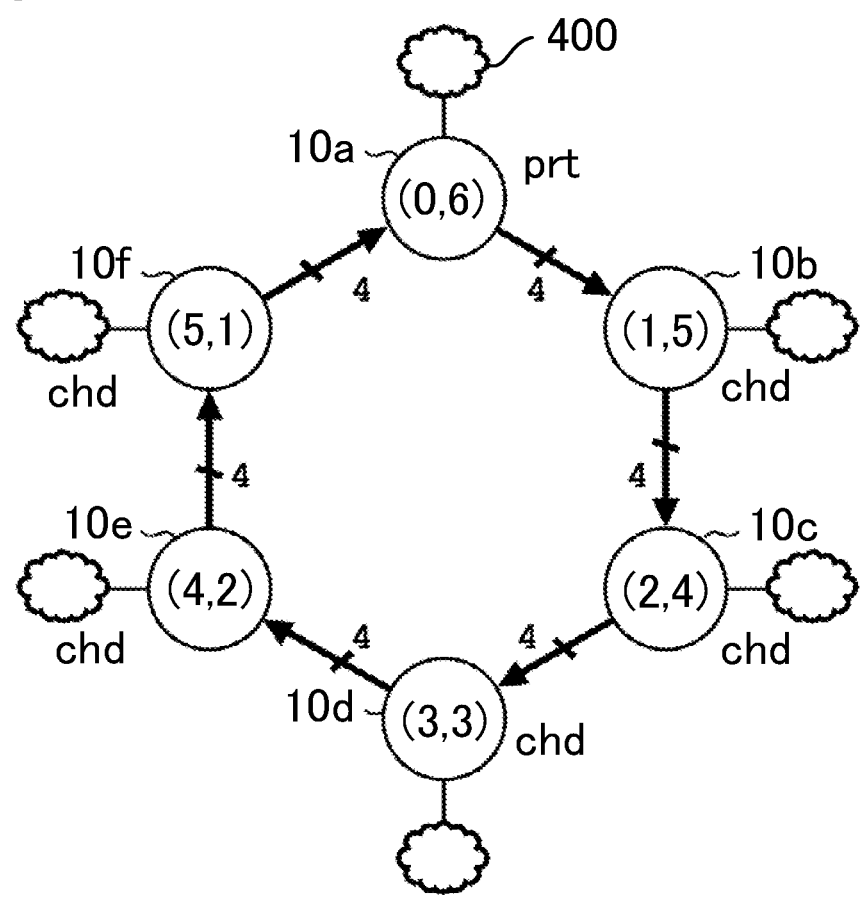
FIG. 20 is a diagram showing an exemplary setting of delay devices.

The denotation "n" for the path establishers 202b to 202f (sound emission-reception apparatuses 10b to 10f) are respectively "1" to "6". Accordingly, in the path establisher 202b, the delay time of the delay device 241 is set to "1·d" and the delay time of the delay device 243 is set to "5·d". In the path establisher 202c, for example, the delay time of the delay device 241 is set to "2·d" and the delay time of the delay device 243 is set to "4·d". FIG. 20 is a diagram where coefficients of "d" are expressed as "(p, q)" in each of the sound emission-reception apparatuses 10a to 10f, in a case where the delay time set to the delay device 241 is "p·d" and the delay time set to the delay device 243 is "q·d". For example, since it is "(4, 2)" in the sound emission-reception apparatus 10e, the delay time set to the delay device 241 is "4·d" and the delay time set to the delay device 243 is "2·d".

Since sound signals generated by microphones 12 are added together sequentially after their delays are equalized, it is possible to minimize effects of delay resulting from DA-conversion and AD-conversion in the sound signal output toward the networks 400. Similarly, since delays of sound signals output toward loudspeakers 18 are equalized, effects of delay resulting from DA-conversion and AD-conversion can be minimized.

Figure 21:
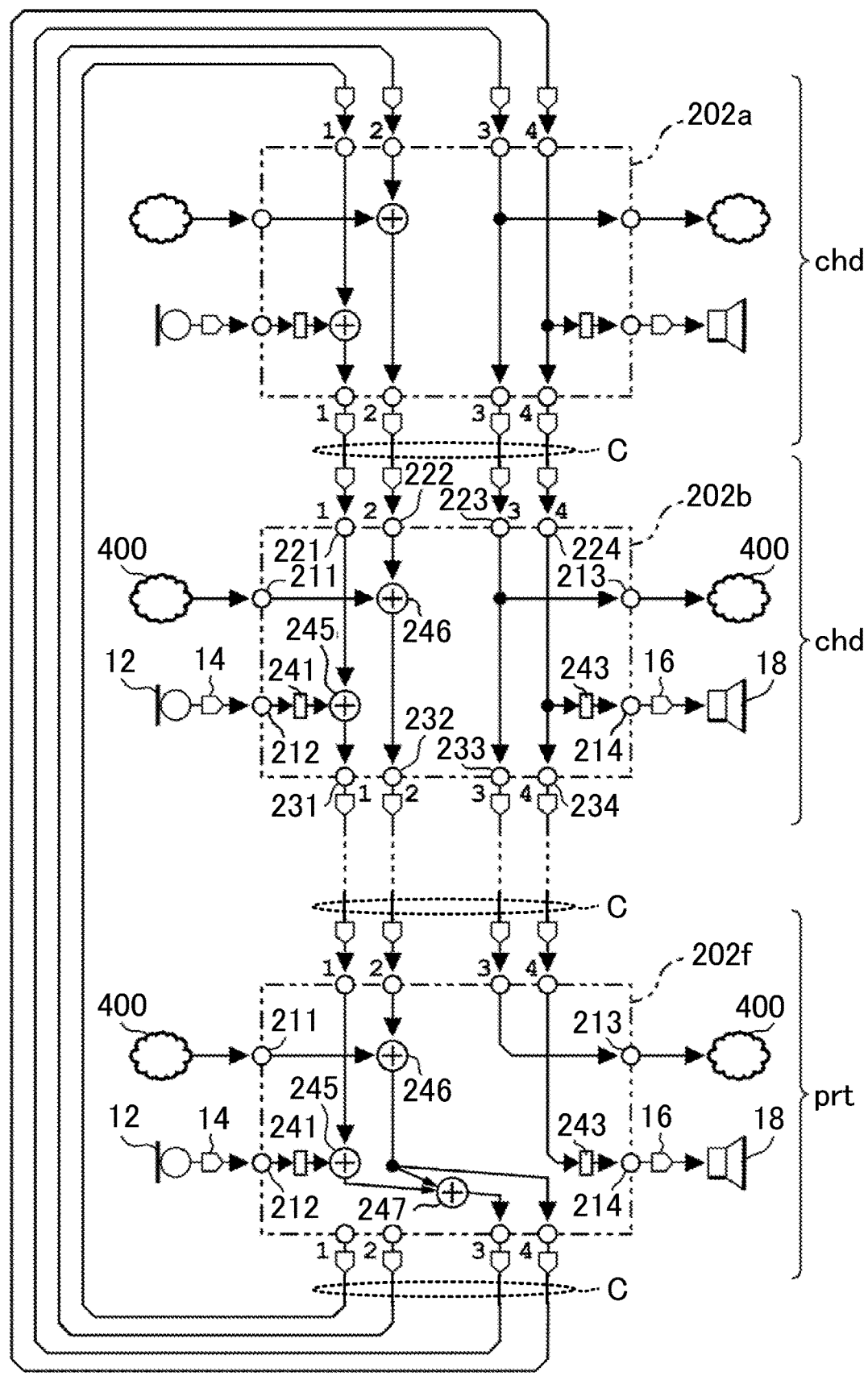
FIG. 21 is a diagram showing another example of signal paths established by the path establisher in the sound emission-reception apparatus.

In the example shown in FIG. 19, in the master apparatus (prt), a sound signal input to the first input terminal 221 is provided to the third output terminal 233 without being added together with a sound signal input to the microphone terminal 212, and a sound signal input to the second input terminal 222 is provided to the fourth output terminal 234 without being added together with a sound signal input to the distal-end input terminal 211. As shown in FIG. 21, however, the sound signal input to the first input terminal 221 may be provided to the third output terminal 233 after being added together with the sound signal input to the microphone terminal 212; and the sound signal input to the second input terminal 222 may be provided to the fourth output terminal 234 after being added together with the sound signal input to the distal-end input terminal 211.

FIG. 21 shows an exemplary case where the path establisher 202f (sound emission-reception apparatus 10f) is set as the master apparatus (prt).

In the path establisher 202f of the master apparatus (prt), four signal paths described below are established.

Specifically, in the path establisher 202f, there are established:
(A) a signal path through which a sound signal is provided to the third output terminal 233, wherein the sound signal is derived by the adders 245, 246, and 247 adding together a sound signal input to the microphone terminal 212 and delayed by the delay device 241, a sound signal input to the first input terminal 221, a sound signal input to the second input terminal 222, and a sound signal input to the distal-end input terminal 211;
(B) a signal path through which a sound signal is provided to the fourth output terminal 234, wherein the sound signal is derived by the adder 246 adding together the sound signal input to the second input terminal 222 and the sound signal input to the distal-end input terminal 211;
(C) a signal path through which a sound signal input to the third input terminal 223 is provided to the distal-end output terminal 213; and
(D) a signal path through which a sound signal input to the fourth input terminal 224 and delayed by the delay device 243 is provided to the loudspeaker terminal 214.

The signal paths in a slave apparatus (chd) are the same as those shown in FIG. 19.

In the signal paths shown in FIG. 21, sound signals derived from sounds received by the microphones 12 are sequentially added together by the adders 245. Sound signals provided from networks 400 are sequentially added together by the adders 246. The sound signals derived from sounds received by the microphones 12 and the sound signals provided from the networks 400 are added together by the adder 247, and the resultant signal is output from the third output terminal 233 of the master apparatus (prt). A sound signal derived by the adders 246 sequentially adding together the sound signals provided from the networks 400 is output from the fourth output terminal 234 of the master apparatus (prt).

In this way, the sound signal output from the third output terminal 233 of the master apparatus (prt) is output from the distal-end output terminal 213 of each of the five slave apparatuses (chd) and from the distal-end output terminal 213 of the master apparatus (prt) toward the corresponding networks 400.

The sound signal output from the fourth output terminal 234 of the master apparatus (prt) is distributed sequentially to the five slave apparatus (chd) and to the master apparatus (prt), and sound based on the sound signal is output from each loudspeaker 18. In this way, sound based on the signal derived by adding together the sound signals provided from the networks 400 is output from each of the loudspeakers 18.

Accordingly, by establishing the signal paths described above in the master apparatus (prt), it is possible to exchange sound signals with other systems at distant locations.

In the signal paths shown in FIG. 21, the delay time of the delay device 241 and the delay time of the delay device 243 may be set in accordance in the manner described with reference to FIG. 19 and FIG. 20, assuming that the position of the master apparatus (prt) is shifted by one apparatus in a direction in opposing relation to the direction from the first output terminal 231 to the first input terminal 221.

More specifically, as shown in FIG. 21, while the path establisher 202f (sound emission-reception apparatus 10f) is set as the master apparatus (prt), with respect to the setting of the delay times, the denotation "n" is defined by assuming that the position of the master apparatus (prt) is not at the position of the sound emission-reception apparatus 10f, but at the position of the sound emission-reception apparatus 10a, the position shifted by one apparatus from the actual position.

Figure 22:
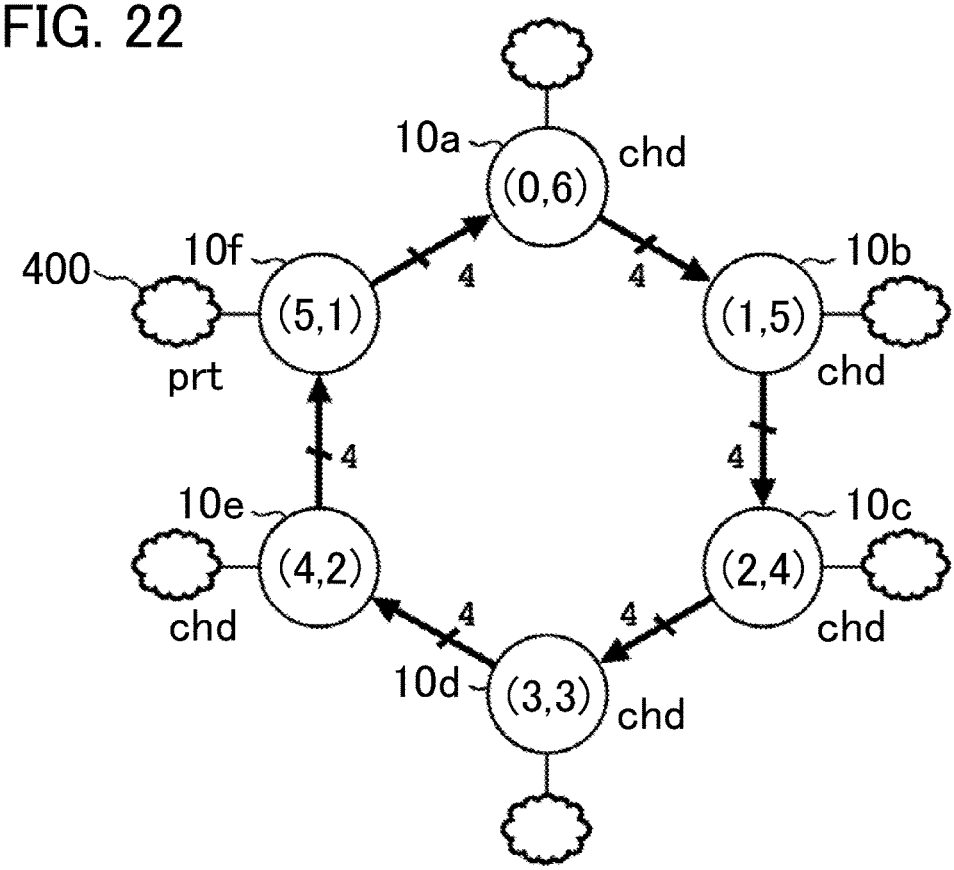
FIG. 22 is a diagram showing an exemplary setting of the delay devices in another example.

FIG. 22 is a diagram in which, with respect to the signal paths shown in FIG. 21, the delay time of the delay device 241 and the delay time of the delay device 243 are set similarly to those in FIG. 20. Since the master apparatus (prt) is treated as being located at the position of the sound emission-reception apparatus 10a, which is the position shifted by one apparatus from the sound emission-reception apparatus 10f, the delay time set for the delay device 241 and the delay time set for the delay device 243 in each of the path establisher 202a (sound emission-reception apparatus 10a) to the path establisher 202f (sound emission-reception apparatus 10f) are the same as those shown in FIG. 20.

In the third embodiment, an exemplary method to determine the master apparatus (prt) and the slave apparatuses (chd) would be to randomly determine one apparatus from among multiple sound emission-reception apparatuses 10 connected to the networks to be the master apparatus (prt), and determine the remaining apparatuses to be the slave apparatuses (chd).

In a specific example of such random determination, similarly to the second embodiment, the path indicator 104 in each of the sound emission-reception apparatuses 10 connected to the networks 400 causes a random number to be generated, and the communication device 150 is caused to transmit the generated random number to each of the other sound emission-reception apparatuses 10 connected to the networks 400. In a case where the random number generated in a sound emission-reception apparatus 10 is, for example, greater than the random numbers that are generated by the other sound emission-reception apparatuses 10 and received by the communication device 150 of the subject sound emission-reception apparatus 10, the path indicator 104 of the subject sound emission-reception apparatus 10 may determine itself to be the master apparatus (prt) and determine the other apparatuses to be the slave apparatuses (chd).

In the third embodiment, in a case where the notification device 130 and the input device 140 are provided, a sound emission-reception apparatus 10 selected by the user may be determined to be the master apparatus (prt).

Figure 23:
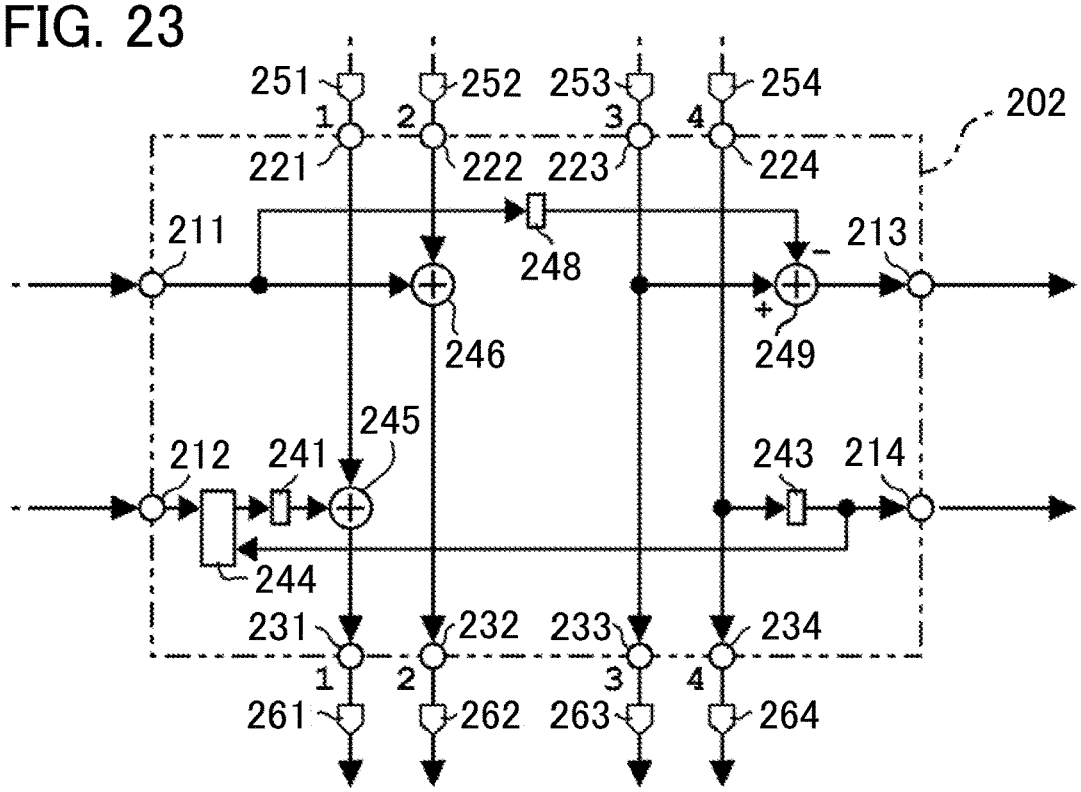
FIG. 23 is a diagram showing signal paths established by the path establisher in the sound emission-reception apparatus according to an exemplary application.

FIG. 23 is a diagram showing signal paths in a sound emission-reception apparatus 10 according to an exemplary application of the third embodiment. FIG. 23 shows, as an example, signal paths that are set in a slave apparatus (chd).

In the third embodiment, sound signals input by multiple networks 400 and sound signals derived from sounds received by multiple microphones 12 are added together, and the resultant sound signal is output toward each of the multiple networks 400.

As a result, components of a sound signal from a network 400 connected to a sound emission-reception apparatus 10 are added to components of sound signals from other networks 400 and are output to the same network 400, thereby causing signal deterioration such as an echo.

In view of the above situation, there are provided a delay device 248 for delaying a sound signal that is from a network 400 and is input to the distal-end input terminal 211; and a subtractor 249 for subtracting the sound signal delayed by the delay device 248 from a sound signal to be output toward the network 400 from the distal-end output terminal 213.

Components of a sound signal from a network 400 connected to a single sound emission-reception apparatus 10 circuit the ring connection and are output toward the network 400. The delay time when the components circuit the ring connection is "m·d". Thus, by setting the delay times of the delay devices 248 to "m·d", components of a sound signal input from a network 400 can be removed from a sound signal output toward the network 400. In this way, deterioration of sound signals output toward the network 400 can be suppressed.

In the example shown in FIG. 23, there is provided an echo canceller 244. Similarly to the examples shown in FIG. 10 and FIG. 17, the echo canceller 244 generates a simulated echo component by filtering a sound signal output toward the loudspeaker terminal 214 with filter coefficients that accord with an estimated transfer function of acoustic space from the loudspeaker 18 to the microphone 12. The echo canceller 244 then subtracts the generated simulated echo component from a sound signal input to the microphone terminal 212 to output the resultant signal.

A slave apparatus (chd) is described as an example in this figure. Since the positions of the delay device 248, the subtractor 249, and the echo canceller 244 may be the same in the master apparatus (prt) as those in the slave apparatus (chd), description thereof is omitted.

Fourth Embodiment

Next, a sound emission-reception apparatus according to a fourth embodiment will be described.

In the second embodiment and the third embodiment, since the form of connecting multiple sound emission-reception apparatuses 10 with cables C is limited to a ring connection, factors such as a shape of a meeting room, a number of participants, or positioning of the participants are likely to impose constraints on an arrangement of sound emission-reception apparatuses 10.

Description is given below of the fourth embodiment in which such constraints are less likely to be imposed.

Figure 24:
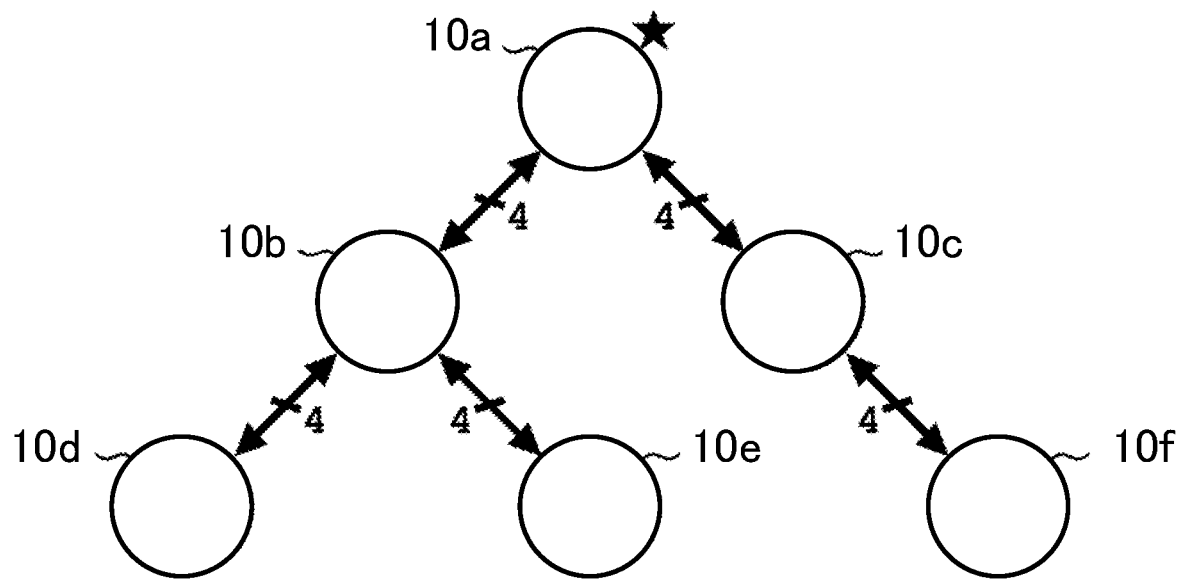
FIG. 24 is a diagram showing a connection configuration (example 1) of sound emission-reception apparatuses according to a fourth embodiment.

FIG. 24 is a diagram showing an exemplary connection (example 1) between sound emission-reception apparatuses 10 according to the fourth embodiment. In the example shown in the figure, six sound emission-reception apparatuses 10 are connected in a tree-shaped structure. In order to distinguish the six sound emission-reception apparatuses 10, "a", "b", "c", "d", "e", and "f" are added to the tails of reference signs; and "a", "b", "c", "d", "e", and "f" are omitted when the sound emission-reception apparatuses 10 need not be distinguished.

As shown in the figure, the sound emission-reception apparatus 10a marked with a star is located at the top, and the sound emission-reception apparatuses 10b and 10c are located one level below. The sound emission-reception apparatuses 10d and 10e are located one level below the sound emission-reception apparatus 10b, and the sound emission-reception apparatus 10f is located one level below the sound emission-reception apparatus 10c. In other words, three sound emission-reception apparatuses 10d, 10e, and 10f are located at the lowest level; the sound emission-reception apparatus 10b is located one level above the sound emission-reception apparatuses 10d and 10e; the sound emission-reception apparatus 10c is located one level above the sound emission-reception apparatus 10f; and the sound emission-reception apparatus 10a is located one level above the sound emission-reception apparatuses 10b and 10c.

A sound emission-reception apparatus 10 located at a higher level and a sound emission-reception apparatus 10 located at a lower level are connected by a cable C. For example, the sound emission-reception apparatus 10b is connected to the sound emission-reception apparatus 10a at a higher level with a cable C, and is connected to each of the sound emission-reception apparatuses 10d and 10e at a lower level with cables C.

In the fourth embodiment, similarly to the third embodiment, a single cable C transmits four signals.

In the fourth embodiment, signal paths established in the path establisher 202 of the single sound emission-reception apparatus 10a at the top alone are different from those established in the other sound emission-reception apparatuses 10b, 10c, 10d, 10e, and 10f. In order to distinguish them, the sound emission-reception apparatus located at the highest point is referred to as "top node", and sound emission-reception apparatuses located at other points are referred to as "common nodes".

The terms "high" and "low" are used in the context of viewing the location relative to the top node in a tree-connection structure, and are not indicative of the direction of a sound signal flow.

In the fourth embodiment, the number of points at which a cable C is connected to a sound emission-reception apparatus 10 is "3", for example. In the top node, three points are used for connection to sound emission-reception apparatuses 10 located lower than the top node. In a common node, two out of three points are used for connection to sound emission-reception apparatuses 10 located lower than the subject common node, and the remaining one point is used for connection to a sound emission-reception apparatus 10 located higher than the subject common node. Not all of the three points are always used for connection. In the sound emission-reception apparatus 10a shown in FIG. 24, only two points are used for connection; and in each of the sound emission-reception apparatuses 10d, 10e, and 10f, only one point is used for connection.

The roles as the top node and the common nodes are not fixed and can be changed flexibly. For example, the sound emission-reception apparatus 10a is set as the top node in the connection shown in FIG. 24. Alternatively, as in the exemplary connection (example 2) shown in FIG. 25, the sound emission-reception apparatus 10c may be set as the top node, without changing the connections by the cables C.

Figure 28:
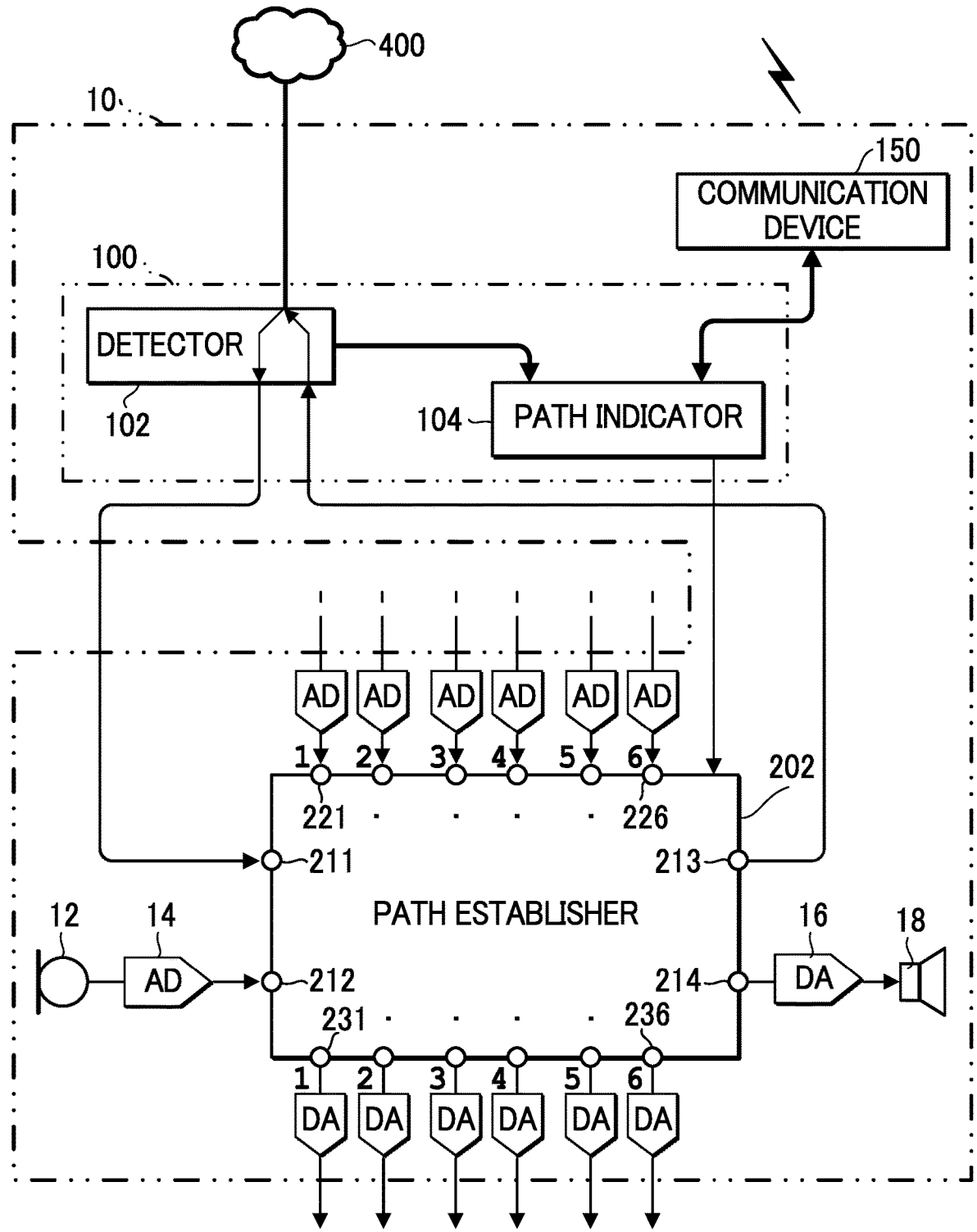
FIG. 28 is a diagram showing functional blocks of the sound emission-reception apparatus according to the fourth embodiment.

FIG. 28 is a diagram showing functional blocks of a sound emission-reception apparatus 10 according to the fourth embodiment.

The sound emission-reception apparatus 10 of the fourth embodiment differs from that of the first embodiment in that the sound emission-reception apparatus 10 does not include the notification device 130 or the input device 140 (first difference) and in the signal paths in the path establisher 202 established by the DSP 200 (second difference).

The first difference results from the fact that the fourth embodiment, similarly to the third embodiment, allows network connections to be made by multiple apparatuses and thus there is no need for elements in selecting one apparatus.

The second difference results from the fact that, compared to the first embodiment, there are provided in the path establisher 202 formed by the DSP 200: a second input terminal 222, a third input terminal 223, a fourth input terminal 224, a fifth input terminal 225, and a sixth input terminal 226, in addition to a first input terminal 221; and a second output terminal 232, a third output terminal 233, a fourth output terminal 234, a fifth output terminal 235, and a sixth output terminal 236, in addition a first output terminal 231.

The ADCs 251 to 256 convert proximal-end sound signals into digital signals and provide the digital signals to the first input terminal 221 to the sixth input terminal 226, respectively. The DACs 261 to 266 convert sound signals output from the first output terminal 231 to the sixth output terminal 236, respectively, into analog signals, and output the analog signals toward another apparatus at a proximal-end.

For convenience of illustration, the reference sign 222 of the second input terminal to the reference sign 225 of the fifth input terminal, the reference sign 232 of the second output terminal to the reference sign 235 of the fifth output terminal, the reference signs 251 to 256 of the ADCs, and the reference signs 261 to 266 of the DACs, are omitted in FIG. 28.

Operations in the fourth embodiment will now be described.

In the fourth embodiment, one among multiple (here six) sound emission-reception apparatuses is determined to be the top node, and the other five apparatuses are determined to be common nodes. As shown in FIG. 24, it is assumed here that the sound emission-reception apparatus 10a is determined to be the top node, and the other sound emission-reception apparatuses 10b, 10c, 10d, 10e, and 10f are each determined to be a common node.

An exemplary method to determine the top node and the common nodes is described later.

Figure 29:
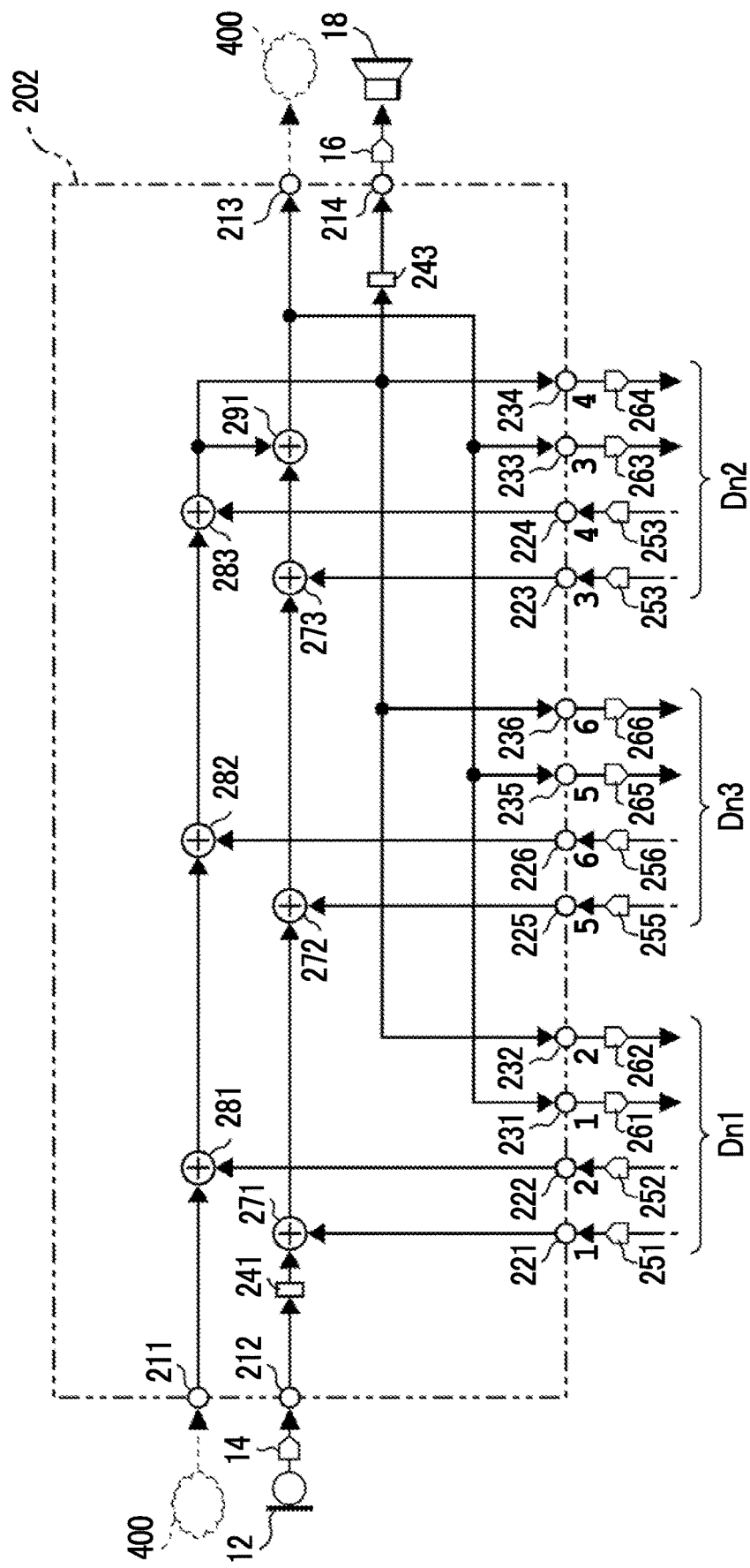
FIG. 29 is a diagram showing signal paths established by the path establisher in the sound emission-reception apparatus.
Figure 30:
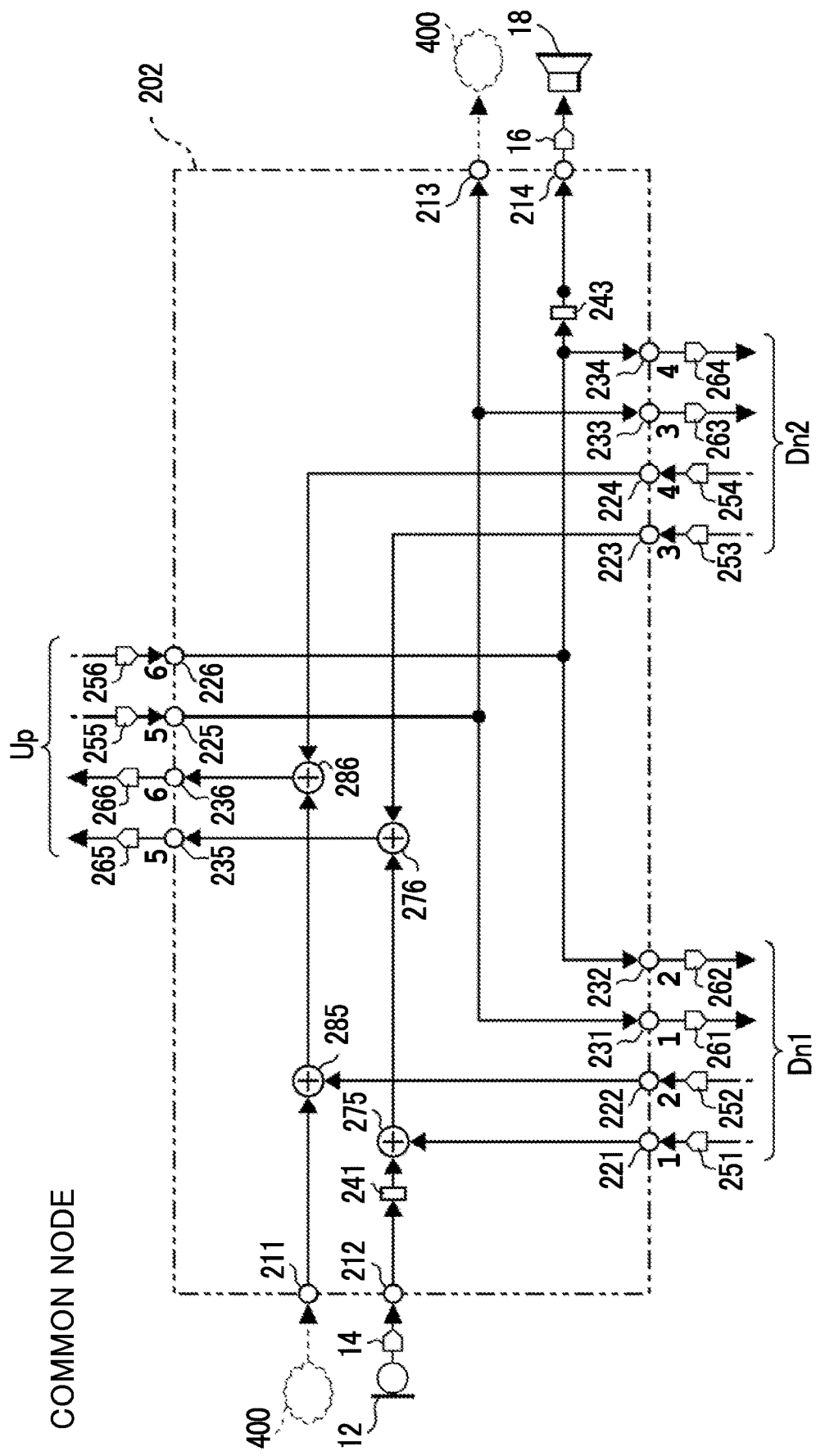
FIG. 30 is a diagram showing signal paths established by the path establisher in the sound emission-reception apparatus.

FIG. 29 is a diagram showing signal paths established in the path establisher 202 of a sound emission-reception apparatus 10 determined to be the top node. FIG. 30 is a diagram showing signal paths established in the path establisher 202 of a sound emission-reception apparatus 10 determined to be a common node.

In the top node, the number of connection points of cables C to sound emission-reception apparatuses 10 located below is "3", and the connection points are expressed as "Dn1", "Dn2", and "Dn3" in order to distinguish them (refer to FIG. 29).

In the top node, the connection point Dn1 includes the first input terminal 221, the second input terminal 222, the first output terminal 231, and the second output terminal 232. Similarly, the connection point Dn2 includes the third input terminal 223, the fourth input terminal 224, the third output terminal 233, and the fourth output terminal 234; and the connection point Dn3 includes the fifth input terminal 225, the sixth input terminal 226, the fifth output terminal 235, and the sixth output terminal 236.

In a common node, since the number of connection points of cables C to sound emission-reception apparatuses 10 located below is "2", these connection points are expressed as "Dn1" and "Dn2" in order to distinguish them, and a connection point of a cable C to a sound emission-reception apparatus 10 located above is expressed as "Up" (refer to FIG. 30). The connection point Up of a common node replaces the connection point Dn3 of the top node. Accordingly, the connection point Up of a common node includes the fifth input terminal 225, the sixth input terminal 226, the fifth output terminal 235, and the sixth output terminal 236.

Expressions "Dn1", "Dn2", and "Dn3" in the top node and expressions "Dn1", "Dn2", and "Up" in a common node are used to distinguish three connection points in a single sound emission-reception apparatus 10 for convenience, and do not intend to indicate particular connection points in a fixed manner.

For example, while a certain connection point is serving as "Dn1" in a sound emission-reception apparatus 10 set as a common node, a connection point at the same position as the certain connection point may serve as "Up" in another sound emission-reception apparatus 10 determined to be a common node.

In a case where there is a change in the tree-connection structure as described later, a sound emission-reception apparatus 10 may change from a common node to a top node, or change from a top node to a common node.

Accordingly, in a case where, for example, a sound emission-reception apparatus 10 is determined to be a common node and a particular connection point therein serves as "Up" for connection to an apparatus located above, the sound emission-reception apparatus 10 may be changed to the top node and the particular connection point may be changed to "Dn3". Conversely, in a case where a sound emission-reception apparatus 10 is determined to be the top node and a particular connection point therein serves as "Dn3", the sound emission-reception apparatus 10 may be changed to a common node and the particular connection point may be changed to "Up".

Strictly speaking, connections by the cables C are not from the first output terminal 231 to the sixth output terminal 236 to the first input terminal 221 to the sixth input terminal 226, but from the DACs 261 to 266 to the ADCs 251 to 256. As described above, however, since the DACs 261 to 266 and the ADCs 251 to 256 are optional elements and do not affect the signal paths, they are disregarded.

As shown in FIG. 29, two signal paths described below are established in the path establisher 202 of the top node.

Specifically, in the path establisher 202 of the top node, there are established:

(A) a signal path through which a sound signal is provided to each of the distal-end output terminal 213, the first output terminal 231, the third output terminal 233, and the fifth output terminal 235, wherein the sound signal is derived by an adder 291 adding together a sound signal output from an adder 283 and a sound signal derived by the adders 271, 272, and 273 adding together a sound signal input to the microphone terminal 212 and delayed by the delay device 241, a sound signal input to the first input terminal 221, a sound signal input to the third input terminal 223, and a sound signal input to the fifth input terminal 225; and (B) a signal path through which a sound signal is provided to each of the input terminal of the adder 291, the second output terminal 232, the fourth output terminal 234, and the sixth output terminal 236, and to the loudspeaker terminal 214 through the delay device 243, wherein the sound signal is derived by the adders 281, 282, and 283 adding together a sound signal input to the distal-end input terminal 211, a sound signal input to the second input terminal 222, a sound signal input to fourth input terminal 224, and a sound signal input to the sixth input terminal 226.

The order of addition at the adders 271, 272, 273, and 291 is not limited to the above example. Alternatively, a single adder may collectively add together the signals added by these adders. Similarly, the order of addition at the adders 281, 282, and 283 is not limited to the above example, and the signals added by these adders may be added together collectively by a single adder.

As shown in FIG. 30, four signal paths described below are established in the path establisher 202 of a common node.

Specifically, in the path establisher 202 of a common node, there are established:

(C) a signal path through which a sound signal is provided to the fifth output terminal 235, wherein the sound signal is derived by the adders 275 and 276 adding together a sound signal input to the microphone terminal 212 and delayed by the delay device 241, a sound signal input to the first input terminal 221, and a sound signal input to the third input terminal 223;

(D) a signal path through which a sound signal is provided to the sixth output terminal 236, wherein the sound signal is derived by the adders 285 and 286 adding together a sound signal input to the distal-end input terminal 211, a sound signal input to the second input terminal 222, and a sound signal input to the fourth input terminal 224;

(E) a signal path through which a sound signal input to the fifth input terminal 225 is provided to each of the first output terminal 231, the third output terminal 233, and the distal-end output terminal 213; and (F) a signal path through which a sound signal input to the sixth input terminal 226 is provided to the second output terminal 232 and to the fourth output terminal 234, and through which the sound signal is provided to the loudspeaker terminal 214 after being delayed by the delay device 243.

The order of addition by the adders 275 and 276 is not limited to the above example, and the signals added by these adders may be collectively added together. Similarly, the order of addition by the adders 285 and 286 is not limited to the above example, and the signals added by these adders may be collectively added together.

Although the connection point Up shown in FIG. 30 may appear to be changed from the connection point Dn3 shown in FIG. 29, any of the connection points Dn1, Dn2, and Dn3 may be changed to the connection point Up. Even when a connection point among the connection points Dn1, Dn2, and Dn3 that is to be changed to "Up" is not determined in advance, the connection point can be changed to the connection point Up in the following manner. For example, the path indicator 104 may acquire information indicating which sound emission-reception apparatus 10 is connected to which connection point by communicating each other with other apparatuses after being connected with the cables C, may determine the connection point that leads to the top node from the acquired information, and may change the connection point to the "Up".

After signal paths are established in the top node and the common nodes in this way, a sound emission-reception apparatus 10 (common node) at the lowest level provides a sound signal derived from sound received by the microphone 12 to a sound emission-reception apparatus 10 located above, and similarly, provides a sound signal from the network 400 input to the distal-end input terminal 211 to the sound emission-reception apparatus 10 located above.

A sound emission-reception apparatus 10 (common node) at a middle level, located at neither the lowest nor the highest level, adds together a sound signal derived from sound received by its own microphone 12 and sound signals that are from microphones 12 and are provided by apparatuses located below; provides the resultant sound signal to a sound emission-reception apparatus 10 located above; adds together a sound signal from the network 400 input to the distal-end input terminal 211 and sound signals from other networks 400 provided by sound emission-reception apparatuses 10 located below; and provides the resultant sound signal to the sound emission-reception apparatus 10 located above.

A sound emission-reception apparatus 10 (top node) at the highest level adds together a sound signal derived from sound received by its own microphone 12, sound signals that are from microphones 12 and are provided by sound emission-reception apparatuses 10 located below, a sound signal from the network 400 input to the distal-end input terminal 211, and sound signals from networks 400 provided by the sound emission-reception apparatuses 10 located below; provides the resultant sound signal (combined signal of microphone signals and network signals) to the sound emission-reception apparatuses 10 located below and to the distal-end output terminal 213; adds together the sound signal from the network 400 input to the distal-end input terminal 211 and the sound signals from the networks 400 provided from the apparatuses located below; and provides the resultant sound signal (combined signal of network signals alone) to the sound emission-reception apparatuses 10 located below and to the loudspeaker terminal 214.

The sound emission-reception apparatus 10 at a middle level provides the combined signal of the microphone and network signals provided by a sound emission-reception apparatus 10 located above to sound emission-reception apparatuses 10 located below and to the distal-end output terminal 213, and provides the combined signal of the network-alone signals provided by the sound emission-reception apparatus 10 located above to the sound emission-reception apparatuses 10 located below and to its own loudspeaker terminal 214.

A sound emission-reception apparatus 10 at the lowest level provides the distal-end output terminal 213 with the combined signal of the microphone and network signals provided by a sound emission-reception apparatus 10 located above, and provides the loudspeaker terminal 214 with the combined signal of the network-alone signals.

As described above, sound signals derived from sounds received by microphones 12 are sequentially added together from the lowest level to a higher level, and sound signals input from the networks 400 are similarly added together sequentially from the lowest level to a higher level.

The top node adds together a sound signal derived from sound received by its own microphone 12, a sound signal that is derived by sequential addition of sound signals from microphones 12 at lower levels, and a sound signal that is derived by sequential addition of sound signals from networks 400 at lower levels; and provides the resultant signal as the combined signal of the microphone and network signals to the lower apparatuses and outputs the resultant signal to the network 400 connected to itself. The top node adds together a sound signal from the network 400 connected to itself and a sound signal that is derived by sequential addition of sound signals from networks 400 at lower levels; and provides the resultant signal as the combined signal of the network-alone signals to the lower apparatuses and causes its own loudspeaker 18 to output sound based on the resultant signal.

In the lower levels, the combined signal of the microphone and network signals is sequentially distributed to the lower apparatuses and is output toward each network 400; and the combined signal of the network-alone signals is sequentially distributed to the lower apparatuses and is output toward each loudspeaker 18.

In the fourth embodiment, the top node and the common nodes are determined in accordance with a predetermined rule, or determined randomly.

An exemplary method for determination in accordance with a predetermined rule may include: detecting a maximum number of nodes in a path among paths, each path originating from a terminal sound emission-reception apparatus 10 at the lowest level in a tree-connection structure, which apparatus has no apparatus connected to it lower than itself, passing through the top node, and reaching another terminal sound emission-reception apparatus 10; and determining the sound emission-reception apparatus 10 that is located in the middle of the path to be the top node and determining the other apparatuses to be the common nodes.

For example, in the tree-connection structure shown in FIG. 24, the path in which the number of nodes is the highest originates from the sound emission-reception apparatus 10*d* (or 10*e*), passing through the sound emission-reception apparatuses 10*b*, 10*a*, and 10*c*, and reaching the sound emission-reception apparatus 10*f*. Thus, the maximum number of nodes is "3". Accordingly, the sound emission-reception apparatus 10*a*, which is located in the middle of the path, is determined to be the top node.

Examples of a method to determine the top node and the common nodes randomly include those described in the second embodiment and the third embodiment.

The top node and the common nodes are preferably determined at a timing when a change is made to the tree-connection structure. Examples of "when a change is made to the tree-connection structure" include a case where one or more sound emission-reception apparatuses 10 are connected to the tree-connection structure, and also a case where one or more sound emission-reception apparatuses 10 are cut from the tree-connection structure.

Figure 26:
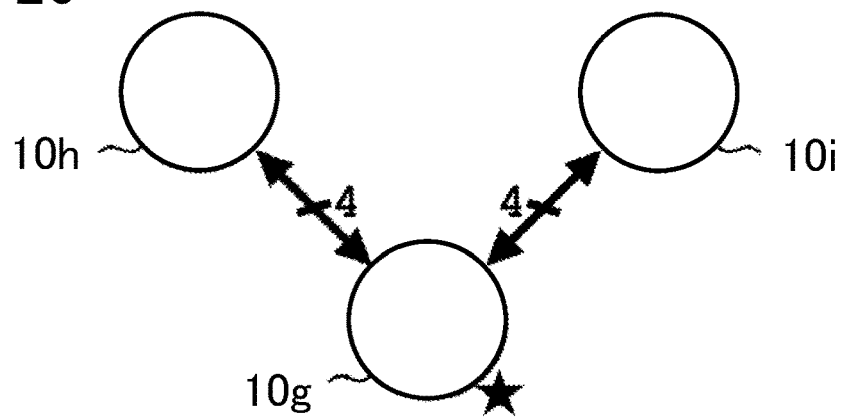
FIG. 26 is a diagram showing another connection configuration (example 3).
Figure 27:
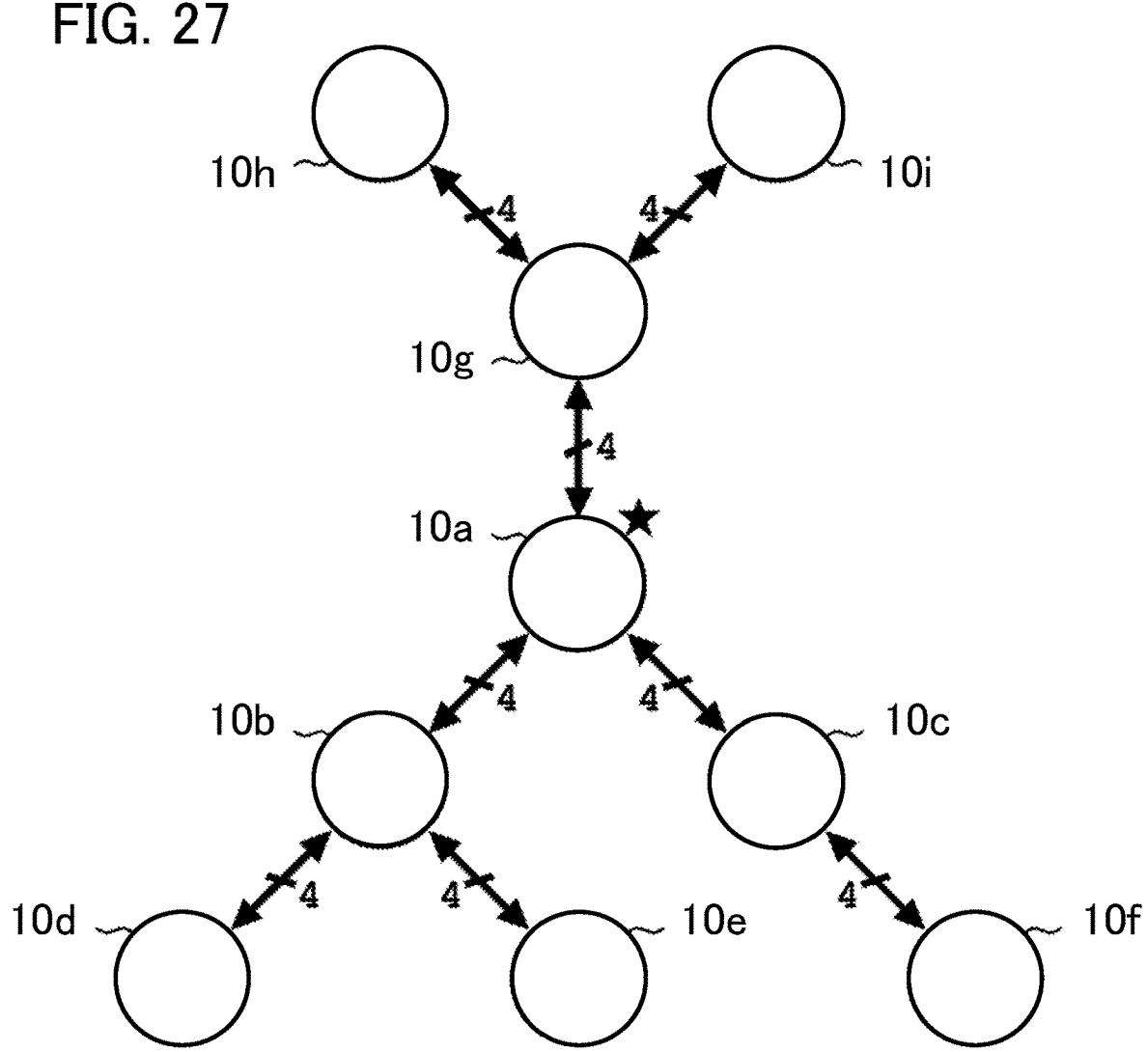
FIG. 27 is a diagram showing another connection configuration (example 4).

In the fourth embodiment, a tree-connection structure of an exemplary connection (example 1) shown in FIG. 24 may be united with a tree-connection structure of an exemplary connection (example 3) shown in FIG. 26 to create a tree-connection structure of an exemplary connection (example 4) shown in FIG. 27. In the exemplary connection (example 3) shown in FIG. 26, the sound emission-reception apparatus 10*g* marked with a star is the top node, and the sound emission-reception apparatuses 10*h* and 10*i* are common nodes.

When there is created a new tree-connection structure upon unification, one among the sound emission-reception apparatuses 10*a* to 10*i* is determined to be the top node, and the other apparatuses are determined to be common nodes.

In a tree-connection structure of the exemplary connection (example 4) shown in FIG. 27, the path with the maximum number of nodes is, for example, a path from the sound emission-reception apparatus 10*d* to the sound emission-reception apparatus 10*h*, and thus, the maximum number of nodes is "3". Accordingly, the sound emission-reception apparatus 10*a* that is located in the middle of the path may be determined to be the top node. The sound emission-reception apparatus 10*g*, which was the top node before unification, is changed to a common node after unification.

In the path establisher 202 in the fourth embodiment, the delay time of the delay device 241 that delays sound signals derived from sound received by the microphone 12 is set to "(i−j)d"; and the delay time of the delay device 243 that delays sound signals output toward the loudspeaker 18 is set to "j·d".

The denotation "d" here is as described in the second embodiment.

The denotation "i" is a maximum number of nodes from the top node to a terminal common node. The denotation "j" for a common node is the number of nodes that exist along a path from the subject common node to the top nodes, and the denotation "j" for the top node is zero.

In the exemplary connection (example 1) shown in FIG. 24, the denotation "i" is "2" because the number of nodes from the sound emission-reception apparatus 10*a* to the sound emission-reception apparatus 10*d* (10*e* or 10*f*) would be the highest. The denotation "j" for each of the sound emission-reception apparatuses 10*b* and 10*c* is "1", and the denotation "j" for each of the sound emission-reception apparatuses 10*d*, 10*e*, and 10*f* is "2".

Figure 31:
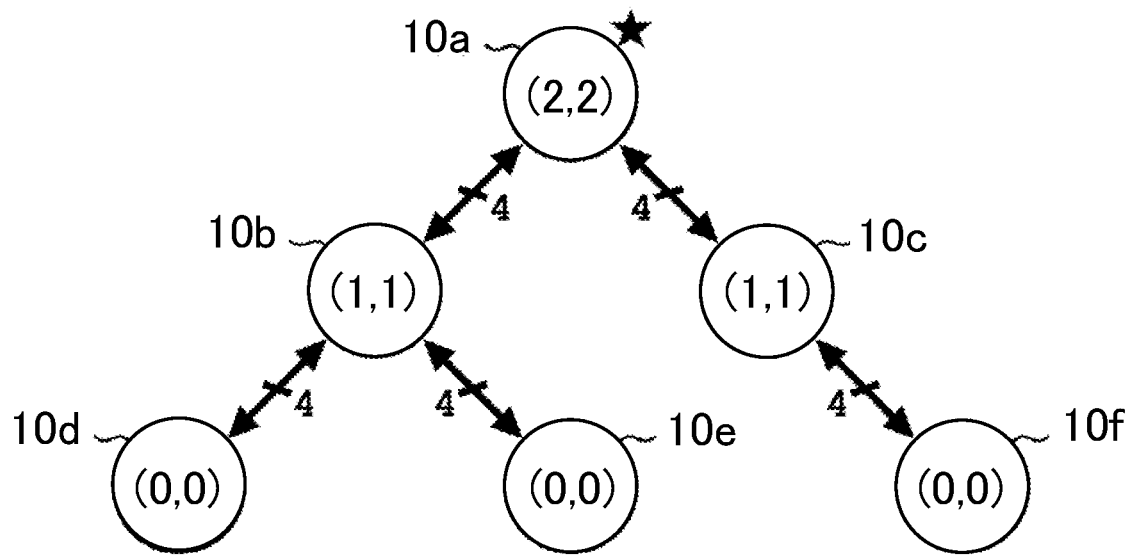
FIG. 31 is a diagram showing an exemplary setting of delay devices.

When coefficients of "d" are expressed as "(p, q)" as in FIG. 20 and FIG. 22, the delay time set for the delay device 241 and the delay time set for the delay device 243 are as shown in FIG. 31.

For example, since "(1, 1)" is shown for each of the sound emission-reception apparatuses 10*b* and 10*c*, the delay time set for the delay device 241 is "1·d" and the delay time set for the delay device 243 is "1·d".

Figure 25:
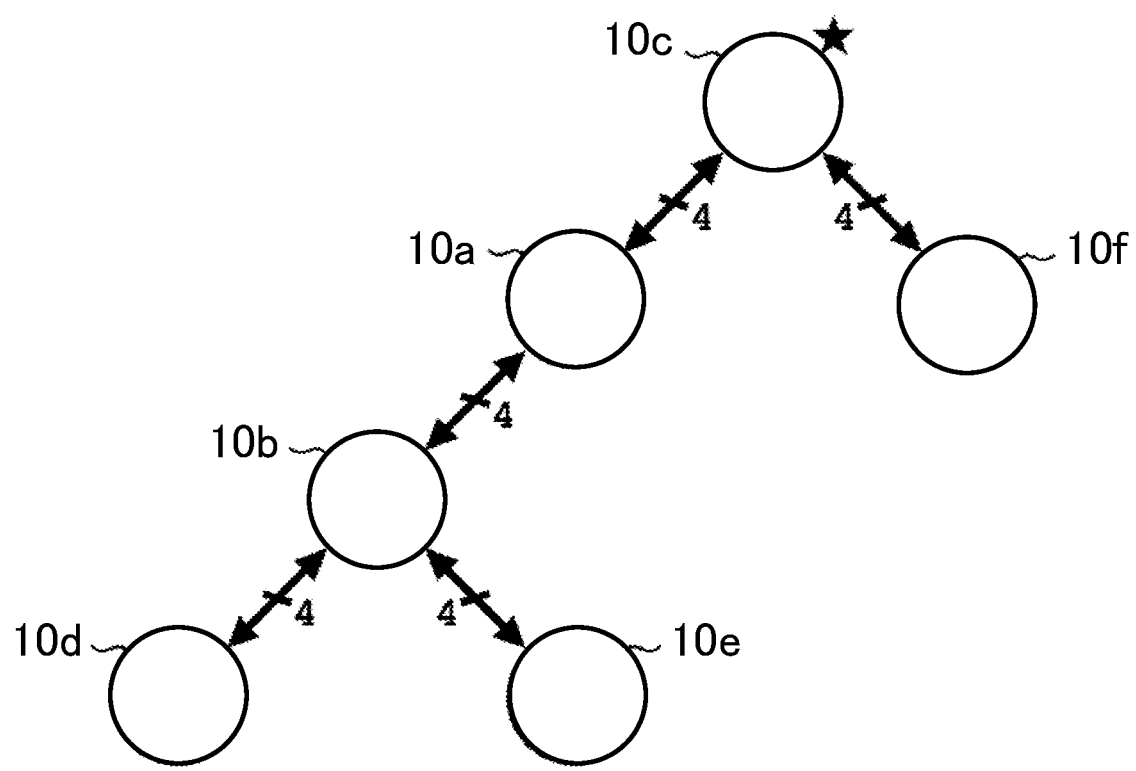
FIG. 25 is a diagram showing another connection configuration (example 2).

In the exemplary connection (example 2) shown in FIG. 25, "i" is "3" because the number of nodes from the sound emission-reception apparatus 10*c* to the sound emission-reception apparatus 10*d* (or 10*e*) would be the highest. The denotation "j" for each of the sound emission-reception apparatuses 10*a* and 10*f* is "1", the denotation "j" for the sound emission-reception apparatus 10*b* is "2", and the denotation "j" for each of the sound emission-reception apparatuses 10*d* and 10*e* is "3".

Figure 32:
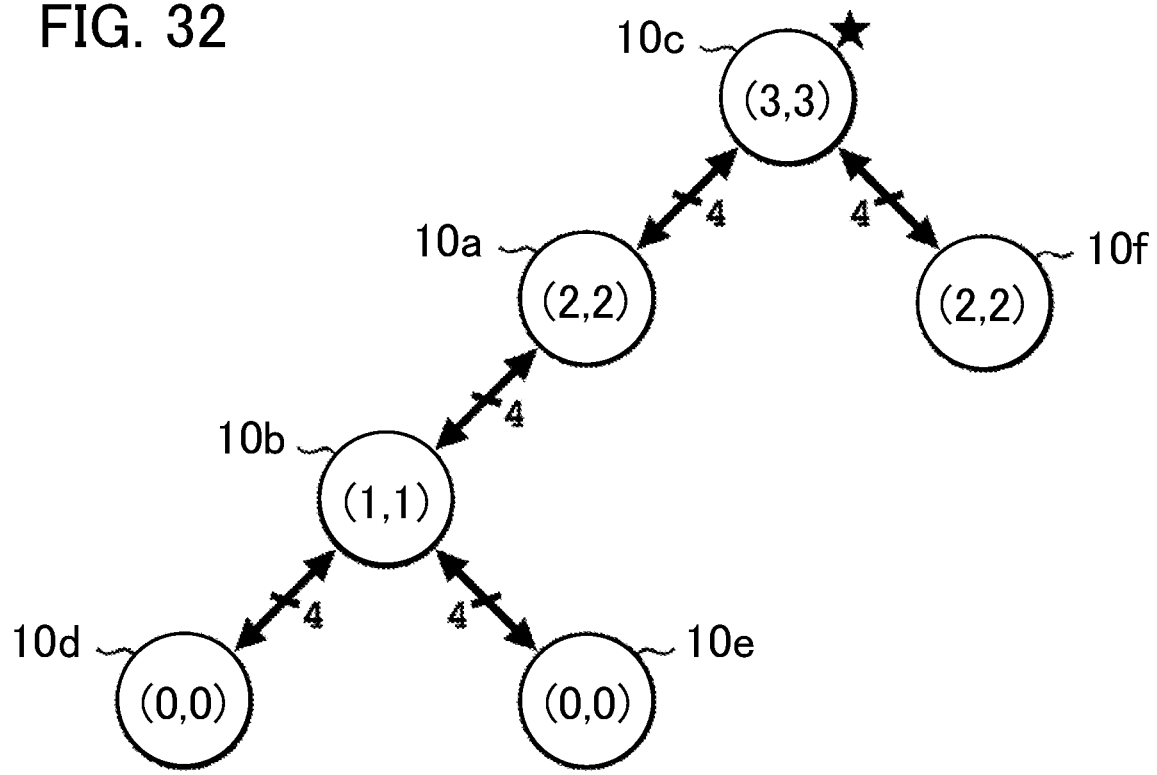
FIG. 32 is a diagram showing an exemplary setting of delay devices.

Accordingly, coefficients of delay times set for the delay devices 241 and 243 in each of the sound emission-reception apparatuses 10*a* to 10*f* are as shown in FIG. 32.

By setting delay times of the delay devices 241 and 243 in this way, sound signals generated by multiple microphones 12 are sequentially added together with their delays being equalized, and the resultant signal is returned by the top node to be provided to the lower apparatuses. Accordingly, when the sound signals generated by the multiple microphones 12 are output toward a single network 400, it is possible to minimize effects of delays resulting from DA-conversion and AD-conversion. Similarly, since the delays of sound signals output from the top node toward each loudspeaker 18 are equalized, it is possible to minimize differences between timings at which sounds are output from multiple loudspeakers 18.

In the fourth embodiment also, it is possible to exchange sound signals with other systems at distant locations. In the fourth embodiment in particular, multiple sound emission-reception apparatuses 10 are connected with cables C in a tree-shaped structure. Thus, factors such as a shape of a meeting room, a number of participants, or a positioning of the participants are not likely to impose constraints on arrangement of sound emission-reception apparatuses 10.

Furthermore, in the fourth embodiment, multiple sound emission-reception apparatus 10 can be connected to networks 400. Accordingly, there is no need to fixedly connect one sound emission-reception apparatus 10 to a network 400, and any sound emission-reception apparatus 10 can be connected to a network 400 at need. Accordingly, multiple sound emission-reception apparatuses 10 can be disposed flexibly.

In the fourth embodiment, an example is described in which the number of connected apparatuses is "6". However, the number of connected apparatuses may be any number equal to or greater than "2". When the number of connected apparatuses is "2", however, the connection configuration by the cables C will be nearly the same as that in the first embodiment, and there will be no advantage of having a tree-connection structure. Thus, it is preferable that the number of connected apparatuses be "3" or more.

Figure 33:
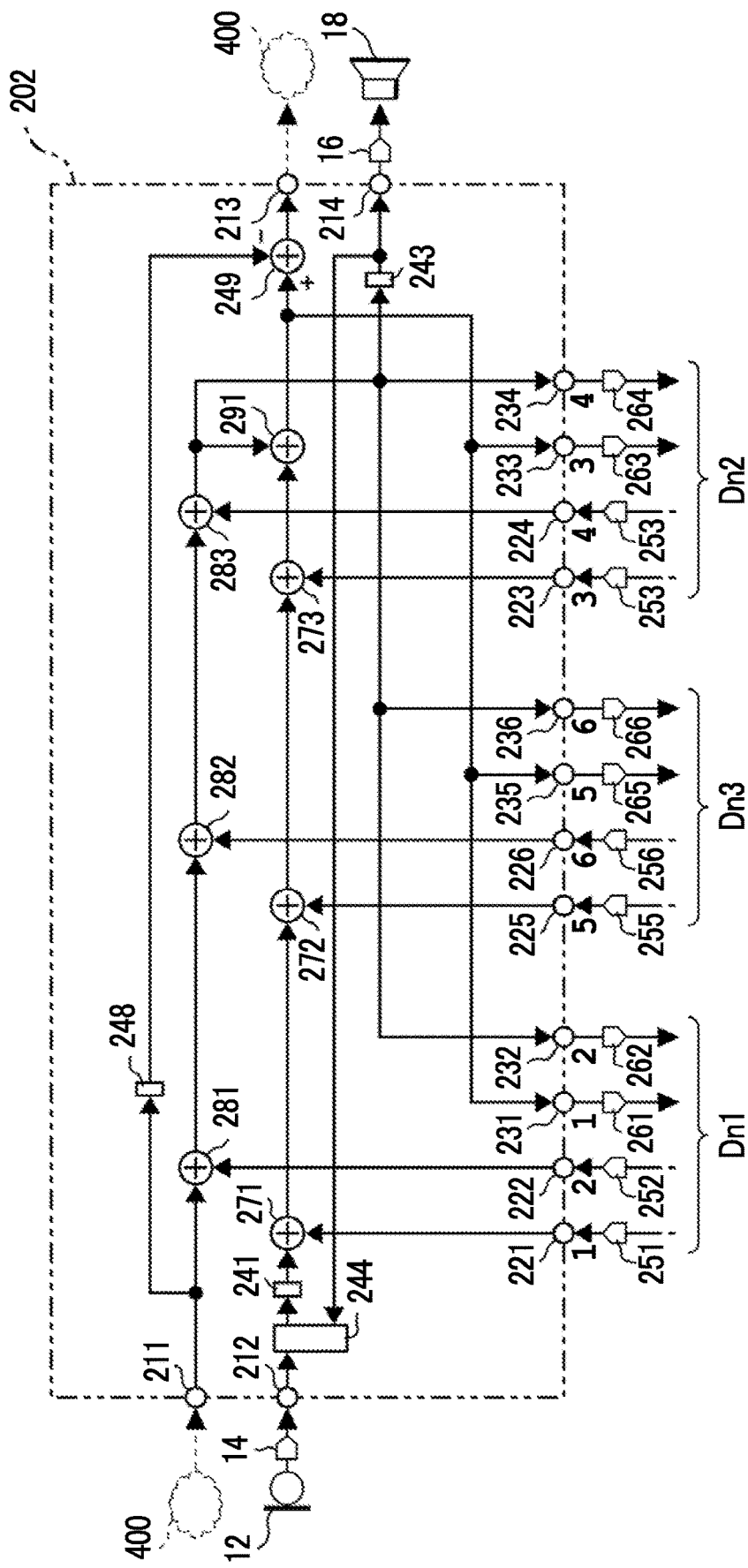
FIG. 33 is a diagram showing signal paths established by the path establisher in the sound emission-reception apparatus according to an exemplary application.
Figure 34:
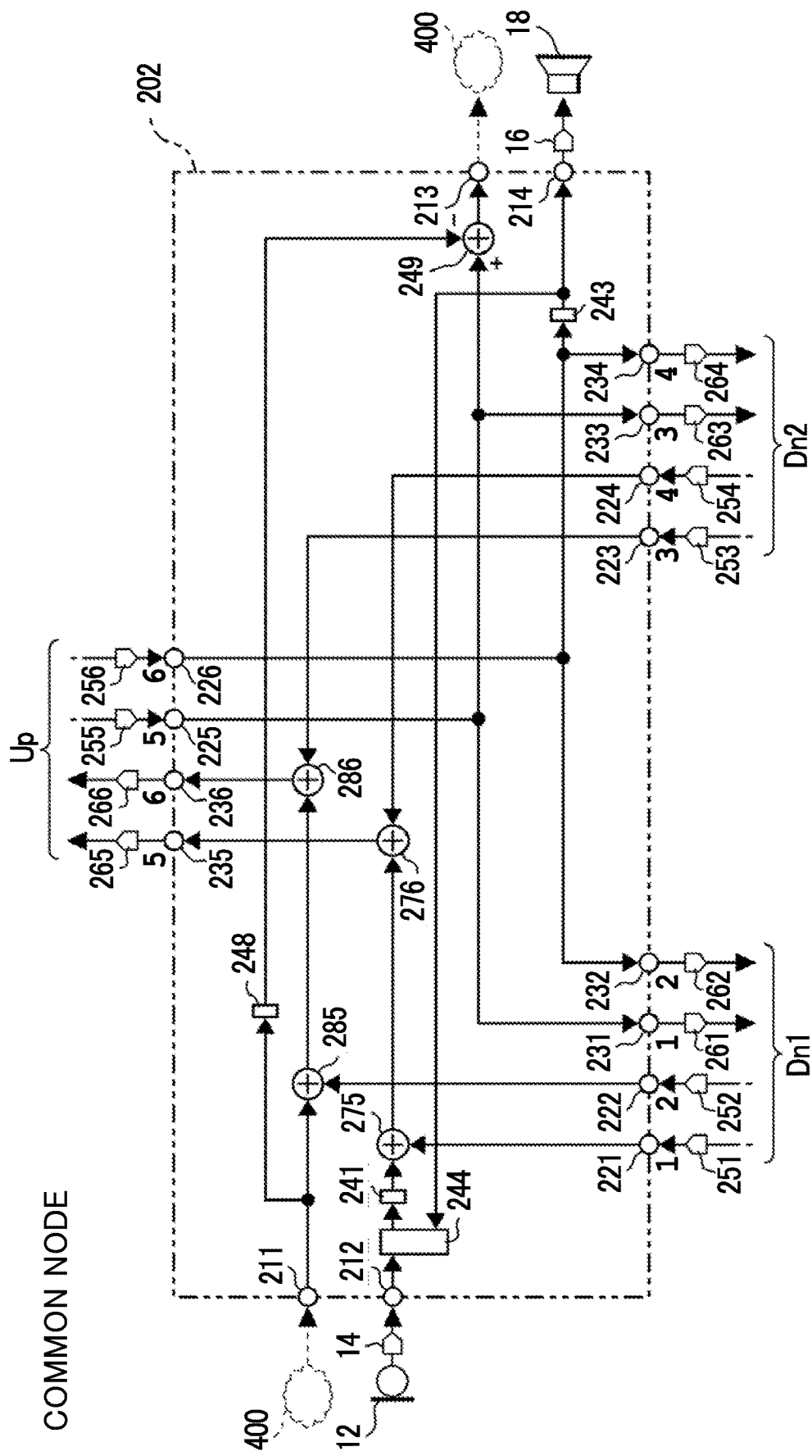
FIG. 34 is a diagram showing signal paths established by the path establisher in the sound emission-reception apparatus according to the exemplary application.

FIG. 33 is a diagram showing signal paths in the top node, and FIG. 34 is a diagram showing signal paths in a common node, among signal paths in sound emission-reception apparatuses 10 according to an exemplary application of the fourth embodiment.

Similarly to the third embodiment, in the fourth embodiment, sound signals input from multiple networks 400 and sound signals derived from sounds received by multiple microphones 12 are added together, and the resultant sound signal is output toward each of the multiple networks 400. Accordingly, signal deterioration such as echo may occur.

In view of this situation, there are provided in the top node and in each common node a delay device 248 that delays a sound signal that is from a network 400 and is input to the distal-end input terminal 211; and a subtractor 249 that subtracts the sound signal delayed by the delay device 248 from a sound signal to be output from the distal-end output terminal 213 toward the network 400.

In the fourth embodiment, components of a sound signal input to a sound emission-reception apparatus 10 from a network 400 are provided in a round-trip path, commencing from the subject apparatus to the top node and then back to the subject apparatus. The delay time generated in this round-trip is "2j·d". Thus, by setting the delay time for the delay device 248 to "2j·d" in each of the top node and common nodes, a sound signal input from a network 400 is removed from a sound signal to be output toward the network 400. In this way, deterioration of sound signals output toward the network 400 can be suppressed.

In the examples shown in FIG. 33 and FIG. 34, echo cancellers 244 are provided. Similarly to FIG. 10, FIG. 17, and FIG. 23, an echo canceller 244 here is configured to generate a simulated echo component by filtering a sound signal output toward the loudspeaker terminal 214 with filter coefficients that accord with an estimated transfer function of acoustic space from the loudspeaker 18 to the microphone 12; and to subtract the generated simulated echo component from a sound signal input to the microphone terminal 212 to output the resultant signal. By this configuration, even if sound output from the loudspeaker 18 seeps to and is received by the microphone 12, effects of the seeping sound can be minimized.

In the fourth embodiment, the number of connection points for the cables C at the top node and the common nodes is "3", but may be "4" or more. For example, when the number of connection points is "5" in a common node, there may be four connection points to sound emission-reception apparatuses 10 at a lower level, and one connection point to a sound emission-reception apparatus 10 at a higher level.

Exemplary Applications and Modifications

The present invention is not limited to the above embodiments, and can take various applied or modified forms as described below. One or more of the modes of application or modification described below can be combined as appropriate.

In the above description, the present invention is described as a sound signal processing device in a sound emission-reception apparatus 10. However, the present invention may be understood as a sound signal processing method, as well as a sound signal processing device.

In the above description, the DSP 200, the ADC 14, the ADC 251, the DAC 16, and the DAC 261 are described as separate bodies in the first embodiment (refer to FIG. 2), for example. Alternatively, the DSP 200 may house each of these ADCs and each of these DACs.

In the above description, the path establisher 202 is formed by the DSP 200. Alternatively, there may be provided in advance in a sound emission-reception apparatus 10 a circuit that executes the same calculation as the signal paths of the master apparatus (prt) and a circuit that executes the same calculation as the signal paths of the slave apparatus (chd); and depending on the role as the master apparatus (prt) or as the slave apparatus (chd), the two circuits may be switched. Similarly, a circuit for the signal paths of the top node and a circuit for the signal paths of the common node may be provided in a sound emission-reception apparatus 10 in advance and may be switched.

In each embodiment, there are provided in the sound emission-reception apparatus 10 multiple ADCs including an ADC that converts sound signals derived from sound received by the microphone 12 and multiple DACs including a DAC that converts sound signals output toward the loudspeaker 18. Alternatively, physically a single ADC may be operated in a time divisional manner to function as if there are multiple ADCs. Similarly, physically a single DAC may be operated in a time divisional manner to function as if there are multiple DACs.

Calculations executed in the path establisher 202 may include, in addition to addition and subtraction of two or more signals, outputting a signal with a greatest amplitude from among two or more signals and discarding other signals.

In the above embodiments, the communication device 150 communicates with other apparatuses by radio. Alternatively or additionally, the communication device 150 may utilize wired or infrared communication. Furthermore, the communication device 150 may be used to uniformly set parameters used in sound emission-reception apparatuses 10 in the same system. More specifically, in a case where the volume of sound output from the loudspeaker 18 of a sound emission-reception apparatus 10 is adjusted, the communication device 150 may transmit a parameter indicating the volume to another apparatus. The other apparatus changes its volume to the volume indicated by the received parameter. In this way, the volume may be made uniform among all or a part of the sound emission-reception apparatuses 10 forming the system 1.

In each embodiment, the sound emission-reception apparatus 10 includes the ADCs and the DACs, and analog signals are transmitted through the cables C. Alternatively, the ADCs and the DACs may be omitted and digital signals may be transmitted through the cables C.

In the above embodiments, the CPU 100 and the DSP 200 are described as separate bodies. Alternatively, the functions of the CPU 100 and the functions of the DSP may be realized by the same at least one processor. For example, the functions of the DSP 200 may be realized by the CPU 100.

DESCRIPTION OF REFERENCE SIGNS

1 . . . system; 10 . . . sound emission-reception apparatus; 12 . . . microphone; 18 . . . loudspeaker; 100 . . . CPU; 102 . . . detector; 104 . . . path indicator; 130 . . . notification device; 140 . . . input device; 200 . . . DSP; 202 . . . path establisher; 211 . . . distal-end input terminal; 212 . . . microphone terminal; 213 . . . distal-end output terminal; 214 . . . loudspeaker terminal; 221 . . . first input terminal; 222 . . . second input terminal; 223 . . . third input terminal; 224 . . . fourth input terminal; 225 . . . fifth input terminal; 226 . . . sixth input terminal; 231 . . . first output terminal; 232 . . . second output terminal; 233 . . . third output terminal; 234 . . . fourth output terminal; 235 . . . fifth output terminal; 236 . . . sixth output terminal.

What is claimed is:

1. A sound signal processing device comprising:
   a microphone terminal to which a sound signal derived from sound received by a microphone is input;
   a loudspeaker terminal from which a sound signal directed to a loudspeaker is output;
   a first input terminal to which a sound signal from another device at a proximal-end is input;
   a first output terminal from which a sound signal directed to the another device is output;
   a distal-end input terminal to which a distal-end sound signal is input via a network that is any one of Internet, a local area network, a wired telephone network, and a wireless telephone network;
   a distal-end output terminal from which a sound signal directed to the network is output; and
   at least one processor configured to execute stored instructions to:
   detect whether a subject device is connected to the network, and
   establish at least one signal path, based on a result of detecting the subject device, from at least one of the microphone terminal, the first input terminal, or the distal-end input terminal, to at least one of the loudspeaker terminal, the first output terminal, or the distal-end output terminal.

2. The sound signal processing device according to claim 1,
   wherein in a case where the at least one processor detects that the subject device is connected to the network, the at least one processor establishes:
   a signal path through which a sound signal that is derived by calculation based on the sound signal input to the microphone terminal and the sound signal input to the first input terminal is provided to the distal-end output terminal; and
   a signal path through which the sound signal input to the distal-end input terminal is provided to the loudspeaker terminal and to the first output terminal.

3. The sound signal processing device according to claim 2,
   wherein in a case where the at least one processor detects that the subject device is not connected to the network, the at least one processor establishes:
   a signal path through which the sound signal input to the microphone terminal is provided to the first output terminal; and
   a signal path through which the sound signal input to the first input terminal is provided to the loudspeaker terminal.

4. The sound signal processing device according to claim 2, further comprising:
   a first delay device that delays the sound signal input to the microphone terminal before the sound signal is used for calculation with the sound signal input to the first input terminal; and
   a second delay device that delays the sound signal input to the distal-end input terminal before the sound signal is provided to the loudspeaker terminal.

5. The sound signal processing device according to claim 1,
   wherein the at least one processor is further configured to detect whether a subject device is connected to the network;
   wherein the sound signal processing device further comprises:
   a communication device that communicates with the other device;
   a notification device that prompts a user to select either the subject device or the other device in a case where the at least one processor detects that the subject device is connected to the network and the communication device receives from the other device a notification that the other device is connected to the network; and
   an input device that allows the user to select either the subject device or the other device.

6. The sound signal processing device according to claim 5,
   wherein in a case where the subject device is selected with the input device,
   the at least one processor establishes:
   a signal path through which a sound signal that is derived by calculation based on the sound signal input to the microphone terminal and the sound signal input to the first input terminal is provided to the distal-end output terminal; and
   a signal path through which the sound signal input to the distal-end input terminal is provided to the loudspeaker terminal and to the first output terminal, and
   the communication device transmits a predetermined request to the other device.

7. The sound signal processing device according to claim 6,
   wherein in a case where the at least one processor detects that the subject device is not connected to the network, or in a case where the communication device receives a predetermined request from the other device, the at least one processor establishes:

a signal path through which the sound signal input to the microphone terminal is provided to the first output terminal; and a signal path through which the sound signal input to the first input terminal is provided to the loudspeaker terminal.

8. The sound signal processing device according to claim 1, further comprising:

a second input terminal to which a sound signal from the other device at the proximal-end is input;

a second output terminal from which a sound signal directed to the other device is output, wherein the at least one processor establishes at least one signal path from at least one of the microphone terminal, the first input terminal, the second input terminal, or the distal-end input terminal, to at least one of the loudspeaker terminal, the first output terminal, the second output terminal, or the distal-end output terminal.

9. The sound signal processing device according to claim 8, wherein the at least one processor is further configured to detect whether the subject device is connected to the network, wherein in a case where the at least one processor detects that the subject device is connected to the network, the at least one processor establishes:

a signal path through which the sound signal input to the microphone terminal is provided to the first output terminal;

a signal path through which the sound signal input to the distal-end input terminal is provided to the second output terminal;

a signal path through which the sound signal input to the first input terminal is provided to the distal-end output terminal; and a signal path through which the sound signal input to the second input terminal is provided to the loudspeaker.

10. The sound signal processing device according to claim 9, wherein in a case where the at least one processor detects that the subject device is not connected to the network, the at least one processor establishes:

a signal path through which a sound signal that is derived by calculation based on the sound signal input to the microphone terminal and the sound signal input to the first input terminal is provided to the first output terminal; and a signal path through which the sound signal input to the second input terminal is provided to the loudspeaker terminal and to the second output terminal.

11. The sound signal processing device according to claim 10, wherein the at least one processor is further configured to detect whether the subject device is connected to the network;

wherein the sound processing device further comprises:

a communication device that communicates with other devices;

a notification device that prompts a user to select either the subject device or another device among the other devices, in a case where the at least one processor detects that the subject device is connected to the network and the communication device receives from the other device a notification that the other device is connected to the network; and an input device that allows the user to select either the subject device or the other device.

12. The sound signal processing device according to claim 11, wherein in a case where the subject device is selected with the input device, the at least one processor establishes:

a signal path through which the sound signal input to the microphone terminal is provided to the first output terminal;

a signal path through which the sound signal input to the distal-end input terminal is provided to the second output terminal;

a signal path through which the sound signal input to the first input terminal is provided to the distal-end output terminal; and a signal path through which the sound signal input to the second input terminal is provided to the loudspeaker, and the communication device transmits a predetermined request to the other device.

13. The sound signal processing device according to claim 12, wherein in a case where the at least one processor detects that the subject device is not connected to the network, or in a case where the communication device receives from the other device a predetermined request, the at least one processor establishes:

a signal path through which a sound signal that is derived by calculation based on the sound signal input to the microphone terminal and the sound signal input to the first input terminal is provided to the first output terminal; and a signal path through which the sound signal input to the second input terminal is provided to the loudspeaker terminal and to the second output terminal.

14. The sound signal processing device according to claim 1, further comprising:

a second input terminal, a third input terminal, and a fourth input terminal, to each of which a sound signal output from the other device at the proximal-end is input; and a second output terminal, a third output terminal, and a fourth output terminal, from each of which a sound signal directed to the other device is output, wherein the at least one processor establishes at least one signal path from at least one of the microphone terminal, the first input terminal, the second input terminal, the third input terminal, the fourth input terminal, or the distal-end input terminal, to at least one of the loudspeaker terminal, the first output terminal, the second output terminal, the third output terminal, the fourth output terminal, or the distal-end output terminal.

15. The sound signal processing device according to claim 1, further comprising:

a second input terminal, a third input terminal, a fourth input terminal, a fifth input terminal, and a sixth input terminal, to which sound signals output from other devices at the proximal-end are input, the other devices including the other device; and a second output terminal, a third output terminal, a fourth output terminal, a fifth output terminal, and a sixth output terminal, from which sound signals directed to the other devices are output, wherein the at least one processor establishes at least one signal path from at least one of the microphone terminal, the first input terminal, the second input terminal, the third input terminal, the fourth input terminal, the fifth input terminal, the sixth input terminal, or the distal-end input terminal, to at least one of the loudspeaker terminal, the first output terminal, the second output terminal, the third output terminal, the fourth output terminal, the fifth output terminal, the sixth output terminal, or the distal-end output terminal.

16. The sound signal processing device according to claim 15, further comprising a communication device that communicates with other devices,
   wherein as a result of the communication device communicating with the other devices, one among the subject device and the other devices is determined to be a top node and remaining devices are determined to be common nodes.

17. The sound signal processing device according to claim 16,
   wherein in a case where the subject device is determined to be the top node, the at least one processor establish:
   a signal path through which a sound signal is provided to each of the first output terminal, the third output terminal, the fifth output terminal, and the distal-end output terminal, the sound signal being derived by calculation based on the sound signal input to the microphone terminal, the sound signal input to the first input terminal, the sound signal input to the second input terminal, the sound signal input to the third input terminal, the sound signal input to the fourth input terminal, the sound signal input to the fifth input terminal, the sound signal input to the sixth input terminal, and the sound signal input to the distal-end input terminal; and
   a signal path through which a sound signal is provided to each of the loudspeaker terminal, the second output terminal, the fourth output terminal, and the sixth output terminal, the sound signal being derived by calculation based on the sound signal input to the distal-end input terminal, the sound signal input to the second input terminal, the sound signal input to the fourth input terminal, and the sound signal input to the sixth input terminal.

18. The sound signal processing device according to claim 17,
   wherein in a case where the subject device is determined to be one of the common nodes, the at least one processor establishes:
   a signal path through which a sound signal is provided to the fifth output terminal, the sound signal being derived by calculation based on the sound signal input to the microphone terminal, the sound signal input to the first input terminal, and the sound signal input to the third input terminal;
   a signal path through which a sound signal is provided to the sixth output terminal, the sound signal being derived by calculation based on the sound signal input to the distal-end input terminal, the sound signal input to the second input terminal, and the sound signal input to the fourth input terminal;
   a signal path through which the sound signal input to the fifth input terminal is provided to each of the first output terminal, the third output terminal, and the distal-end output terminal; and
   a signal path through which the sound signal input to the sixth input terminal is provided to each of the second output terminal, the fourth output terminal, and the loudspeaker terminal.

19. A sound signal processing method implemented in a device that comprises at least:
   a microphone terminal to which a sound signal derived from sound received by a microphone is input;
   a loudspeaker terminal from which a sound signal directed to a loudspeaker is output;
   a first input terminal to which a sound signal from another device at a proximal-end is input;
   a first output terminal from which a sound signal directed to the another device is output;
   a distal-end input terminal to which a distal-end sound signal is input via a network that is any one of Internet, a local area network, a wired telephone network, and a wireless telephone network; and
   a distal-end output terminal from which a sound signal directed to the network is output,
   the method comprising:
   acquiring a connection status of a subject device indicating whether the subject device is connected to the network and a connection status of the another device indicating whether the another device is connected to the network; and
   determining, based on a result of acquiring the connection statuses, at least one signal path from at least one of the microphone terminal, the first input terminal, or the distal-end input terminal, to at least one of the loudspeaker terminal, the first output terminal, or the distal-end output terminal.

20. A sound signal processing device comprising:
   a microphone terminal to which a sound signal derived from sound received by a microphone is input;
   a loudspeaker terminal from which a sound signal directed to a loudspeaker is output;
   a first input terminal to which a sound signal from another device at a proximal-end is input;
   a first output terminal from which a sound signal directed to the another device is output;
   a distal-end input terminal to which a distal-end sound signal is input via a network that is any one of Internet, a local area network, a wired telephone network, and a wireless telephone network;
   a distal-end output terminal from which a sound signal directed to the network is output; and
   at least one processor configured to execute stored instructions to:
   establish at least one signal path from at least one of the microphone terminal, the first input terminal, or the distal-end input terminal, to at least one of the loudspeaker terminal, the first output terminal, or the distal-end output terminal,
   wherein the at least one processor is further configured to detect whether a subject device is connected to the network,
   wherein in a case where the at least one processor detects that the subject device is connected to the network, the at least one processor establishes:
   a signal path through which a sound signal that is derived by calculation based on the sound signal input to the microphone terminal and the sound signal input to the first input terminal is provided to the distal-end output terminal; and
   a signal path through which the sound signal input to the distal-end input terminal is provided to the loudspeaker terminal and to the first output terminal;
   wherein in a case where the at least one processor detects that the subject device is not connected to the network, the at least one processor establishes:

a signal path through which the sound signal input to the microphone terminal is provided to the first output terminal; and
a signal path through which the sound signal input to the first input terminal is provided to the loudspeaker terminal.

\* \* \* \* \*